(12) United States Patent
Kondow

(10) Patent No.: US 11,323,737 B2
(45) Date of Patent: May 3, 2022

(54) IMAGE PROCESSING DEVICE AND METHOD

(71) Applicant: SONY CORPORATION, Tokyo (JP)

(72) Inventor: Kenji Kondow, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/713,217

(22) Filed: Dec. 13, 2019

(65) Prior Publication Data

US 2020/0120354 A1 Apr. 16, 2020

Related U.S. Application Data

(63) Continuation of application No. 13/985,639, filed as application No. PCT/JP2012/055236 on Mar. 1, 2012, now Pat. No. 10,547,864.

(30) Foreign Application Priority Data

Mar. 11, 2011 (JP) ................................ 2011-054558

(51) Int. Cl.
*H04N 19/52* (2014.01)
*H04N 19/96* (2014.01)
(Continued)

(52) U.S. Cl.
CPC ........... *H04N 19/52* (2014.11); *H04N 19/119* (2014.11); *H04N 19/174* (2014.11);
(Continued)

(58) Field of Classification Search
CPC .... H04N 19/176; H04N 19/52; H04N 19/105; H04N 19/70; H04N 19/513;
(Continued)

(56) References Cited

U.S. PATENT DOCUMENTS 7,796,061 B2 9/2010 Kee
8,290,062 B1 10/2012 Chen
(Continued)

FOREIGN PATENT DOCUMENTS

JP 2004-235683 8/2004
JP 2007-504760 3/2007
(Continued)

OTHER PUBLICATIONS

Feb. 19, 2015, JP communication issued for related JP application No. 2011-054558.
(Continued)

*Primary Examiner* — Zhubing Ren
(74) *Attorney, Agent, or Firm* — Paratus Law Group, PLLC

(57) ABSTRACT

The present technique relates to an image processing device and method which can suppress an increase in an operation time. The image processing device has: an encoding control unit which, upon encoding independently performed per slice for dividing a picture into a plurality of pictures, controls whether or not to adopt for motion information a merge mode of merging a relevant region of an operation target with a surrounding region positioned in a surrounding of the relevant region, based on information of surrounding regions which belong to a relevant slice to which the relevant region belongs; and an encoding unit which encodes the relevant region in the merge mode or a mode other than the merge mode under control of the encoding control unit. The present disclosure is applicable to the image processing device.

9 Claims, 31 Drawing Sheets

(51) Int. Cl.
*H04N 19/119* (2014.01)
*H04N 19/174* (2014.01)
*H04N 19/436* (2014.01)
*H04N 19/61* (2014.01)

(52) U.S. Cl.
CPC ........... *H04N 19/436* (2014.11); *H04N 19/96* (2014.11); *H04N 19/61* (2014.11)

(58) Field of Classification Search
CPC .. H04N 19/159; H04N 19/139; H04N 19/172; H04N 19/61; H04N 19/46; H04N 19/132; H04N 19/51; H04N 19/577; H04N 19/109; H04N 19/119; H04N 19/147; H04N 19/154; H04N 19/96; H04N 19/174; H04N 19/436
See application file for complete search history.

(56) References Cited

U.S. PATENT DOCUMENTS

| | | | |
|---|---|---|---|
| 8,428,143 B2 | 4/2013 | Schwarz et al. | |
| 8,548,061 B2 | 10/2013 | Suzuki | |
| 8,559,798 B2 | 10/2013 | Aoki et al. | |
| 8,750,377 B2 | 6/2014 | Divorra Escoda et al. | |
| 8,768,083 B2 * | 7/2014 | Lim ..................... | H04N 19/593 382/238 |
| 9,066,110 B2 | 6/2015 | Zhou | |
| 9,277,238 B2 | 3/2016 | Suzuki et al. | |
| 9,288,501 B2 | 3/2016 | Zheng et al. | |
| 9,609,333 B2 | 3/2017 | Zhou | |
| 9,661,324 B2 | 5/2017 | Lim et al. | |
| 9,788,009 B2 | 10/2017 | Schwarz et al. | |
| 9,800,888 B2 | 10/2017 | Lim et al. | |
| 10,743,027 B2 * | 8/2020 | Zheng ..................... | H04N 19/30 |
| 2005/0271361 A1 | 12/2005 | Aoki et al. | |
| 2006/0126952 A1 | 6/2006 | Suzuki et al. | |
| 2008/0002767 A1 | 1/2008 | Schwarz et al. | |
| 2008/0025396 A1 | 1/2008 | Tasaka et al. | |
| 2008/0310555 A1 | 12/2008 | Kee | |
| 2009/0080524 A1 * | 3/2009 | Fujisawa ................ | H04N 19/70 375/240.15 |
| 2009/0245349 A1 | 10/2009 | Zhao et al. | |
| 2010/0054338 A1 | 3/2010 | Suzuki et al. | |
| 2010/0124273 A1 | 5/2010 | Divorra Escoda et al. | |
| 2010/0135387 A1 * | 6/2010 | Divorra Escoda ... | H04N 19/159 375/240.12 |
| 2011/0261882 A1 | 10/2011 | Zheng et al. | |
| 2012/0008676 A1 | 1/2012 | Lee et al. | |
| 2012/0128067 A1 * | 5/2012 | Liu ..................... | H04N 19/176 375/240.12 |
| 2012/0189062 A1 * | 7/2012 | Sugio ..................... | H04N 19/132 375/240.16 |
| 2012/0195366 A1 * | 8/2012 | Liu ..................... | H04N 19/70 375/240.02 |
| 2012/0219064 A1 | 8/2012 | Zheng et al. | |
| 2012/0230392 A1 | 9/2012 | Zheng et al. | |
| 2012/0230408 A1 * | 9/2012 | Zhou ..................... | H04N 19/139 375/240.15 |
| 2012/0230411 A1 * | 9/2012 | Liu ..................... | H04N 19/96 375/240.16 |
| 2012/0281752 A1 * | 11/2012 | Zheng ..................... | H04N 19/122 375/240.03 |
| 2013/0003862 A1 | 1/2013 | Chen | |
| 2013/0034171 A1 | 2/2013 | Winken et al. | |
| 2013/0077689 A1 | 3/2013 | Lim et al. | |
| 2013/0089264 A1 * | 4/2013 | Lim ..................... | H04N 19/50 382/233 |
| 2013/0107948 A1 | 5/2013 | DeForest et al. | |
| 2013/0107959 A1 | 5/2013 | Park et al. | |
| 2013/0114717 A1 * | 5/2013 | Zheng ..................... | H04N 19/52 375/240.14 |
| 2013/0142254 A1 * | 6/2013 | Sugio ..................... | H04N 19/172 375/240.03 |
| 2013/0156335 A1 | 6/2013 | Lim et al. | |
| 2013/0230099 A1 | 9/2013 | DeForest et al. | |
| 2013/0230103 A1 | 9/2013 | Lim et al. | |
| 2013/0301736 A1 * | 11/2013 | Sugio ..................... | H04N 19/137 375/240.16 |
| 2013/0315308 A1 * | 11/2013 | Sugio ..................... | H04N 19/44 375/240.14 |
| 2013/0322543 A1 * | 12/2013 | Sugio ..................... | H04N 19/513 375/240.16 |
| 2013/0329797 A1 * | 12/2013 | Sugio ..................... | H04N 19/52 375/240.15 |
| 2015/0222904 A1 | 8/2015 | Zhou | |
| 2016/0309179 A1 | 10/2016 | Schwarz et al. | |
| 2017/0188045 A1 | 6/2017 | Zhou | |
| 2017/0332078 A1 | 11/2017 | Lim et al. | |

FOREIGN PATENT DOCUMENTS

| | | |
|---|---|---|
| WO | WO 2007/105590 | 9/2007 |
| WO | WO 2009/119888 | 10/2009 |
| WO | WO 2010/041855 | 4/2010 |
| WO | WO 2012/120661 A1 | 9/2012 |

OTHER PUBLICATIONS

Dec. 3, 2015, Japanese Office Action for related JP Application No. 2011-054558.

Jie Zhao, et al., CE6: Parallel Prediction Unit for Parallel Intra Coding, Joint Collaborative Team on Video Coding (JCT-VC) of ITU-T SG16 WP3 and ISO/IEC JTC1/SC29/WG11, Jan. 20-28, 2011, pp. 1-10, 4$^{th}$ Meeting: Daegu, KR.

Thomas Wiegand, et al., WD1: Working Draft 1 of High-Efficiency Video Coding, Joint Collaborative Team on Video Coding (JCT-VC) of ITU-T SG16 WP3 and ISO/IEC JTC1/SC29/WG11, Oct. 7-15, 2010, pp. 1-4, 3$^{rd}$ Meeting: Guangzhou, CN.

Martin Winken, et al., Description of video coding technology proposal by Fraunhofer HHI, Joint Collaborative Team on Video-Coding (JCT-VC) of ITU-T SG16 WP3 and ISO/IEC JTC1/SC29/WG11, Apr. 15-23, 2010, pp. 1-44, 1$^{st}$ Meeting: Dresden, DE.

Joel Jung, et al., Competition-Based Scheme for Motion Vector Selection and Coding, ITU—Telecommunications Standardization Sector, Video Coding Experts Group (VCEG), Jul. 17-18, 2006, 29$^{th}$ Meeting: Klagenfurt, Austria.

Test Model under Consideration, Joint Collaborative Team on Video Coding (JCT-VC) of ITU-T SG16 WP3 and ISO/IEC JTC1/SC29/WG11, Jul. 21-28, 2010, 2$^{nd}$ Meeting: Geneva, CH.

Apr. 25, 2016, Chinese communication issued for related CN application No. 201280011747.6.

Aug. 7, 2018, Japanese Office Action issued for related JP Application No. 2017-178894.

Itani et al., Improvement to AMVP/Merge process, Joint Collaborative Team on Video Coding (JCT-VC) of ITU-T SG 16 WP3 and ISO/IEC JTC1/SC29/G11, 5$^{th}$ Meeting, Mar. 16-23, 2011, pp. 1-7, Geneva, CH.

Apr. 16, 2019, Chinese Office Action issued for related CN Application No. 201611218148.8.

Apr. 24, 2019, Chinese Office Action issued for related CN Application No. 201611217477.0.

Mar. 17, 2020, Japanese Office Action issued for related JP Application No. 2019-072487.

* cited by examiner

FIG. 11

| | CU syntax | Descriptor |
|---|---|---|
| 1 | coding_unit( x0, y0, log2CUSize ) { | Descriptor |
| 2 | if( slice_type != I ) | |
| 3 | skip_flag[ x0 ][ y0 ] | u(1) \| ae(v) |
| 4 | if( skip_flag[ x0 ][ y0 ] ) | |
| 5 | prediction_unit( x0, y0, log2CUSize, log2CUSize ) | |
| 6 | else { | |
| 7 | if( NumMergeCandidates > 0 ) | |
| 8 | merge_flag[ x0 ][ y0 ] | u(1) \| ae(v) |
| 9 | if( merge_flag[ x0 ][ y0 ] ) { | |
| 10 | PredMode = MODE_MERGE | |
| 11 | prediction_unit( x0, y0, log2CUSize, log2CUSize ) | |
| 12 | transform_tree( x0, y0, log2CUSize, 0, 0 ) | |
| 13 | } else { | |
| 14 | if( slice_type != I ) | |
| 15 | pred_mode | u(1) \| ae(v) |
| 16 | x1 = x0 + ( ( 1 << log2CUSize ) >> 1 ) | |
| 17 | y1 = y0 + ( ( 1 << log2CUSize ) >> 1 ) | |
| 18 | if( PredMode == MODE_INTRA ) { | |
| 19 | if( entropy_coding_mode_flag ) | |
| 20 | intra_split_flag | u(1) \| ae(v) |
| 21 | if( intra_split_flag ) { | |
| 22 | prediction_unit( x0, y0, log2CUSize, log2CUSize ) | |
| 23 | transform_tree( x0, y0, log2CUSize, 0, 0 ) | |
| 24 | } else { | |
| 25 | prediction_unit( x0, y0, log2CUSize - 1, log2CUSize - 1 ) | |
| 26 | prediction_unit( x1, y0, log2CUSize - 1, log2CUSize - 1 ) | |
| 27 | prediction_unit( x0, y1, log2CUSize - 1, log2CUSize - 1 ) | |
| 28 | prediction_unit( x1, y1, log2CUSize - 1, log2CUSize - 1 ) | |
| 29 | transform_tree( x0, y0, log2CUSize, 0, 0 ) | |
| 30 | } | |
| 31 | } else if( PredMode == MODE_INTER ) { | |
| 32 | inter_partitioning_idc | ue(v) \| ae(v) |
| 33 | if( PartMode == PART_2Nx2N ) { | |
| 34 | prediction_unit( x0, y0, log2CUSize, log2CUSize ) | |
| 35 | transform_tree( x0, y0, log2CUSize, 0, 0 ) | |
| 36 | } else if( PartMode == PART_2NxN ) { | |
| 37 | prediction_unit( x0, y0, log2CUSize, log2CUSize - 1 ) | |
| 38 | prediction_unit( x0, y1, log2CUSize, log2CUSize - 1 ) | |
| 39 | transform_tree( x0, y0, log2CUSize, 0, 0 ) | |
| 40 | } else if( PartMode == PART_Nx2N ) { | |
| 41 | prediction_unit( x0, y0, log2CUSize - 1, log2CUSize ) | |
| 42 | prediction_unit( x1, y0, log2CUSize - 1, log2CUSize ) | |
| 43 | transform_tree( x0, y0, log2CUSize, 0, 0 ) | |
| 44 | } else { /* PART_NxN */ | |
| 45 | prediction_unit( x0, y0, log2CUSize - 1, log2CUSize - 1 ) | |
| 46 | prediction_unit( x1, y0, log2CUSize - 1, log2CUSize - 1 ) | |
| 47 | prediction_unit( x0, y1, log2CUSize - 1, log2CUSize - 1 ) | |
| 48 | prediction_unit( x1, y1, log2CUSize - 1, log2CUSize - 1 ) | |
| 49 | transform_tree( x0, y0, log2CUSize, 0, 0 ) | |
| 50 | } | |
| 51 | } else { /* MODE_DIRECT */ | |
| 52 | prediction_unit( x0, y0, log2CUSize, log2CUSize ) | |
| 53 | transform_tree( x0, y0, log2CUSize, 0, 0 ) | |
| 54 | } | |
| 55 | } | |
| 56 | } | |
| 57 | } | |

FIG. 12

```
PU syntax
```

| | | Descriptor |
|---|---|---|
| 1 | prediction_unit( x0, y0, log2PUWidth, log2PUHeight ) { | |
| 2 | if( skip_flag[ x0 ][ y0 ] ) { | |
| 3 | if( NumMVPCand( L0 ) > 1 ) | |
| 4 | mvp_idx_l0[ x0 ][ y0 ] | ue(v) \| ae(v) |
| 5 | if( NumMVPCand( L1 ) > 1 ) | |
| 6 | mvp_idx_l1[ x0 ][ y0 ] | ue(v) \| ae(v) |
| 7 | } else if( PredMode == MODE_INTRA ) { | |
| 8 | prev_intra_luma_pred_flag[ x0 ][ y0 ] | u(1) \| ae(v) |
| 9 | if( !prev_intra_luma_pred_flag[ x0 ][ y0 ] ) | |
| 10 | rem_intra_luma_pred_mode[ x0 ][ y0 ] | ue(v) \| ae(v) |
| 11 | } else { /* MODE_MERGE, MODE_DIRECT, MODE_INTER */ | |
| 12 | if( merge_flag[ x0 ][ y0 ] && NumMergeCandidates > 1 ) { | |
| 13 | merge_left_flag[ x0 ][ y0 ] | u(1) \| ae(v) |
| 14 | } else if( PredMode == MODE_DIRECT ) { | |
| 15 | if( slice_type == B ) | |
| 16 | inter_pred_idc[ x0 ][ y0 ] | ue(v) \| ae(v) |
| 17 | if( inter_pred_idc[ x0 ][ y0 ] != Pred_L1 && NumMVPCand( L0 ) > 1 ) | |
| 18 | mvp_idx_l0[ x0 ][ y0 ] | ue(v) \| ae(v) |
| 19 | if( inter_pred_idc[ x0 ][ y0 ] != Pred_L0 && NumMVPCand( L1 ) > 1 ) | |
| 20 | mvp_idx_l1[ x0 ][ y0 ] | ue(v) \| ae(v) |
| 21 | } else { | |
| 22 | if( slice_type == B ) | |
| 23 | inter_pred_idc[ x0 ][ y0 ] | ue(v) \| ae(v) |
| 24 | if( inter_pred_idc[ x0 ][ y0 ] != Pred_L1 ) { | |
| 25 | if( num_ref_idx_l0_active_minus1 > 0 ) | |
| 26 | ref_idx_l0[ x0 ][ y0 ] | ue(v) \| ae(v) |
| 27 | mvd_l0[ x0 ][ y0 ][ 0 ] | se(v) \| ae(v) |
| 28 | mvd_l0[ x0 ][ y0 ][ 1 ] | se(v) \| ae(v) |
| 29 | if( NumMVPCand( L0 ) > 1 ) | |
| 30 | mvp_idx_l0 | ue(v) \| ae(v) |
| 31 | } | |
| 32 | if( inter_pred_idc[ x0 ][ y0 ] != Pred_L0 ) { | |
| 33 | if( num_ref_idx_l1_active_minus1 > 0 ) | |
| 34 | ref_idx_l1[ x0 ][ y0 ] | ue(v) \| ae(v) |
| 35 | mvd_l1[ x0 ][ y0 ][ 0 ] | se(v) \| ae(v) |
| 36 | mvd_l1[ x0 ][ y0 ][ 1 ] | se(v) \| ae(v) |
| 37 | if( NumMVPCand( L1 ) > 1 ) | |
| 38 | mvp_idx_l1 | ue(v) \| ae(v) |
| 39 | } | |
| 40 | } | |
| 41 | } | |
| 42 | } | |

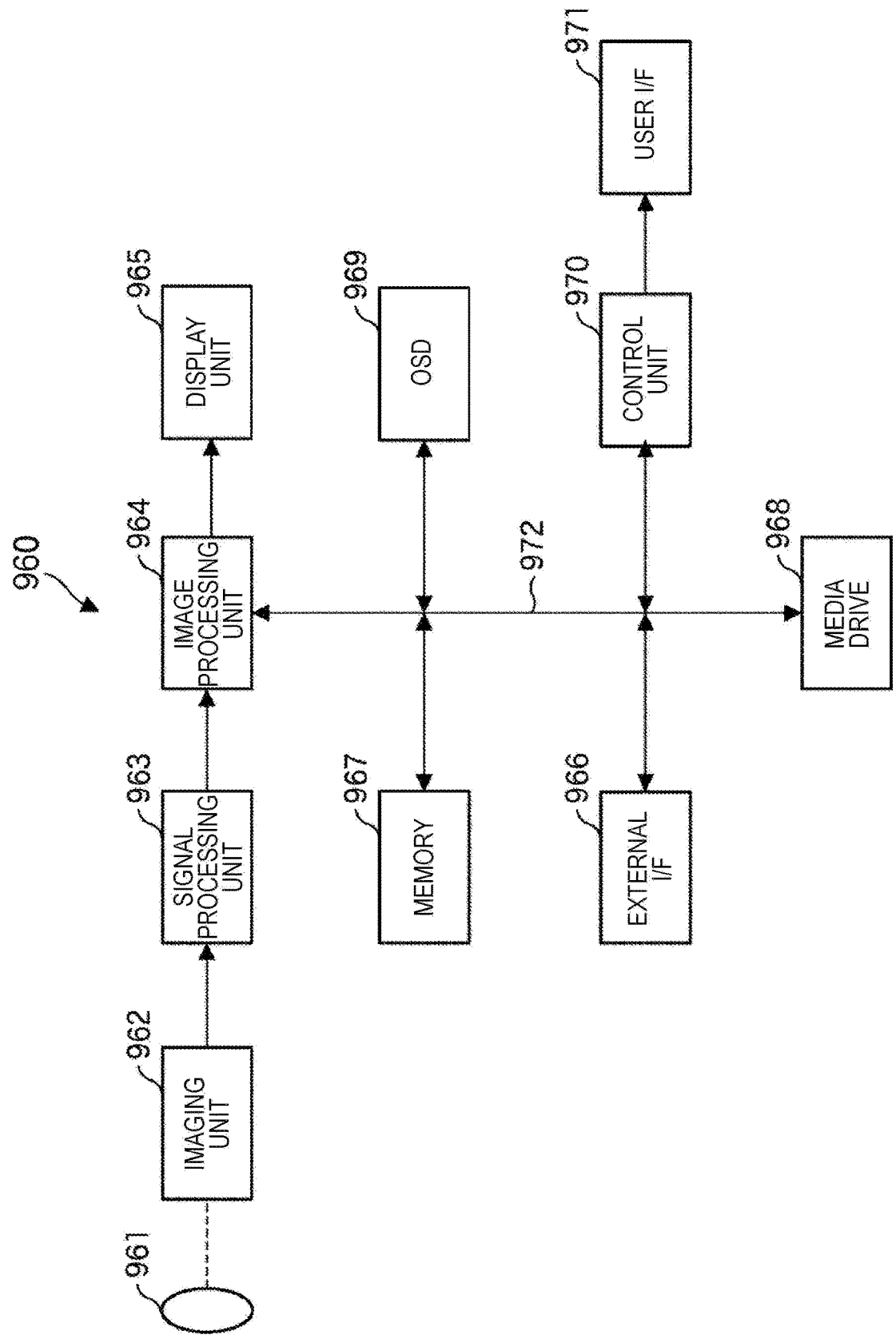

IMAGE PROCESSING DEVICE AND METHOD

CROSS REFERENCE TO PRIOR APPLICATION

This application is a continuation of U.S. patent application Ser. No. 13/985,639 (filed on Aug. 15, 2013), which is a National Stage Patent Application of PCT International Patent Application No. PCT/JP2012/055236 (filed on Mar. 1, 2012) under 35 U.S.C. § 371, which claims priority to Japanese Patent Application No. 2011-054558 (filed on Mar. 11, 2011), which are all hereby incorporated by reference in their entirety.

TECHNICAL FIELD

The present invention relates to an image processing device and method and, more particularly, relates to an image processing device and method which can suppress an increase in an operation time.

BACKGROUND ART

In recent years, devices which handle image information as digital information, and which, in this case, is compliant with a standard of MPEG (Moving Picture Experts Group) of performing compression by an orthogonal transform such as discrete cosine transform or motion compensation using redundancy specific to image information to transmit and accumulate high-efficiency information are spreading to distribute information from broadcasting stations and receive information at houses.

Particularly, MPEG2 (ISO (International Organization for Standardization)/IEC (International Electrotechnical Commission) 13818-2) is defined as a general-purpose encoding method, and is currently used in a wide range of applications for professional use and consumer use according to a standard which covers both of an interlaced image and a progressive image, and a standard resolution image and a high definition image. According to the MPEG2 compression standard, by assigning a bit rate of 4 to 8 Mbps to an interlaced image having a standard resolution of 720×480 pixels, for example, and assigning a bit rate of 18 to 22 Mbps to a high-resolution interlaced image having 1920×1088 pixels, high compression rates and excellent image quality can be realized.

Although MPEG2 targets at high image quality encoding which mainly matches with broadcasting, MPEG2 does not support a lower bit rate than that of MPEG1, that is, an encoding standard of a higher compression rate. As mobile terminals spread, needs for such an encoding standard were expected to increase in near future, and a MPEG4 encoding standard was standardized to meet the needs. In December 1998, a standard of an image encoding standard was approved as ISO/IEC 14496-2 as an international standard.

Also, a standard called H.26L (ITU-T (International Telecommunication Union Telecommunication Standardization Sector) Q6/16 VCEG (Video Coding Expert Group)) is being developed for encoding images to be originally used in video conferences. Compared with the conventional encoding techniques such as MPEG2 and MPEG4, H.26L requires a larger amount of calculation in encoding and decoding, but is known to achieve higher encoding efficiency. Further, as part of the MPEG4 activities, a standard for achieving even higher encoding efficiency while also adopting a function which is not supported by H.26L, based on H.26L is being currently developed as Joint Model of Enhanced-Compression Video Coding.

The standard has already been set as an international standard under the name of H.264 and MPEG-4 Part 10 (hereinafter referred to as AVC (Advanced Video Coding)) in March 2003.

However, there was a concern that this standard which provides a macro block size of 16 pixels×16 pixels is not optimal to an image frame such as UHD (Ultra High Definition; 4000 pixels×2000 pixels) which is a target next generation encoding standard.

At present, to achieve higher encoding efficiency than that of AVC, an image encoding technique called HEVC (High Efficiency Video Coding) is being developed as a standard by JCTVC (Joint Collaboration Team-Video Coding), which is a joint standardization organization of ITU-T and ISO/IEC (see, for example, Non-Patent Document 1).

According to this HEVC encoding standard, a coding unit (CU) is defined as the same operation unit as a macro block according to AVC. In this CU, the size is not fixed to 16×16 pixels unlike the macro block according to AVC, and is specified in compressed image information in each sequence.

Meanwhile, to improve encoding of a motion vector using median prediction in AVC, adaptively using one of "Temporal Predictor" and "Spatio-Temporal Predictor" in addition to "Spatial Predictor" defined in AVC and calculated by median prediction as prediction motion vector information is proposed (see, for example, Non-Patent Document 2).

In an image information encoding device, cost functions for respective blocks are calculated by using the predicted motion vector information about the respective blocks, and optimum predicted motion vector information is selected. Through the compressed image information, a flag indicating the information about which predicted motion vector information has been used is transmitted for each block.

Further, as one of motion information encoding standards, a method (hereinafter, also referred to as a "merge mode") called Motion Partition Merging is proposed (see, for example, Non-Patent Document 3). In this method, when motion information of a relevant block is the same as motion information of surrounding blocks, only flag information is transmitted and, upon decoding, the motion information of the relevant block is reconstructed using the motion information of the surrounding blocks.

By the way, a method of dividing a picture into a plurality of slices and performing processing per slice is prepared for the image encoding standards such as above AVC and HEVC to, for example, parallelize processing. Further, entropy slices are also proposed in addition to these slices.

The entropy slice is a processing unit for an entropy encoding operation and an entropy decoding operation. That is, upon the entropy encoding operation and the entropy decoding operation, although a picture is divided into a plurality of entropy slices and is processed per entropy slice, each picture is processed without being applied this slice division upon a prediction operation.

CITATION LIST

Non-Patent Document

Non-Patent Document 1: "Test Model under Consideration", JCTVC-B205, Joint Collaborative Team on Video Coding (JCT-VC) of ITU-T SG16 WP3 and ISO/IEC JTC1/SC29/WG112nd Meeting: Geneva, CH, 21-28 July, 2010

Non-Patent Document 2: Joel Jung, Guillaume Laroche, "Competition-Based Scheme for Motion Vector Selection and Coding", VCEG-AC06, ITU—Telecommunications Standardization Sector STUDY GROUP 16 Question 6Video Coding Experts Group (VCEG) 29th Meeting: Klagenfurt, Austria, 17-18 Jul. 2006

Non-Patent Document 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010

SUMMARY OF THE INVENTION

Problems to be Solved by the Invention

However, as described above, in case of a merge mode, it is necessary to refer to motion information of surrounding blocks to process motion information of an operation target relevant block. Hence, when a picture divided into a plurality of slices (entropy slices are also included) and processed per slice, it may be necessary to refer to a block of another slice depending on a position of a relevant block.

In this case, the relevant block cannot be processed until processing of the surrounding blocks is not finished, processing cannot be parallelized per slice and there is a concern that throughput significantly decreases.

In light of this situation, an object of the present disclosure is to, upon encoding of an image performed by dividing a picture into a plurality of slices and performing processing in parallel per slice, suppress an increase in an operation time even when a merge mode is applied.

Solutions to Problems

One aspect of the present disclosure is an image processing device which has: an encoding control unit which, upon encoding independently performed per slice for dividing a picture into a plurality of pictures, controls whether or not to adopt for motion information a merge mode of merging a relevant region of an operation target with a surrounding region positioned in a surrounding of the relevant region, based on information of surrounding regions which belong to a relevant slice to which the relevant region belongs; and an encoding unit which encodes the relevant region in the merge mode or a mode other than the merge mode under control of the encoding control unit.

The encoding control unit can perform control such that the merge mode is adopted when at least one of the surrounding regions which belong to the relevant slice has motion information.

The encoding control unit can have: a calculation unit which calculates a number of pieces of motion information of the surrounding regions which belong to the relevant slice; a determination unit which determines whether or not the number of pieces of motion information of the surrounding regions calculated by the calculation unit is greater than 0; and a control unit which, when the determination unit determines that the number of pieces of motion information of the surrounding regions is greater than 0, performs control such that the merge mode is adopted.

The calculation unit can have: a position determination unit which determines whether or not each surrounding region belongs to the relevant slice; a type determination unit which determines a prediction type of a surrounding region which is determined to belong to the relevant slice by the position determination unit; and an update unit which, when the type determination unit determines the prediction type of the surrounding region and determines that the surrounding region includes the motion information, updates a value of a parameter for counting the number of pieces of motion information of the surrounding regions.

The image processing device can further have a prediction operation unit which performs a prediction operation of generating a predicted image independently per slice.

The slice can be an entropy slice which divides only the encoding operation performed with respect to the picture by the encoding unit into a plurality of processing.

One aspect of the present disclosure is an image processing method of an image processing device, and is an image processing method which includes: at an encoding control unit, upon encoding independently performed per slice for dividing a picture into a plurality of pictures, controlling whether or not to adopt for motion information a merge mode of merging a relevant region of an operation target with a surrounding region positioned in a surrounding of the relevant region, based on information of surrounding regions which belong to a relevant slice to which the relevant region belongs; and at an encoding unit, encoding the relevant region in the merge mode or a mode other than the merge mode under the control.

Another aspect of the present disclosure is an image processing device which has: a decoding control unit which, upon decoding independently performed per slice for dividing a picture into a plurality of pictures, controls whether or not to adopt for motion information a merge mode of merging a relevant region of an operation target with a surrounding region positioned in a surrounding of the relevant region, based on information of surrounding regions which belong to a relevant slice to which the relevant region belongs; and a decoding unit which encodes the relevant region in the merge mode or a mode other than the merge mode under control of the decoding control unit.

The decoding control unit can perform control such that the merge mode is adopted when at least one of the surrounding regions which belong to the relevant slice has motion information.

The decoding control unit can have: a calculation unit which calculates a number of pieces of motion information of the surrounding regions which belong to the relevant slice; a determination unit which determines whether or not the number of pieces of motion information of the surrounding regions calculated by the calculation unit is greater than 0; and a control unit which, when the determination unit determines that the number of pieces of motion information of the surrounding regions is greater than 0, performs control such that the merge mode is adopted.

The calculation unit can have: a position determination unit which determines whether or not each surrounding region belongs to the relevant slice; a type determination unit which determines a prediction type of a surrounding region which is determined to belong to the relevant slice by the position determination unit; and an update unit which, when the type determination unit determines the prediction type of the surrounding region and determines that the surrounding region includes the motion information, updates a value of a parameter for counting the number of pieces of motion information of the surrounding regions.

The image processing device can further have a prediction operation unit which performs a prediction operation of generating a predicted image independently per slice.

The slice can be an entropy slice which divides only the decoding operation performed with respect to the picture by the decoding unit into a plurality of processing.

Another aspect of the present disclosure is an image processing method of an image processing device, and is an image processing method which includes: at a decoding control unit, upon decoding independently performed per slice for dividing a picture into a plurality of pictures, controlling whether or not to adopt for motion information a merge mode of merging a relevant region of an operation target with a surrounding region positioned in a surrounding of the relevant region, based on information of surrounding regions which belong to a relevant slice to which the relevant region belongs; and at a decoding unit, decoding the relevant region in the merge mode or a mode other than the merge mode under the control.

According to one aspect of the present disclosure, upon encoding independently performed per slice for dividing a picture into a plurality of pictures, whether or not to adopt for motion information a merge mode of merging a relevant region of an operation target with a surrounding region positioned in a surrounding of the relevant region is controlled based on information of surrounding regions which belong to a relevant slice to which the relevant region belongs, and the relevant region is encoded in the merge mode or a mode other than the merge mode under the control.

According to another aspect of the present disclosure, upon decoding independently performed per slice for dividing a picture into a plurality of pictures, whether or not to adopt for motion information a merge mode of merging a relevant region of an operation target with a surrounding region positioned in a surrounding of the relevant region is controlled based on information of surrounding regions which belong to a relevant slice to which the relevant region belongs, and the relevant region is decoded in the merge mode or a mode other than the merge mode under this control.

Effects of the Invention

According to the present disclosure, it is possible to process images. Particularly, it is possible to suppress an increase in an operation time.

BRIEF DESCRIPTION OF DRAWINGS

FIG. 11 is a view illustrating an example of syntaxes of a coding unit.

FIG. 12 is a view illustrating an example of syntaxes of a prediction unit.

FIG. 31 is a block diagram illustrating an example of a schematic configuration of an imaging device.

MODES FOR CARRYING OUT THE INVENTION

The following is a description of modes for carrying out the invention (hereinafter referred to as the embodiments). Explanation will be made in the following order.
1. First Embodiment (Image Encoding Device)
2. Second Embodiment (Image Decoding Device)
3. Third Embodiment (Personal Computer)
4. Fourth Embodiment (Television Receiver)
5. Fifth Embodiment (Mobile Telephone Device)
6. Sixth Embodiment (Recording/Reproducing Device)
7. Seventh Embodiment (Imaging Device)

1. First Embodiment

[Image Encoding Device]

Figure 1:
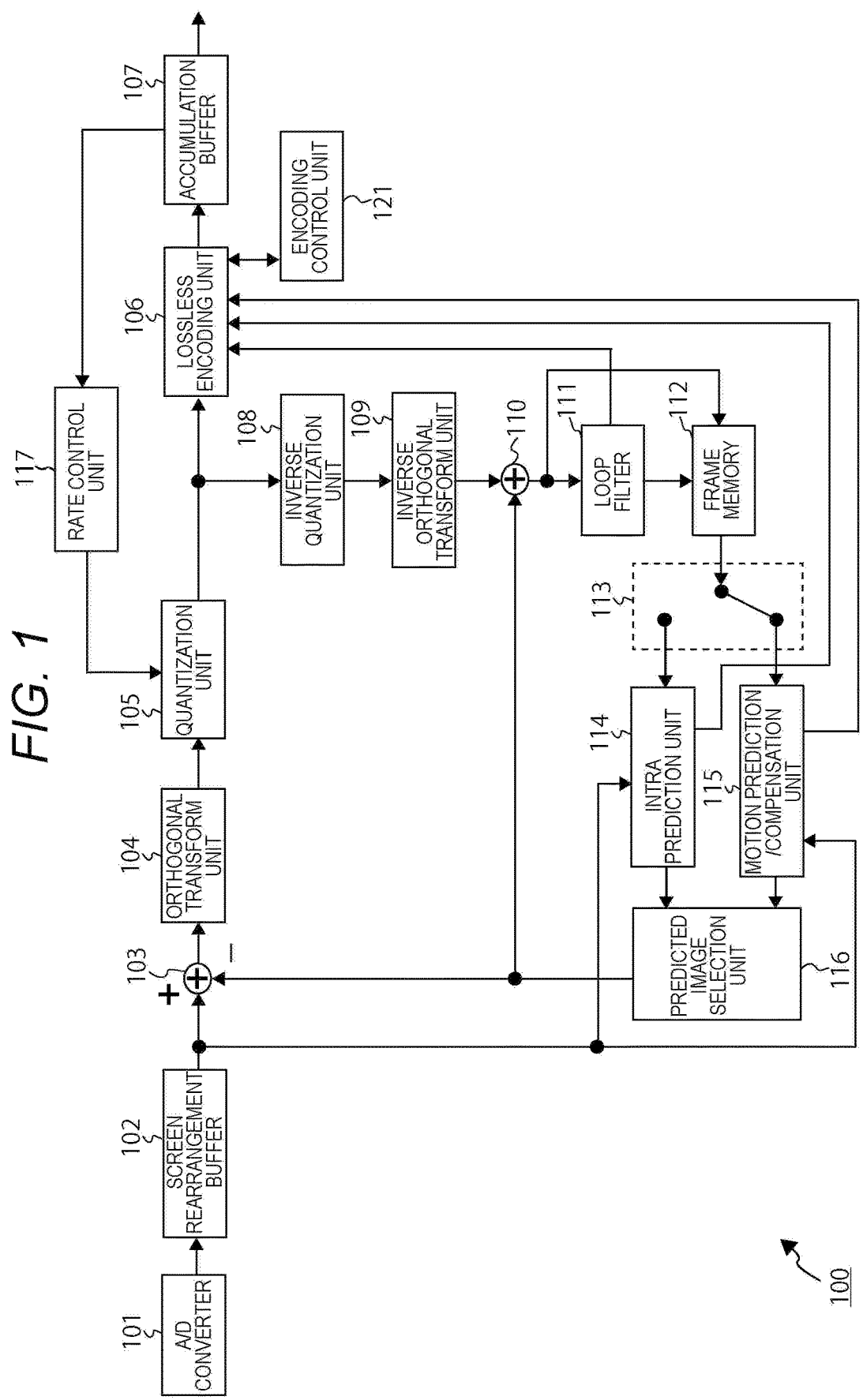
FIG. 1 is a block diagram illustrating a typical example structure of an image encoding device.

FIG. 1 is a block diagram illustrating a typical example structure of an image encoding device.

An image encoding device 100 illustrated in FIG. 1 encodes image data using a prediction operation similar to H.264 and MPEG (Moving Picture Experts Group) 4 Part 10 (AVC (Advanced Video Coding)) encoding standards.

As illustrated in FIG. 1, the image encoding device 100 includes an A/D converter 101, a screen rearrangement buffer 102, an arithmetic operation unit 103, an orthogonal transform unit 104, a quantization unit 105, a lossless encoding unit 106 and an accumulation buffer 107. Further, the image encoding device 100 includes an inverse quantization unit 108, an inverse orthogonal transform unit 109, an arithmetic operation unit 110, a loop filter 111, a frame memory 112, a selection unit 113, an intra prediction unit 114, a motion prediction/compensation unit 115, a predicted image selection unit 116, and a rate control unit 117.

The image encoding device 100 further includes an encoding control unit 121.

The A/D converter 101 performs an A/D conversion on an input image data, and supplies and stores the converted image data (digital data) into the screen rearrangement buffer 102. The screen rearrangement buffer 102 rearranges the frames of the image stored in displaying order, so that the frames of the image are arranged in encoding order in accordance with the GOP (Group of Pictures) structure, and supplies the rearranged frame-based image to the arithmetic operation unit 103. Further, the screen rearrangement buffer 102 also supplies the rearranged frame-based image to the intra prediction unit 114 and the motion prediction/compensation unit 115.

The arithmetic operation unit 103 subtracts a predicted image supplied from the intra prediction unit 114 or the motion prediction/compensation unit 115 through the predicted image selection unit 116 from the image read from the screen rearrangement buffer 102, and outputs this difference information to the orthogonal transform unit 104.

In case of an image to be subjected to inter encoding, the arithmetic operation unit 103 subtracts a predicted image supplied from the motion prediction/compensation unit 115 from the image read from the screen rearrangement buffer 102.

The orthogonal transform unit 104 performs an orthogonal transform such as a discrete cosine transform or a Karhunen Loeve transform on the difference information supplied from the arithmetic operation unit 103. In addition, this orthogonal transform method is arbitrary. The orthogonal transform unit 104 supplies the transform coefficient to the quantization unit 105.

The quantization unit 105 quantizes the transform coefficient supplied from the orthogonal transform unit 104. The quantization unit 105 sets a quantization parameter based on information related to a target value of the bit rate supplied from the rate control unit 117, and performs quantization. In addition, this quantization method is arbitrary. The quantization unit 105 supplies the quantized transform coefficient to the lossless encoding unit 106.

The lossless encoding unit 106 encodes the transform coefficient quantized by the quantization unit 105 according to an arbitrary encoding standard. Coefficient data is quantized under control by the rate control unit 117, and this bit rate becomes the target value set by the rate control unit 117 (or approximates the target value).

Further, the lossless encoding unit 106 obtains information indicating an intra prediction mode from the intra prediction unit 114, and information indicating an inter prediction mode and motion vector information from the motion prediction/compensation unit 115. Furthermore, the lossless encoding unit 106 obtains, for example, a filter coefficient used by the loop filter 111.

The lossless encoding unit 106 encodes various pieces of information according to an arbitrary encoding standard (multiplexed) as part of header information of encoded data. The lossless encoding unit 106 supplies and stores encoded data obtained by encoding into the accumulation buffer 107.

The encoding standard of the lossless encoding unit 106 is, for example, variable-length coding or arithmetic coding. Variable coding is, for example, CAVLC (Context-Adaptive Variable Length Coding) defined by, for example, a H.264/AVC standard. Arithmetic coding is, for example, CABAC (Context-Adaptive Binary Arithmetic Coding).

The accumulation buffer 107 temporarily stores the encoded data supplied from the lossless encoding unit 106. The accumulation buffer 107 supplies the stored encoded data to, for example, a subsequent recording device (recording medium) or a channel which is not illustrated, at a predetermined timing.

Further, the quantized coefficient quantized by the quantization unit 105 is also supplied to the inverse quantization unit 108. The inverse quantization unit 108 inversely quantizes the quantized transform coefficient according to a method which supports quantization by the quantization unit 105. This inverse quantization method may be any method as long as this method supports quantization processing of the quantization unit 105. The inverse quantization unit 108 supplies the obtained transform coefficient to the inverse orthogonal transform unit 109.

The inverse orthogonal transform unit 109 performs an inverse orthogonal transform on the transform coefficient supplied from the inverse quantization unit 108 according to a method which supports an orthogonal transform operation of the orthogonal transform unit 104. This inverse orthogonal transform method may be any method as long as the method supports an orthogonal transform operation of the orthogonal transform unit 104. An output (restored difference information) subjected to an inverse orthogonal transform is supplied to the arithmetic operation unit 110.

The arithmetic operation unit 110 adds a predicted image supplied from the intra prediction unit 114 or the motion prediction/compensation unit 115 through the predicted image selection unit 116, to the inverse orthogonal transform result supplied from the inverse orthogonal transform unit 109, that is, the restored difference information, and obtains a locally decoded image (decoded image). This decoded image is supplied to the loop filter 111 or the frame memory 112.

The loop filter 111 includes, for example, a deblocking filter or an adaptive loop filter, and adequately performs a filtering operation on a decoded image supplied from the arithmetic operation unit 110. For example, the loop filter 111 performs a deblocking filtering operation on the decoded image to remove block distortions. Further, for example, the loop filter 111 performs a loop filtering operation on this deblocking filtering operation result (a decoded image from which block distortions are removed) using a wiener filter to improve image quality.

In addition, the loop filter 111 may perform an arbitrary filtering operation on a decoded image. Further, when necessary, the loop filter 111 can supply information such as a filter coefficient used for a filtering operation, to the lossless encoding unit 106, and encode this information.

The loop filter 111 supplies the filtering operation result (the decoded image subjected to the filtering operation) to the frame memory 112. In addition, as described above, the decoded image output from the arithmetic operation unit 110 can be supplied to the frame memory 112 without the loop filter 111. That is, the filtering operation of the loop filter 111 can be skipped.

The frame memory 112 stores the supplied decoded image, and supplies the stored decoded image to the selection unit 113 as a reference image at a predetermined timing.

The selection unit 113 selects a supply destination of the reference image supplied from the frame memory 112. In case of, for example, inter prediction, the selection unit 113 supplies the reference image supplied from the frame memory 112, to the motion prediction/compensation unit 115.

Using a pixel value in an operation target picture which is the reference image supplied from the frame memory 112 through the selection unit 113, the intra prediction unit 114 performs intra prediction (intra-screen prediction) of generating a predicted image basically in processing units of a prediction unit (PU). The intra prediction unit 114 performs this intra prediction in a plurality of modes (intra prediction mode) prepared in advance.

The intra prediction unit 114 generates predicted images in all candidate intra prediction modes, evaluates a cost function value of each predicted image using an input image supplied from the screen rearrangement buffer 102, and selects an optimal mode. When selecting the optimal intra prediction mode, the intra prediction unit 114 supplies the predicted image generated in this optimal mode, to the predicted image selection unit 116.

Further, as described above, the intra prediction unit 114 adequately supplies and encodes, for example, intra prediction mode information which indicates the adopted intra prediction mode, to the lossless encoding unit 106.

The motion prediction/compensation unit 115 performs motion prediction (inter prediction) basically in processing units of a PU using the input image supplied from the screen rearrangement buffer 102 and the reference image supplied from the frame memory 112 through the selection unit 113, performs a motion compensation operation according to a detected motion vector and generates a predicted image (inter predicted image information). The motion prediction/compensation unit 115 performs this inter prediction in a plurality of modes (inter prediction mode) prepared in advance.

The motion prediction/compensation unit 115 generates predicted images in all candidate inter prediction modes, evaluates a cost function value of each predicted image and selects an optimal mode. When selecting the optimal inter prediction mode, the motion prediction/compensation unit 115 supplies the predicted image generated in this optimal mode to the predicted image selection unit 116.

Further, upon decoding of information which indicates the adopted inter prediction mode or encoded data, the motion prediction/compensation unit 115 supplies, for example, information which is required to perform processing in this inter prediction mode and supplies the information to the lossless encoding unit 106.

The predicted image selection unit 116 selects a supply source of the predicted image to be supplied to the arithmetic operation unit 103 and the arithmetic operation unit 110. In case of, for example, inter coding, the predicted image selection unit 116 selects the motion prediction/compensation unit 115 as the supply source of a predicted image, and supplies the predicted image supplied from this motion prediction/compensation unit 115 to the arithmetic operation unit 103 and the arithmetic operation unit 110.

Based on the bit rate of the encoded data stored in the accumulation buffer 107, the rate control unit 117 controls the quantization operation rate of the quantization unit 105 so as not to cause an overflow or underflow.

The encoding control unit 121 controls the encoding operation of the lossless encoding unit 106. In this case, the encoding control unit 121 determines whether or not to perform encoding in a merge mode. Upon this determination, the encoding control unit 121 sets a parameter of NumMergeCandidates used for this determination. NumMergeCandidates is a parameter related to a motion vector of surrounding regions which are positioned in a surrounding of an operation target relevant region and the motion vectors of which are likely to be referred to in the merge mode. Upon setting of this parameter, the encoding control unit 121 checks whether or not the surrounding regions are included in the same slice (relevant slice) as the relevant region in a picture (relevant picture) of an operation target divided into multiple slices.

That is, the encoding control unit 121 determines whether or not to enter the merge mode by taking into account whether the surrounding regions which are likely to be referred to in the merge mode are available or unavailable to control the encoding operation of the lossless encoding unit 106, and controls the merge mode based on this determination result. Further, the encoding control unit 121 controls the encoding operation for modes other than merge modes such as a skip mode, an intra prediction mode, an inter prediction mode and a direct mode.

The lossless encoding unit 106 performs a lossless encoding operation in a mode selected by the encoding control unit 121.

[Multiple Slices]

According to an image encoding standard such as MPEG2 or AVC, one picture is divided into a plurality of slices, and each slice can be processed in parallel (multiple slices).

Figure 2:
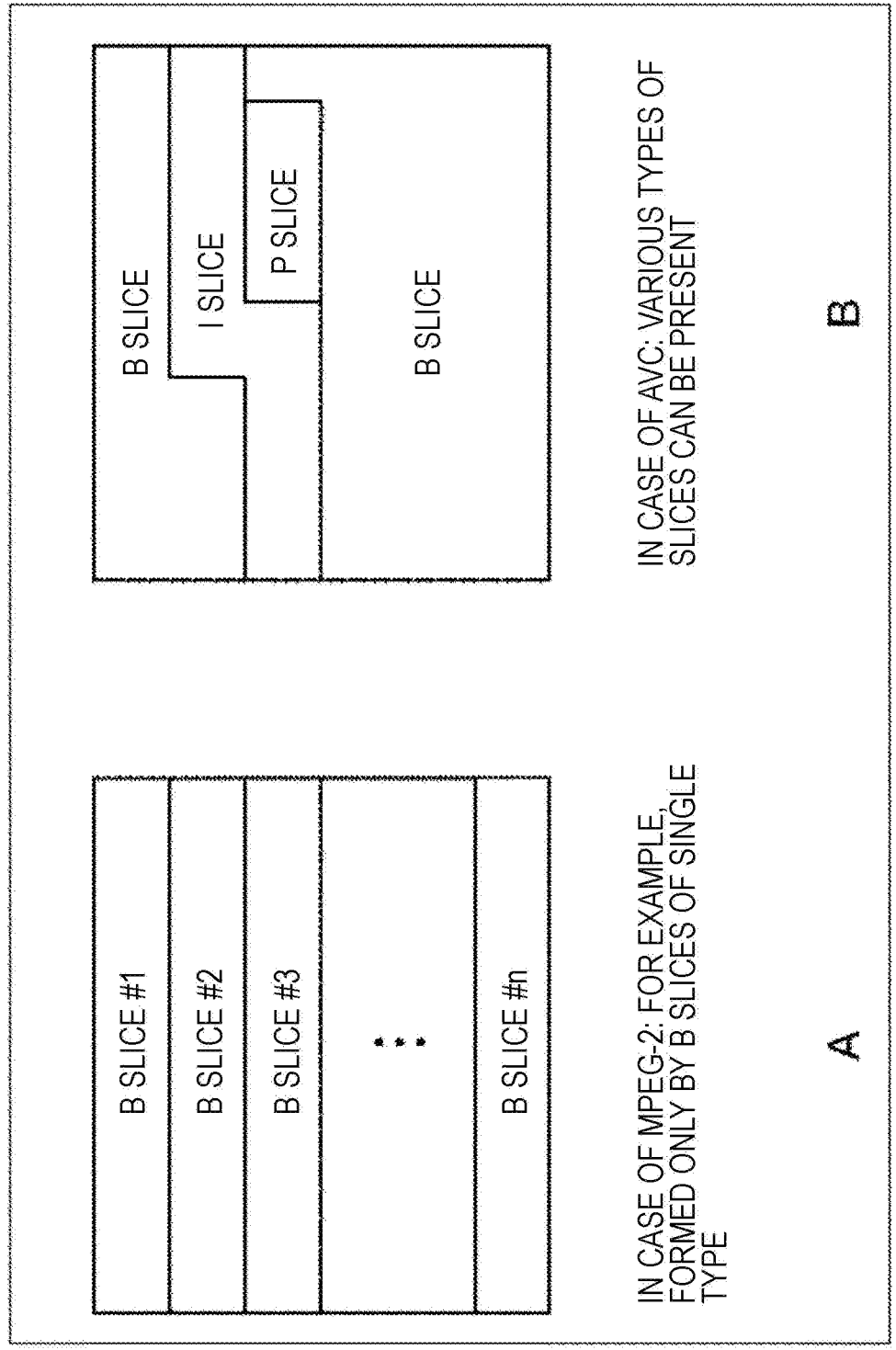
FIG. 2 is a view for explaining multiple slices.

In case of MPEG2, as indicated by an example A in FIG. 2, a maximum size of a slice is a one macro block line, and slices which form a B picture all need to be B slices.

By contrast with this, in case of AVC, as illustrated an example B in FIG. 2, a slice may be larger than one macro block line, a slice boundary may not be a right end (the right end in the screen) of the macro block line or a single picture may be configured with different types of slices.

In case of AVC, a deblocking filtering operation can be executed across slice boundaries. Meanwhile, an operation which uses neighboring information such as intra prediction, CABAC, CAVLC and motion vector prediction cannot be executed across slice boundaries.

In other words, each slice can be independently subjected to encoding operation, so that it is possible to divide one picture into a plurality of slices and encode each slice in parallel. That is, this slice division achieves reduction in an encoding operation time (a higher speed of the encoding operation).

[Coding Unit]

Meanwhile, according to the AVC encoding standard, a macro block or sub macro blocks obtained by dividing this macro block into a plurality of blocks are processing units of a prediction operation and an encoding operation. However, this standard which provides a macro block size of 16 pixels×16 pixels is not optimal to a large image frame such as UHD (Ultra High Definition; 4000 pixels×2000 pixels) which is a target next generation encoding standard.

At present, to achieve higher encoding efficiency than that of AVC, an encoding technique called HEVC (High Efficiency Video Coding) is being developed as a standard by JCTVC (Joint Collaboration Team—Video Coding), which is a joint standardization organization of ITU-T (International Telecommunication Union Telecommunication Standardization Sector) and ISO (International Organization for Standardization)/IEC (International Electrotechnical Commission).

Figure 3:
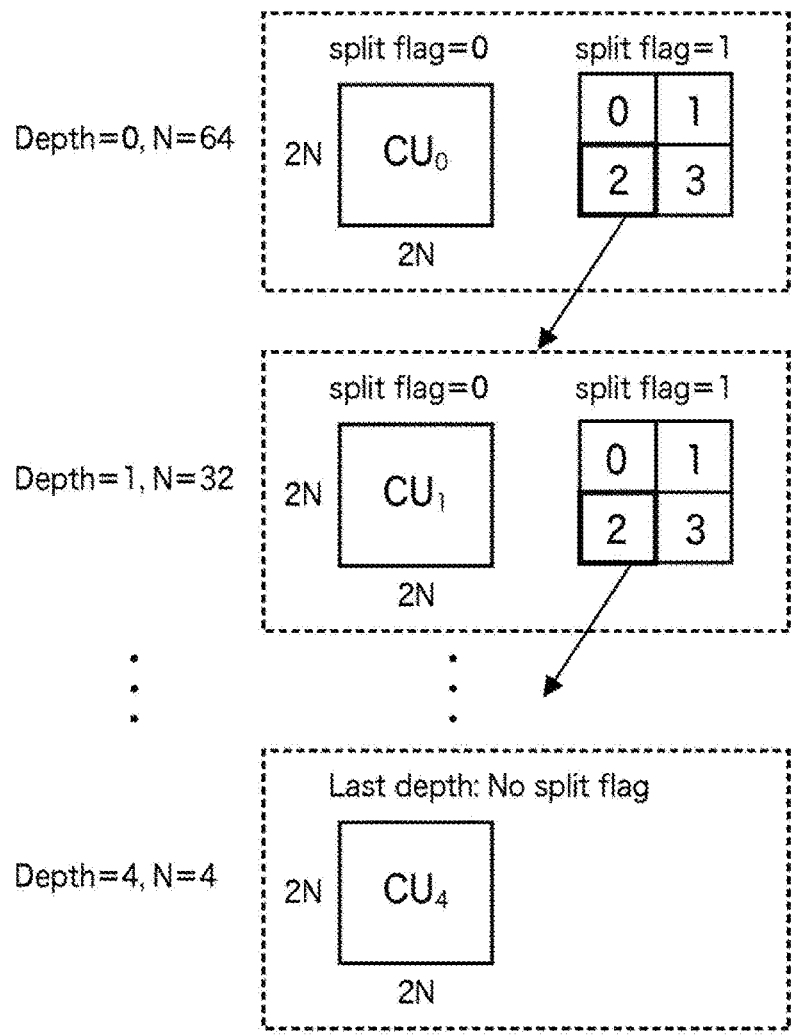
FIG. 3 is a view for explaining coding units.

While a hierarchical structure of a macro block and sub macro blocks is defined In AVC, a coding unit (CU) is defined in HEVC as illustrated in FIG. 3.

The CU is also referred to as a "Coding Tree Block (CTB)", and is a picture-based image portion region which plays the same role as that of the macro block in AVC. While the latter is fixed to the size of 16×16 pixels, the size of the former is not fixed and is specified in compressed image information in each sequence.

For example, in a sequence parameter set (SPS) included in encoded data which is an output, a maximum size (LCU (Largest Coding Unit)) and a minimum size (SCU (Smallest Coding Unit)) of the CU are defined.

Further, in each LCU, split-flag=1 is set within a range not lower than the SCU size, so that each LCU can be divided into CUs of a smaller size. In the example in FIG. 3, the size of LCU is 128, and a maximum hierarchy depth is 5. When a value of split flag is "1", the CU having a size of 2N×2N is divided into CUs having a size of N×N in one layer below.

Further, the CU is divided into prediction units (PU) which are regions (picture-based image portion regions) which are processing units of intra or inter prediction, and is divided into transform units (TU) which are regions (picture-based image portion regions) which are processing units of an orthogonal transform. At present, in HEVC, 16×16 and 32×32 orthogonal transform can be used in addition to 4×4 and 8×8 orthogonal transform.

Similar to above HEVC, in case of an encoding standard which defines a CU and performs various operations in the CU units, a macro block in AVC corresponds to a LCU. However, the CU adopts a hierarchical structure as illustrated in FIG. 3, and therefore the size of the LCU in the uppermost layer is generally set larger than the macro block of AVC, that is, set to 128×128 pixels.

The present disclosure is also applicable to encoding standards which use these CU, PU and TU instead of a macro block. That is, processing units for performing a prediction operation may be arbitrary regions. That is, an operation target region of the prediction operation (also referred to as a "relevant region" or a "region of interest") and surrounding regions which are regions positioned in a surrounding of this relevant region include not only these macro block and sub macro blocks but also, for example, CUs, PUs and TUs.

Figure 4:
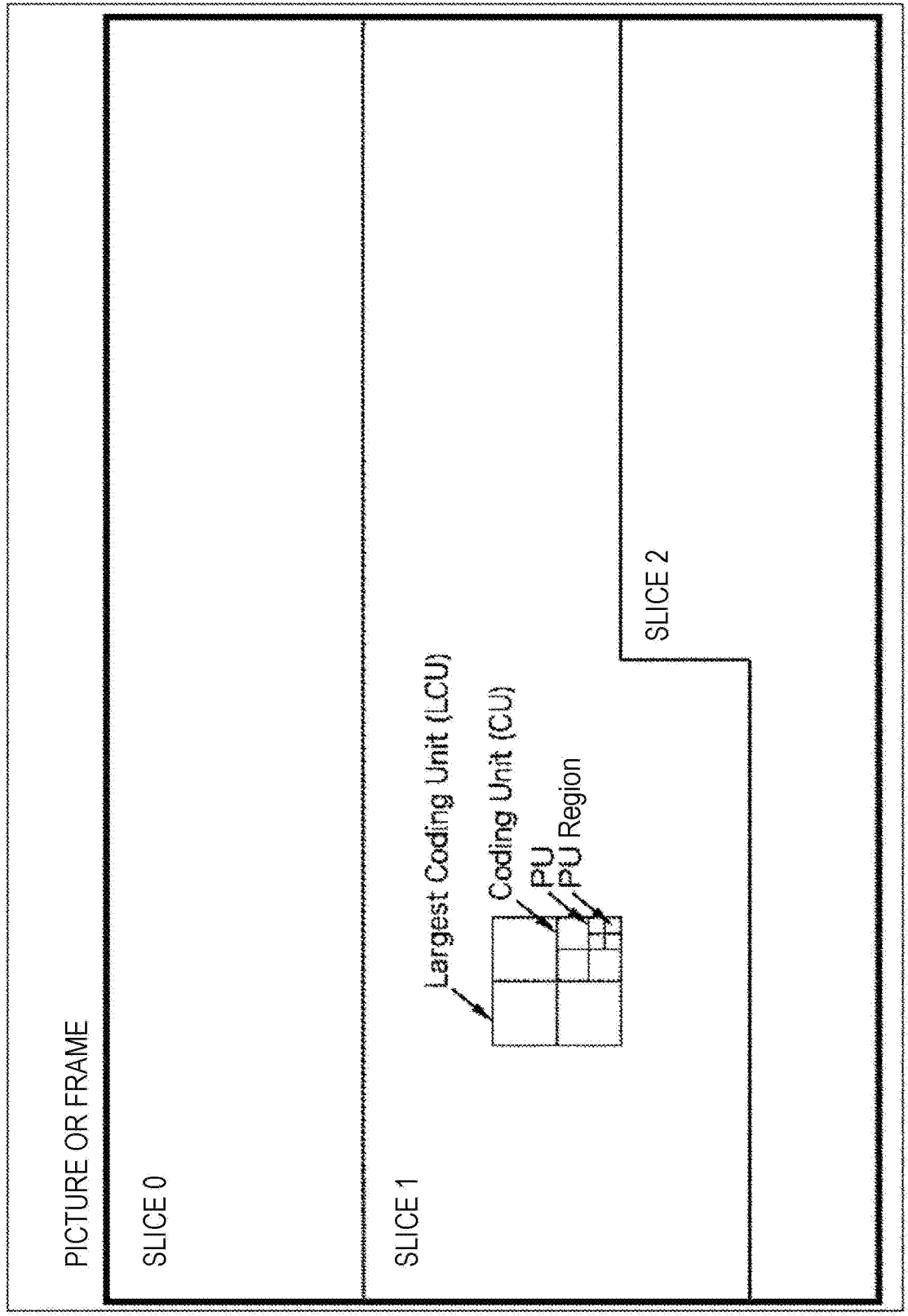
FIG. 4 is a view for explaining a relationship between a slice and a coding unit.

The above LCUs (CUs, PUs and TUs) are obtained by dividing a slice region into a plurality of slices, and belong to a lower layer of slices. That is, in case of multiple slices as described with reference to FIG. 2, the LCU is included in one of slices as illustrated in FIG. 4.

Figure 5:
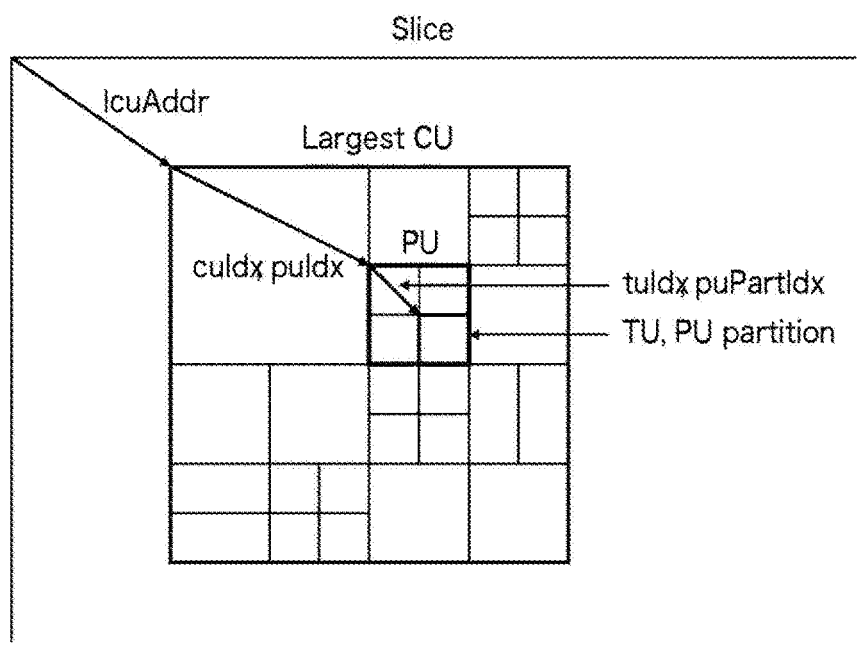
FIG. 5 is a view illustrating a relationship between a slice and a coding unit.

As illustrated in FIG. 5, a head address of the LCU is specified according to a relative position from each slice head. Identification information and a size are specified for each region (CU, PU and TU) in the LCU. That is, the position (for example, a head address) of each region can be specified from these pieces of information. Consequently, it is possible to easily specify positions of a relevant region and surrounding regions and a range of a relevant slice from these pieces of information. In other words, it is possible to easily specify whether or not the surrounding regions belong to the relevant slice (the surrounding regions are available or unavailable).

In addition, slice boundaries can also be set in PU units. That is, there may be a LUC positioned across a plurality of slices. Also in this case, a region (a region in prediction operation units) corresponding to each motion vector such as a PU is included in one of slices.

[Merge of Motion Partitions]

Figure 6:
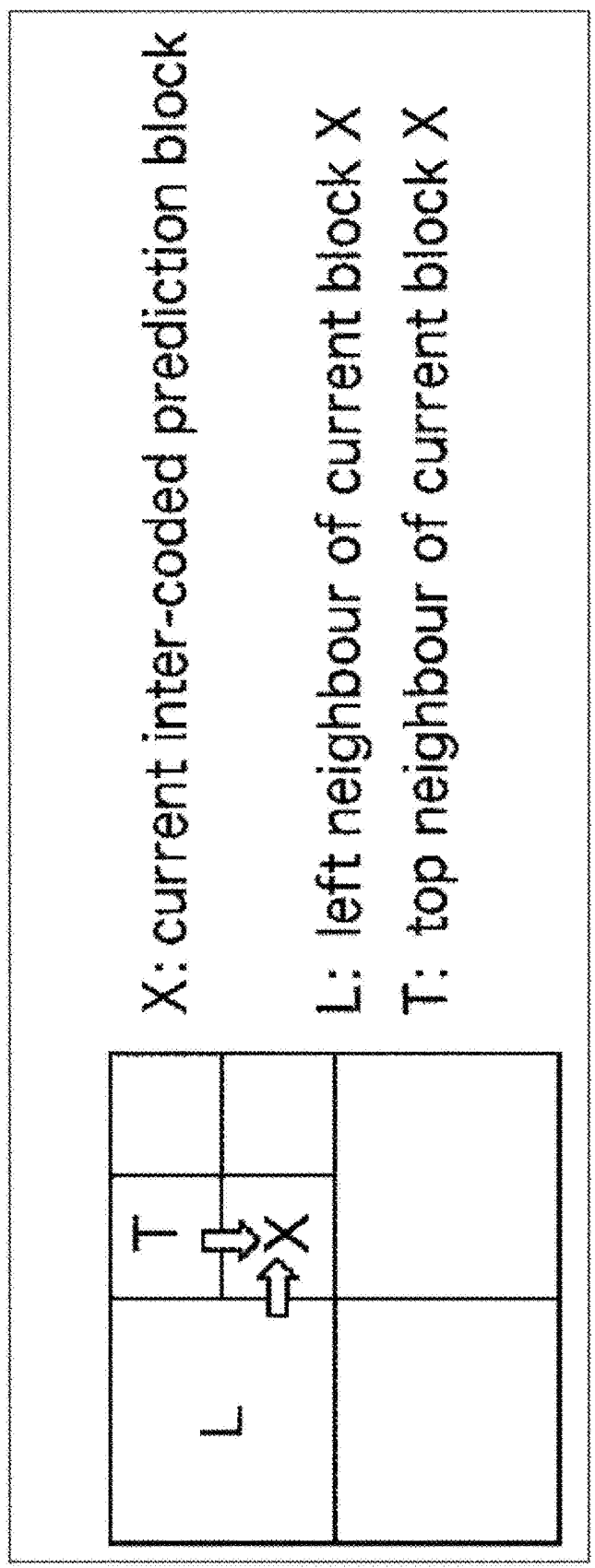
FIG. 6 is a view for explaining a merge mode.

As one of motion information encoding standards, a method (merge mode) called Motion Partition Merging is proposed as illustrated in FIG. 6. In this method, two flags of Merge_Flag and Merge_Left_Flag are transmitted as merge information which is information related to a merge mode.

Merge_Flag=1 indicates that motion information of a relevant region X is the same as motion information of a surrounding region T neighboring to and on an upper side of a relevant region or a surrounding region L on a left side of the relevant region. In this case, Merge_Left_Flag is included in merge information and is transmitted. Merge_Flag=0 indicates motion information of the relevant region X is different from both pieces of motion information of the surrounding region T and the surrounding region L. In this case, the motion information of the relevant region X is transmitted.

When the motion information of the relevant region X is the same as the motion information of the surrounding region L, Merge_Flag=1 and Merge_Left_Flag=1 hold. When the motion information of the relevant region X is the same as the motion information of the surrounding region T, Merge_Flag=1 and Merge_Left_Flag=0 hold.

[Merge Mode of Multiple Slices]

As described above, motion information of a surrounding region is referred to in the merge mode. However, in case of the above-described multiple slices, the surrounding region L and the surrounding region T which are likely to be referred to in the merge mode are likely to be positioned in different slices from the relevant region X.

FIGS. 7 to 10 illustrate examples of positional relationships between multiple slices and a relevant region in a merge mode.

Figure 7:
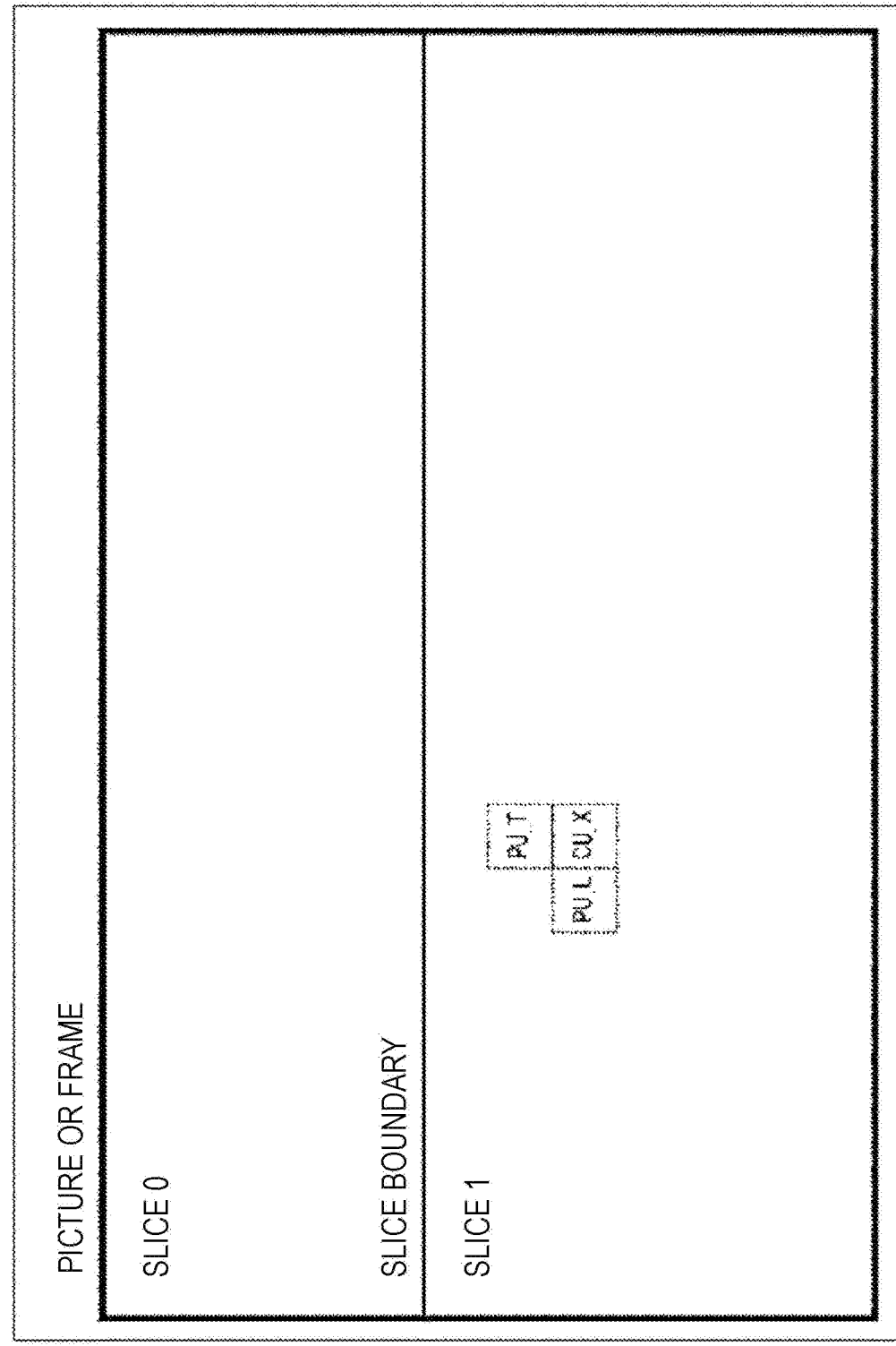
FIG. 7 is a view illustrating an example of positions of a relevant region of a merge mode and surrounding regions of multiple slices.

FIG. 7 illustrates that a relevant region (CU_X), a surrounding region (PU_T) neighboring to and on the upper side of the relevant region (CU_X) and a surrounding region (PU_L) neighboring to and on the left side of this relevant region (CU_X) are all positioned in one slice (slice 1) (belong to a relevant slice).

In this case, it is possible to refer to both of the surrounding region (PU_T) and the surrounding region (PU_L) (which means available).

Figure 8:
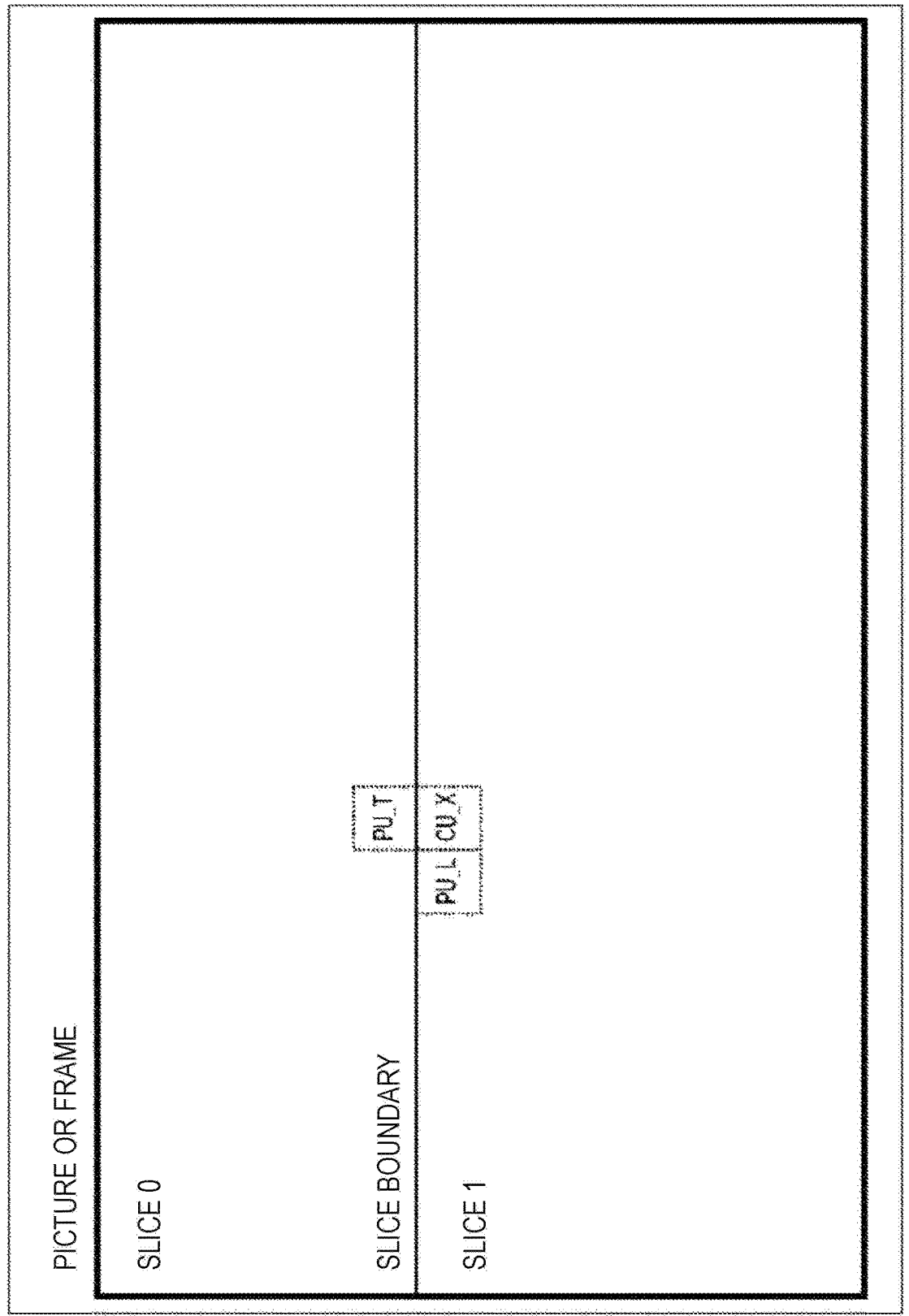
FIG. 8 is a view illustrating another example of positions of a relevant region of a merge mode and surrounding regions of multiple slices.

FIG. 8 illustrates that, while the relevant region (CU_X) and the surrounding region (PU_L) are positioned in the slice 1 (belong to the relevant slice), the surrounding region (PU_T) is positioned in a slice 0 (does not belong to the relevant slice).

In this case, while the surrounding region (PU_L) can be referred to (which means available), the surrounding region (PU_T) cannot be referred to (which means unavailable).

Figure 9:
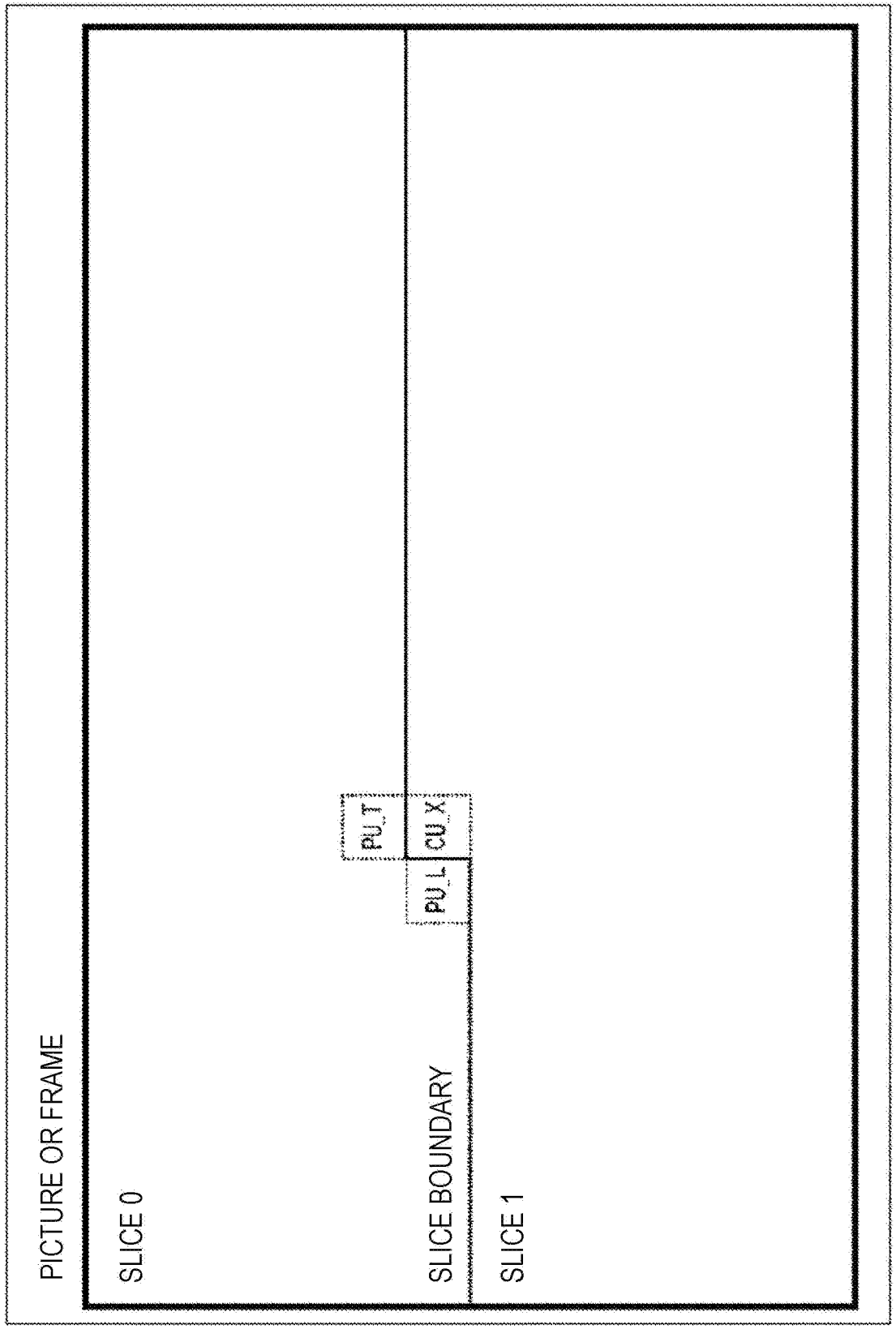
FIG. 9 is a view illustrating still another example of positions of a relevant region of a merge mode and surrounding regions of multiple slices.

FIG. 9 illustrates that, while the relevant region (CU_X) is positioned in the slice 1 (belongs to the relevant slice), the surrounding region (PU_T) and the surrounding region (PU_L) are positioned in a slice 0 (do not belong to the relevant slice).

In this case, it is not possible to refer to both of the surrounding region (PU_T) and the surrounding region (PU_L) (which means available).

Figure 10:
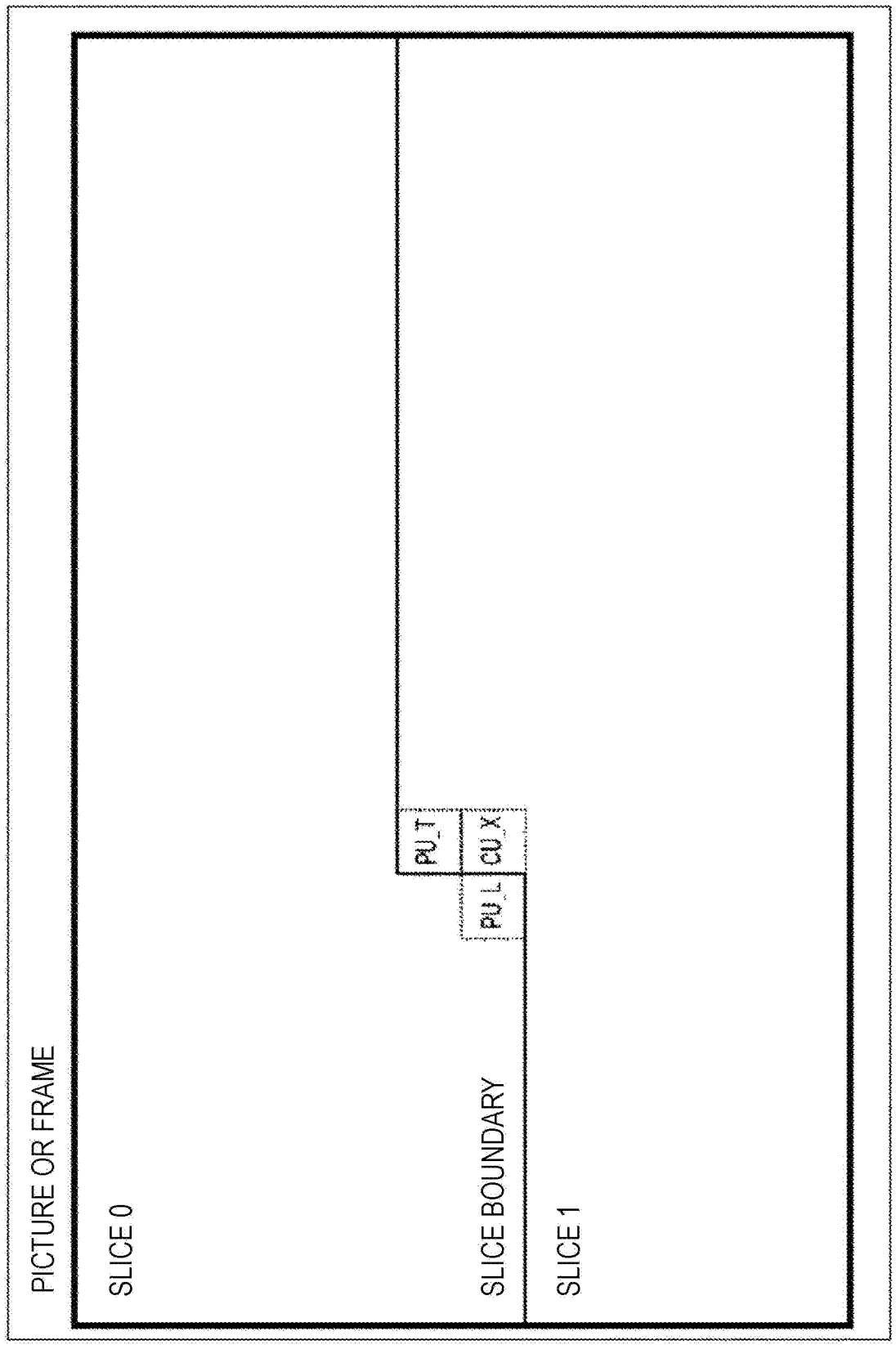
FIG. 10 is a view illustrating still another example of positions of a relevant region of a merge mode and surrounding regions of multiple slices.

FIG. 10 illustrates that, while the relevant region (CU_X) and the surrounding region (PU_T) are positioned in the slice 1 (belong to the relevant slice), the surrounding region (PU_L) is positioned in the slice 0 (does not belong to the relevant slice).

In this case, while the surrounding region (PU_L) can be referred to (which means available), the surrounding region (PU_T) cannot be referred to (which means unavailable).

In addition, the slice boundary includes a picture end in addition to an inter-slice boundary. What is important is whether or not surrounding regions are available, that is, whether or not the surrounding regions are included in a relevant slice. Hence, a state in which surrounding regions are unavailable include that the surrounding regions belong to another slice and that the surrounding regions do not exist (are positioned outside a picture).

In FIG. 6, when the surrounding region L and the surrounding region T are unavailable as described above, the operation of the relevant region X cannot be advanced until the operation of the surrounding region L and the surrounding region T is finished. Therefore, although the operation is performed in parallel per slice in case of multiple slices, surrounding regions are referred to, and there is a concern that therefore parallel operations become difficult and an operation time increases.

[Syntax]

Further, not only when motion information of a surrounding region is actually referred to in the merge mode but also when whether or not to adopt the merge mode is determined, motion information of a surrounding region is required.

FIG. 11 illustrates an example of CU syntaxes. FIG. 12 illustrates an example of PU syntaxes. Numbers at a left end in each row in FIGS. 11 and 12 are row numbers assigned for ease of description.

As indicated in, for example, a seventh row in FIG. 11 and a twelfth row in FIG. 12, a parameter value of NumMergeCandidates is used to determine whether or not to adopt the merge mode. This parameter indicates a count value (a total sum) of motion vectors of surrounding regions (candidate regions to be merged with a relevant region) which are likely to be merged with the relevant region in the merge mode.

The encoding control unit 121 in FIG. 1 regards that this NumMergeCandidates is larger than 0 as one of conditions to adopt the merge mode. That the value of NumMergeCandidates is 0 indicates that there is not even one region which includes motion information among candidate regions to be merged with the relevant region. In this case, merging cannot be performed, and therefore the encoding control unit 121 performs control to adopt a mode other than the merge mode.

In other words, when NumMergeCandidates is larger than 0, there is at least one region which includes motion information among candidate regions to be merged with the relevant region, and therefore the encoding control unit 121 determines other conditions related to the merge mode.

In order to accurately calculate this NumMergeCandidates, it is necessary to check motion information of all surrounding regions which are candidate regions to be merged with the relevant region. That is, upon determination as to whether or not to adopt the merge mode, this NumMergeCandidates is necessary, and it is necessary to refer to motion information of a surrounding region to calculate this value. Hence, as described above, when there is an unavailable surrounding region, there is a concern that parallel operations become difficult upon determination as to whether or not to adopt the merge mode and delay occurs,

[NumMergeCandidates Calculation of Encoding Control Unit]

Hence, the encoding control unit 121 only determines whether or not surrounding regions are present in a relevant slice includes motion vectors, and calculates NumMergeCandidates. That is, only when there are surrounding regions in the relevant slice and include motion vectors, the encoding control unit 121 counts these surrounding regions (increments NumMergeCandidates).

By so doing, first, it is not necessary to refer to motion vectors of surrounding regions which do not belong to the relevant slice to determine whether or not to adopt the merge mode. Further, the surrounding regions which do not belong to the relevant slice are removed from candidate regions to be merged with the relevant region. In other words, candidate regions to be merged with the relevant region are only surrounding regions which belong to the relevant region. Consequently, even when the merge mode is adopted, only the surrounding regions belonging to the relevant slice are merged with the relevant region, so that it is not necessary to refer to motion vectors of surrounding regions which do not belong to the relevant slice.

Consequently, the encoding control unit 121 and the lossless encoding unit 106 need to refer to only motion information in the relevant slice, and do not need to stand by until the operation of other slices is finished. Consequently, the image encoding device 100 can achieve parallelization of operations per slice, and suppress an increase in an operation time caused by occurrence of a delay time which is not necessary for operations related to the merge mode.

In addition, the encoding control unit 121 only needs to calculate NumMergeCandidates as described above and does not need to change a syntax. Consequently, development is easy, and there is not concern that the bit rate increases or versatility decreases.

In addition, the above-described slices only need to be processing units which are obtained by dividing a picture and can be processed in parallel. Hence, this slice includes, for example, entropy slices in addition to normal slices. Naturally, the shapes, the number and the positions of slices are arbitrary. That is, division positions and the number of division of pictures are arbitrary.

Further, although the slice 1 is the relevant slice, the same applies even when whichever slice is the relevant slice. For example, in the example in FIG. 4, the same also applies when regions in a slice 0 and a slice 2 are relevant regions.

In addition, as described above, even when a surrounding region is not present at a left end or an upper end of a picture, the encoding control unit 121 skips reference to a motion vector of this surrounding region and does not increment NumMergeCandidates similar to a case that the surrounding region is present in another slice.

[Lossless Encoding Unit and Encoding Control Unit]

Figure 13:
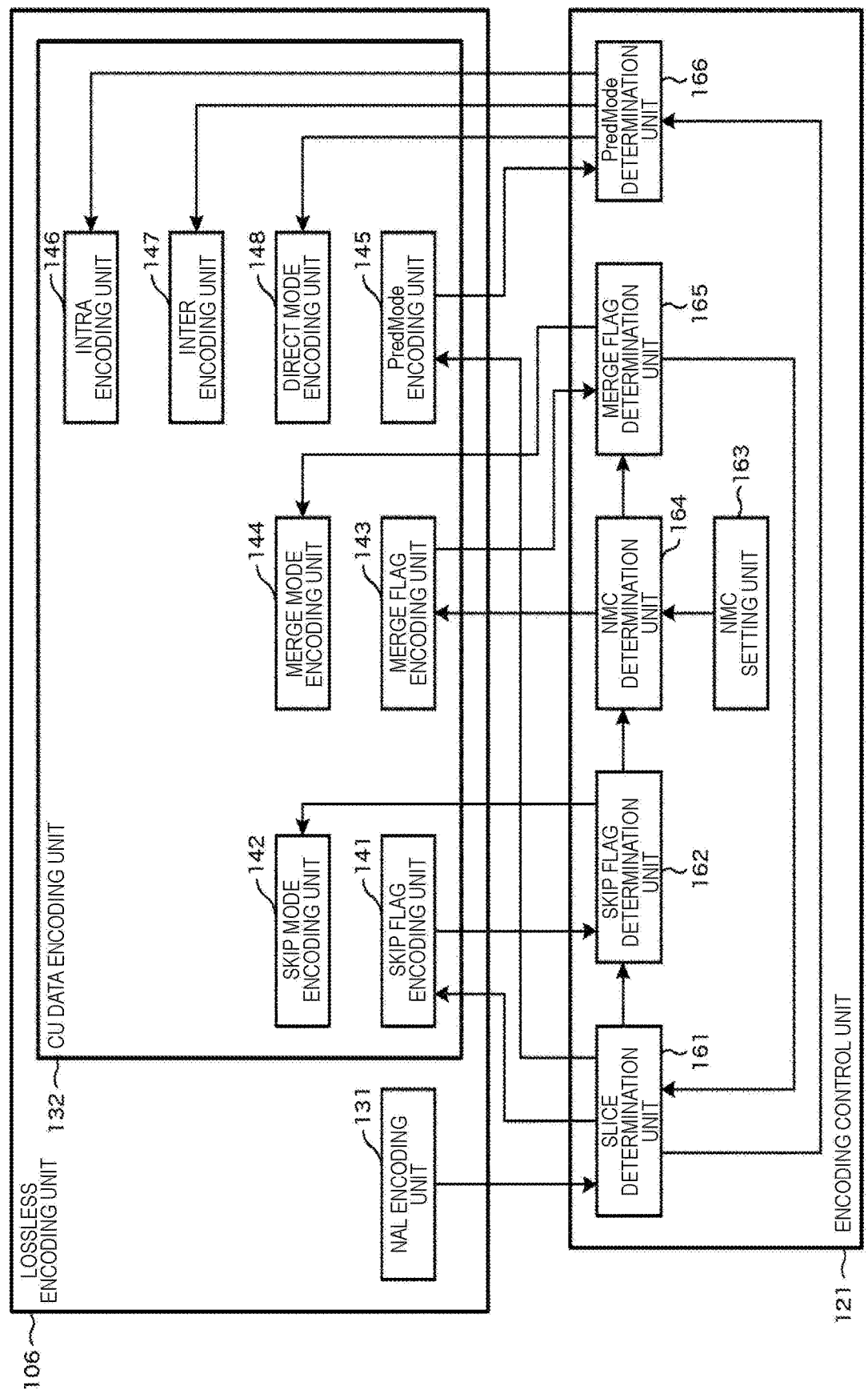
FIG. 13 is a block diagram illustrating a typical example structure of a lossless coding unit and an encoding control unit.

FIG. 13 is a block diagram illustrating a typical example structure of the lossless encoding unit 106 and the encoding control unit 121.

As illustrated in FIG. 13, the lossless encoding unit 106 has a NAL (Network Abstraction Layer) encoding unit 131 and a CU data encoding unit 132.

The NAL encoding unit 131 encodes NAL data such as a sequence parameter set (SPS), a picture parameter set (PPS) and a slice header. The CU data encoding unit 132 encodes data (VCL (Video Coding Layer)) of a layer of a CU or below.

The CU data encoding unit 132 has a skip flag encoding unit 141, a skip mode encoding unit 142, a merge flag encoding unit 143 and a merge mode encoding unit 144. Further, the CU data encoding unit 132 has a PredMode encoding unit 145, an intra encoding unit 146, an inter encoding unit 147 and a direct mode encoding unit 148.

The skip flag encoding unit 141 generates and encodes a skip flag indicating whether or not to adopt a skip mode under control of the encoding control unit 121. The skip mode encoding unit 142 performs the encoding operation in a skip mode under control of the encoding control unit 121.

The merge flag encoding unit 143 generates and encodes a merge flag (MergeFlag) indicating whether or not to adopt the merge mode under control of the encoding control unit 121. The merge mode encoding unit 144 performs the encoding operation in the merge mode under control of the encoding control unit 121.

The PredMode encoding unit 145 encodes PredMode which is a parameter indicating a prediction mode under control of the encoding control unit 121. The intra encoding unit 146 performs an operation related to encoding of a difference image generated using intra prediction under control of the encoding control unit 121. The inter encoding unit 147 performs an operation related to encoding of a difference image generated using inter prediction under control of the encoding control unit 121. The direct mode encoding unit 148 performs an operation related to encoding of a difference image generated using a direct mode under control of the encoding control unit 121.

Further, as illustrated in FIG. 13, the encoding control unit 121 has a slice determination unit 161, a skip flag determination unit 162, an NMC (NumMergeCandidates) setting unit 163, an NMC determination unit 164, a merge flag determination unit 165 and a PredMode determination unit 166.

The slice determination unit 161 determines a type of a relevant slice, and supplies this determination result to the skip flag encoding unit 141, and the PredMode encoding unit 145 or the skip flag determination unit 162. The skip flag determination unit 162 determines a value (or the presence) of the skip flag which is generated (or is not generated) by the skip flag encoding unit 141, and supplies the determination result to the skip mode encoding unit 142 or the NMC determination unit 164.

The NMC setting unit 163 calculates (sets) a value of the parameter NumMergeCandidates, and supplies this value to the NMC determination unit 164. The NMC determination unit 164 determines a value of NumMergeCandidates, and supplies this determination result to the merge flag encoding unit 143 or the merge flag determination unit 165.

The merge flag determination unit 165 determines a value (or the presence) of the merge flag which is generated (or which is not generated) by the merge flag encoding unit 143, and supplies this determination result to the merge mode encoding unit 144 or the slice determination unit 161.

The PredMode determination unit 166 determines a value (or the presence) of PredMode which is generated (or which is not generated) by the PredMode encoding unit 145, and supplies this determination result to the intra encoding unit 146, the inter encoding unit 147 or the direct mode encoding unit 148.

[NMC Setting Unit]

Figure 14:
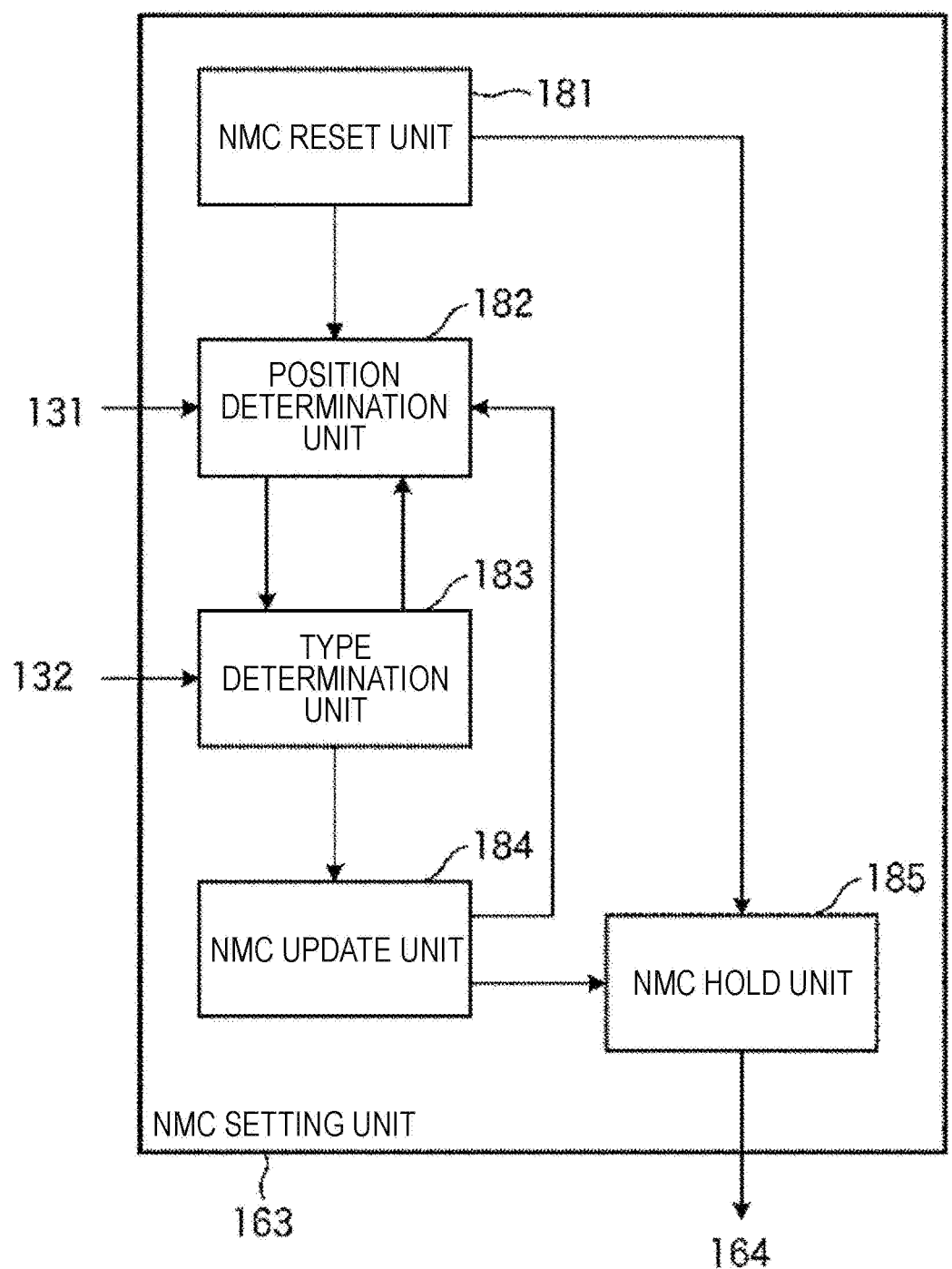
FIG. 14 is a block diagram illustrating a typical example structure of an NMC setting unit.

FIG. 14 is a block diagram illustrating a typical example structure of the NMC setting unit 163.

As illustrated in FIG. 14, the NMC setting unit 163 has an NMC reset unit 181, a position determination unit 182, a type determination unit 183, an NMC update unit 184 and an NMC hold unit 185.

The NMC reset unit 181 resets a value of the parameter NumMergeCandidates held in the NMC hold unit 185, to 0.

When receiving a notice of reset from the NMC reset unit 181, receiving a notice of update of a value of NumMergeCandidates from the NMC update unit 184 or obtaining a determination result from the type determination unit 183, the position determination unit 182 obtains information related to slices and positions of the relevant region X from the NAL encoding unit 131, calculates the position of the relevant region X, calculates the positions of the surrounding region T and the surrounding region L from the position of this relevant region X and determines whether or not there are these regions in a relevant slice. The position determination unit 182 supplies this determination result to the type determination unit 183.

When obtaining the determination result from the position determination unit 182, the type determination unit 183 determines prediction types of the surrounding region L and the surrounding region T present in the relevant slice from the CU data encoding unit 132. That is, the type determination unit 183 determines whether or not the surrounding region L or the surrounding region T includes motion information. The type determination unit 183 supplies this determination result to the position determination unit 182 or the NMC update unit 184.

When obtaining the determination result from the type determination unit 183, the NMC update unit 184 increments (+1) the value of the parameter NumMergeCandidates held in the NMC hold unit 185. That is, when a surrounding region positioned in the relevant slice includes motion information, the NMC update unit 184 increments (+1) a value of the parameter NumMergeCandidates held in the NMC hold unit 185.

The NMC hold unit 185 supplies the value of the held parameter NumMergeCandidates to the NMC determination unit 164 at a predetermined timing or in response to a request from the NMC determination unit 164.

[Encoding Operation Flow]

Next, a flow of each operation executed by the above image encoding device 100 will be described. First, an encoding operation flow will be described with reference to a flowchart in FIG. 15.

In step S101, the A/D converter 101 performs an A/D conversion on an input image. In step S102, the screen rearrangement buffer 102 stores the image subjected to the A/D conversion, and rearranges the respective pictures in encoding order, instead of display order.

In step S103, the intra prediction unit 114 performs an intra prediction operation in an intra prediction mode. In step S104, the motion prediction/compensation unit 115 performs an inter motion prediction operation of performing motion prediction or motion compensation in an inter prediction mode.

In step S105, the predicted image selection unit 116 determines an optimal mode based on the respective cost function values output from the intra prediction unit 114 and the motion prediction/compensation unit 115. That is, the predicted image selection unit 116 selects one of the predicted image generated by the intra prediction unit 114 and the predicted image generated by the motion prediction/compensation unit 115.

In step S106, the arithmetic operation unit 103 calculates a difference between the image rearranged by the operation in step S102 and the predicted image selected by the operation in step S105. The amount of difference data is reduced compared to original image data. Consequently, it is possible to compress the amount of data compared to data obtained by encoding an image as is.

In step S107, the orthogonal transform unit 104 performs an orthogonal transform on difference information generated by the operation in step S106. Specifically, orthogonal transforms such as discrete cosine transforms or Karhunen-Loeve transforms are performed, and a transform coefficient is output.

In step S108, the quantization unit 105 quantizes the orthogonal transform coefficient obtained by the operation in step S107.

The difference information quantized by the operation in step S108 is locally decoded as follows. That is, in step S109, the inverse quantization unit 108 inversely quantizes the orthogonal transform coefficient (also referred to as a "quantization coefficient") generated by the operation in step S108 according to performance matching performance of the quantization unit 105. In step S110, the inverse orthogonal transform unit 109 performs an inverse orthogonal transform on the orthogonal transform coefficient obtained by the operation in step S107 according to performance matching the performance of the orthogonal transform unit 104.

In step S111, the arithmetic operation unit 110 adds the predicted image to the locally decoded difference information, and generates the locally decoded image (an image corresponding to an input to the arithmetic operation unit 103). In step S112, the loop filter 111 adequately performs a loop filtering operation including a deblocking filtering operation and an adaptive loop filtering operation on the locally decoded image obtained by the operation in step S111.

In step S113, the frame memory 112 stores the decoded subjected to the loop filtering operation by the operation in step S112. In addition, the frame memory 112 also receives a supply of the image which is not subjected to the filtering operation by the loop filter 111 from the arithmetic operation unit 110, and stores the image.

In step S114, the lossless encoding unit 106 encodes the transform coefficient quantized by the operation in step S108. That is, lossless encoding such as variable-length encoding or arithmetic encoding is performed on the difference image.

In addition, the lossless encoding unit 106 encodes the quantization parameter calculated in step S108, and adds the quantization parameter to the encoded data. Further, the lossless encoding unit 106 encodes information related to a prediction mode of the predicted image selected by the operation in step S105, and adds the information to the encoded data obtained by encoding the difference image. That is, the lossless encoding unit 106 also encodes optimal intra prediction mode information supplied from the intra prediction unit 114 or information matching the optimal inter prediction mode supplied from the motion prediction/compensation unit 115, and adds the information to the encoded data.

In step S115, the accumulation buffer 107 stores the encoded data obtained by the operation in step S114. The encoded data stored in the accumulation buffer 107 is adequately read, and is transmitted to a decoding side through a channel or a recording medium.

In step S116, based on the bit rate (generated bit rate) of the encoded data stored in the accumulation buffer 107 by the operation in step S115, the rate control unit 117 controls the quantization operation rate of the quantization unit 105 so as not to cause an overflow or underflow.

When the operation in step S116 is finished, the encoding operation is finished.

In addition, in step S114, the lossless encoding unit 106 performs the encoding operation under control of the encoding control unit 121.

[Lossless Encoding Operation Flow]

Figure 15:
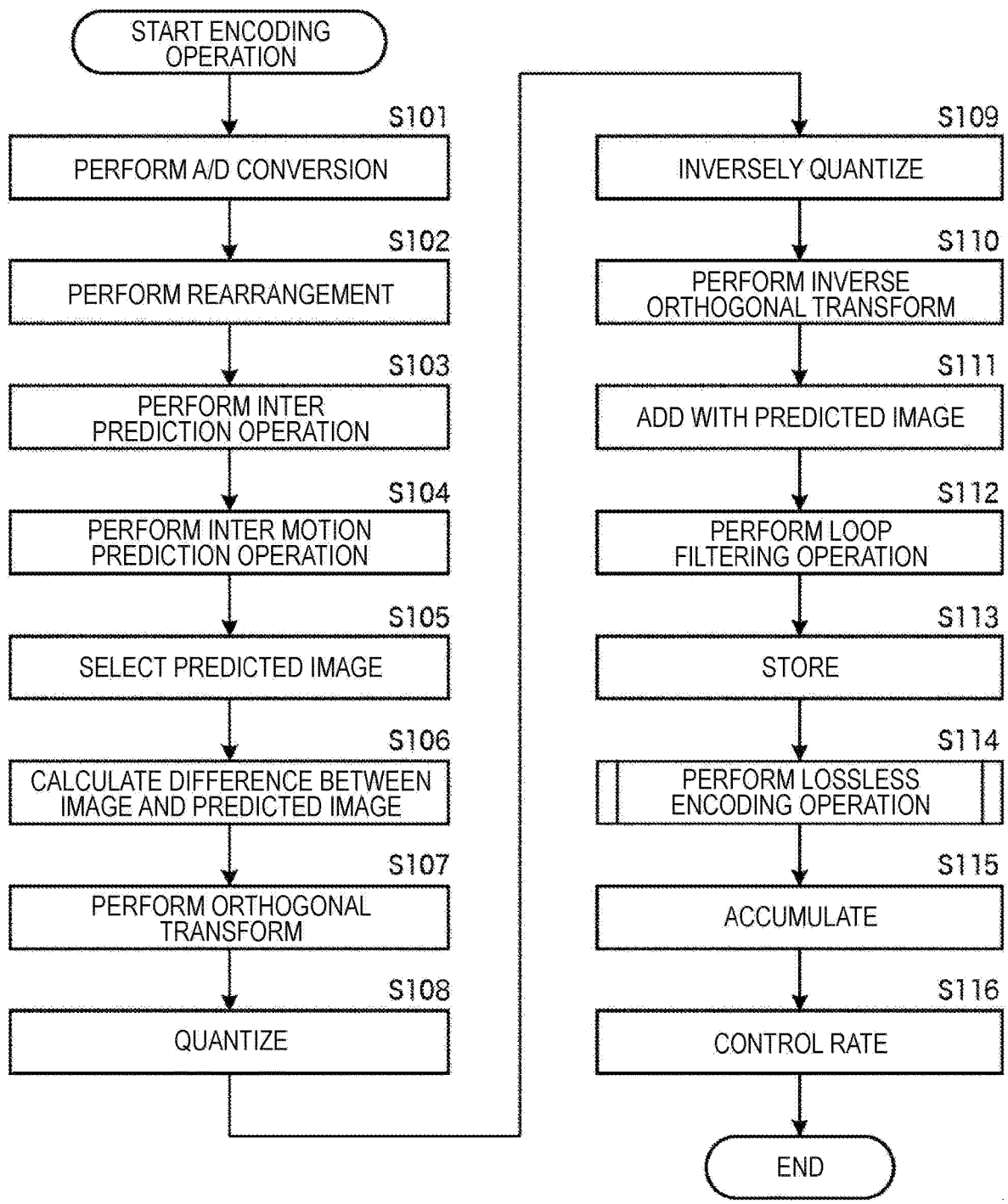
FIG. 15 is a flowchart for explaining an example of an encoding operation flow.
Figure 16:
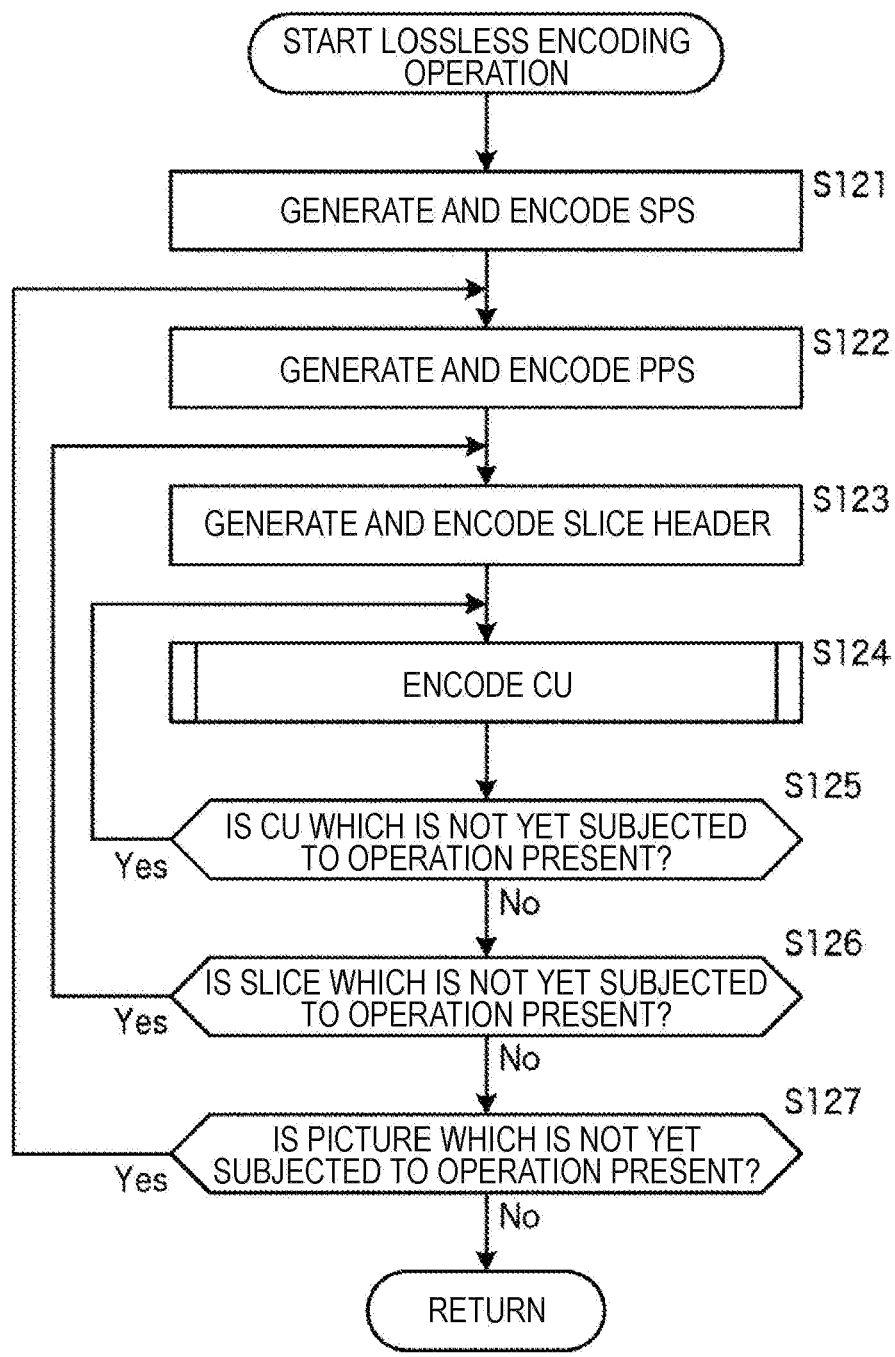
FIG. 16 is a flowchart for explaining an example of a lossless encoding operation flow.

Next, an example of a lossless encoding operation flow executed in step S114 in FIG. 15 will be described with reference to the flowchart in FIG. 16. As illustrated in FIG. 16, the lossless encoding operation is performed per layer of an image.

That is, the NAL encoding unit 131 generates and encodes a SPS in step S121, generates and encodes a PPS in step S122 and generates and encodes a slice header in step S123. In step S124, the CU data encoding unit 132 encodes a relevant CU of an operation target.

The CU data encoding unit 132 repeats the operation in step S124 for all CUs in a relevant slice of an operation target. In step S125, when it is determined that there is not a CU which is not yet subjected to the operation in the relevant slice, the CU data encoding unit 132 moves the operation to step S126.

The NAL encoding unit 131 repeats the operations in these steps S123 to S125 for all slices in a relevant picture of an operation target. In step S126, when it is determined that there is not a slice which is not yet subjected to the operation in the relevant picture, the NAL encoding unit 131 moves the operation to step S127.

The NAL encoding unit 131 repeats the operation in step S122 to S126 for all pictures in a relevant sequence of the operation target. In step S127, when it is determined that there is not a picture which is not yet subjected to the operation in the relevant sequence, the NAL encoding unit 131 finishes lossless encoding operation, and returns the operation to FIG. 15.

[CU Encoding Operation Flow]

Next, an example of a CU encoding operation flow executed in step S124 in FIG. 16 will be described with reference to the flowchart in FIGS. 17 and 18.

When the CU encoding operation is started, in step S131, the slice determination unit 161 determines a type of a relevant slice based on the NAL data generated by the NAL encoding unit 131, and determines whether or not the relevant slice is an I slice. Only when the relevant slice is not the I slice (a P slice or a B slice), the skip flag encoding unit 141 generates and encodes a skip flag in step S132.

In step S133, when the skip flag determination unit 162 determines that a value of the skip flag is 1, the skip mode encoding unit 142 which obtains the determination result from the skip flag determination unit 162 encodes CU data in the skip mode in step S134. When encoding is finished, the CU encoding operation is finished, and the operation is returned to FIG. 16.

Figure 17:
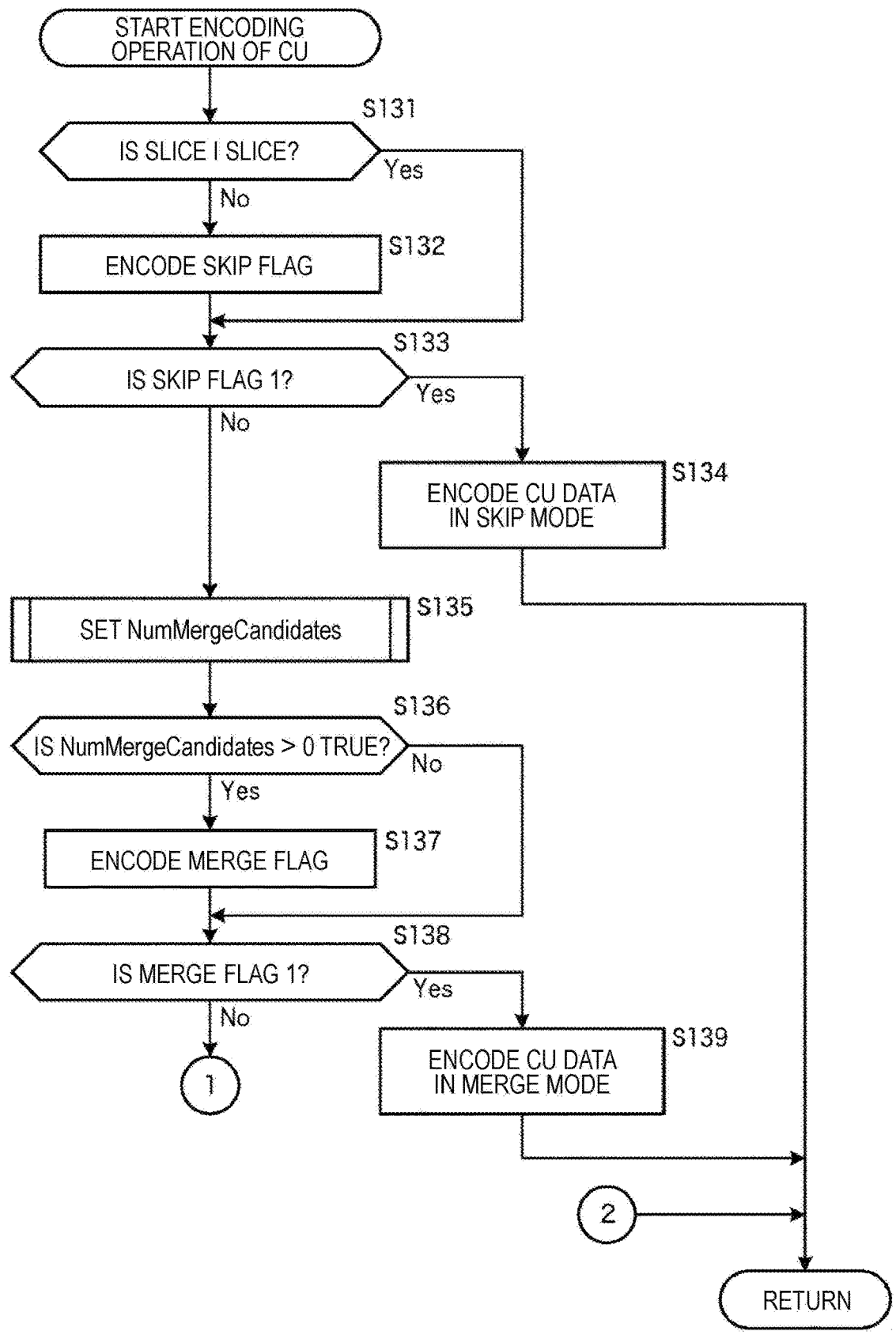
FIG. 17 is a flowchart for explaining an example of a CU encoding operation flow.

Further, in step S133 in FIG. 17, when the skip flag determination unit 162 determines that the value of the skip flag is 0 or a skip flag is not present, the skip flag determination unit 162 moves the operation to step S135. In this case, encoding in the skip mode is not performed.

In step S135, the NMC setting unit 163 sets NumMergeCandidates.

In step S136, only when the NMC determination unit 164 determines that the value of NumMergeCandidates set in step S135 is greater than 0, the merge flag encoding unit 143 generates and encodes a merge flag in step S137.

In step S138, when the merge flag determination unit 165 determines the value of the merge flag is 1, the merge mode encoding unit 144 which obtains this determination result from the merge flag determination unit 165 encodes CU data in the merge mode in step S139. When encoding is finished, the CU encoding operation is finished, and the operation is returned to FIG. 16.

Figure 18:
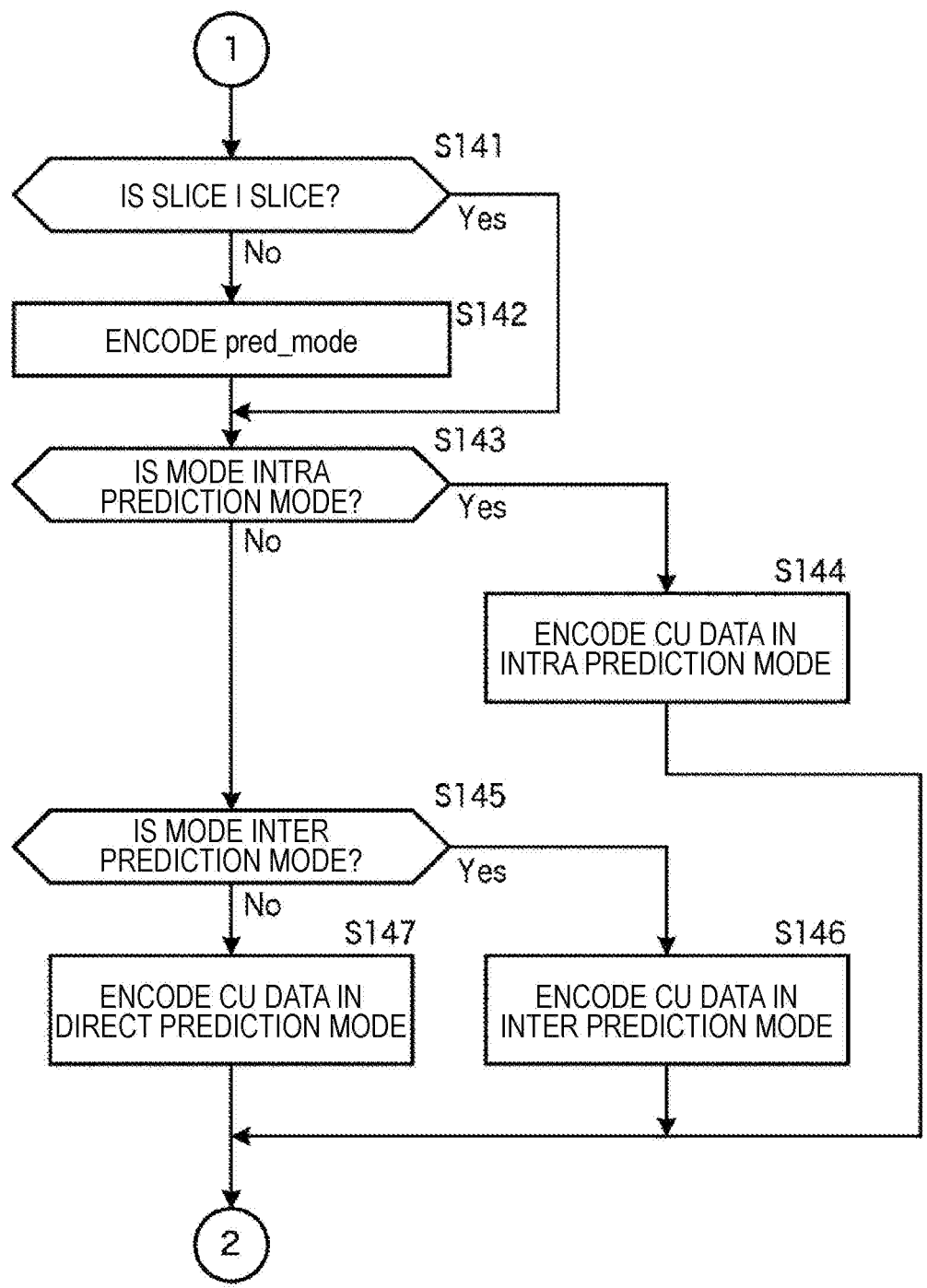
FIG. 18 is a flowchart for explaining an example of the CU encoding operation flow subsequent to FIG. 17.

Further, in step S138 in FIG. 17, when the merge flag determination unit 165 determines that the value of the merge flag is 0 or a merge flag is not present, the operation moves to the flowchart in FIG. 18, and encoding matching the adopted prediction mode is performed.

That is, only when the slice determination unit 161 determines that the relevant slice of an operation target is not the I slice in step S141 in FIG. 18, the PredMode encoding unit 145 generates and encodes pred_mode which is a parameter indicating a prediction mode type of the relevant slice in step S142.

In step S143, when the PredMode determination unit 166 refers to PredMode and determines that the prediction mode of the relevant region is the intra prediction mode, the intra encoding unit 146 encodes CU data of the intra prediction mode in step S144. That is, for example, difference image information (quantized orthogonal transform coefficient) and information related to the intra prediction mode are encoded. When encoding is finished, the CU encoding operation is finished, and the operation is returned to FIG. 16.

Further, when the PredMode determination unit 166 determines the prediction mode of the relevant region is not the intra prediction mode but the inter prediction mode (step S143 and step S145), the inter encoding unit 147 encodes CU data of the inter prediction mode in step S146. That is, for example, difference image information (quantized orthogonal transform coefficient) and information related to the inter prediction mode are encoded. When encoding is finished, the CU encoding operation is finished, and the operation is returned to FIG. 16.

Further, when the PredMode determination unit 166 determines that the prediction mode of the relevant region is neither the intra prediction mode nor the inter prediction mode (step S143 and step S145), the direct mode encoding unit 148 encodes CU data of the direct prediction mode in step S147. When encoding is finished, the CU encoding operation is finished, and the operation is returned to FIG. 16.

[NumMergeCandidates Setting Operation Flow]

Figure 19:
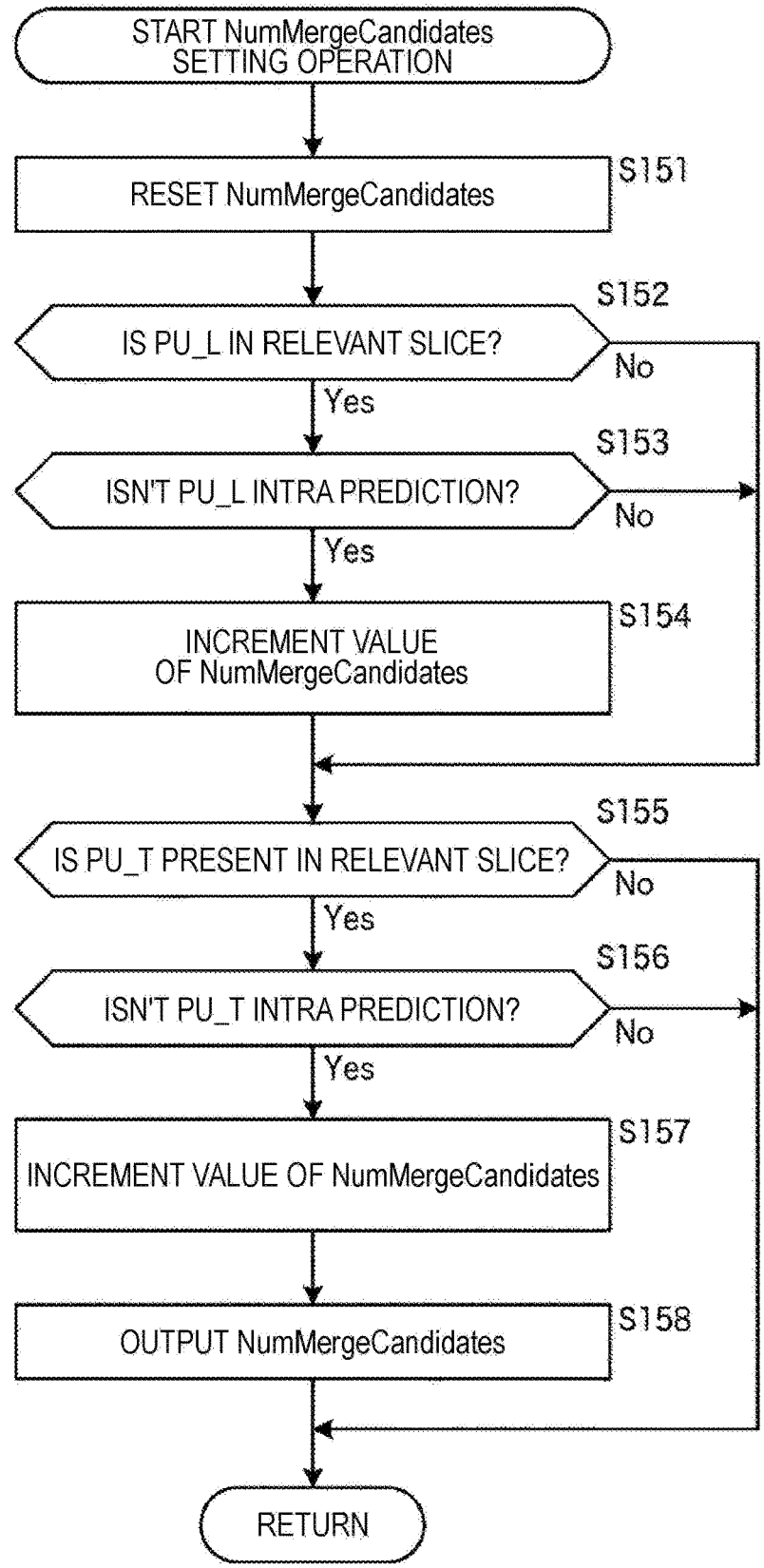
FIG. 19 is a flowchart for explaining an example of a NumMergeCandidates setting operation flow.

Next, an example of a NumMergeCandidates setting operation flow will be described with reference to the flowchart in FIG. 19.

When the NumMergeCandidates setting operation is started, in step S151, the NMC reset unit 181 resets a parameter NumMergeCandidates held in the NMC hold unit 185 to an initial value "0".

Only when the position determination unit 182 determines in step S152 that the surrounding region PU_L is present in the relevant slice and the type determination unit 183 determines in step S153 that the prediction mode of the surrounding region PU_L is not the intra prediction mode, the NMC update unit 184 increments (+1) the value of the parameter NumMergeCandidates held in the NMC hold unit 185 in step S154.

By contrast with this, when the position determination unit 182 determines in step S152 that the surrounding region PU_L is not present in the relevant slice or the type determination unit 183 determines in step S153 that the prediction mode of the surrounding region PU_L is intra prediction, the value of the parameter NumMergeCandidates is not incremented (+1).

The same operation is performed on the surrounding region PU_T (step S155 to step S157).

In step S158, the NMC hold unit 185 supplies the value of held NumMergeCandidates to the NMC determination unit 164. When the value of NumMergeCandidates is output, the NumMergeCandidates setting operation is finished, and the operation is returned to FIG. 17.

By performing various operations as described above, the image encoding device 100 can achieve parallelization of operations per slice, and suppress an increase in an operation time caused by occurrence of a delay time which is not necessary for operations related to the merge mode.

2. Second Embodiment

[Image Decoding Device]

Figure 20:
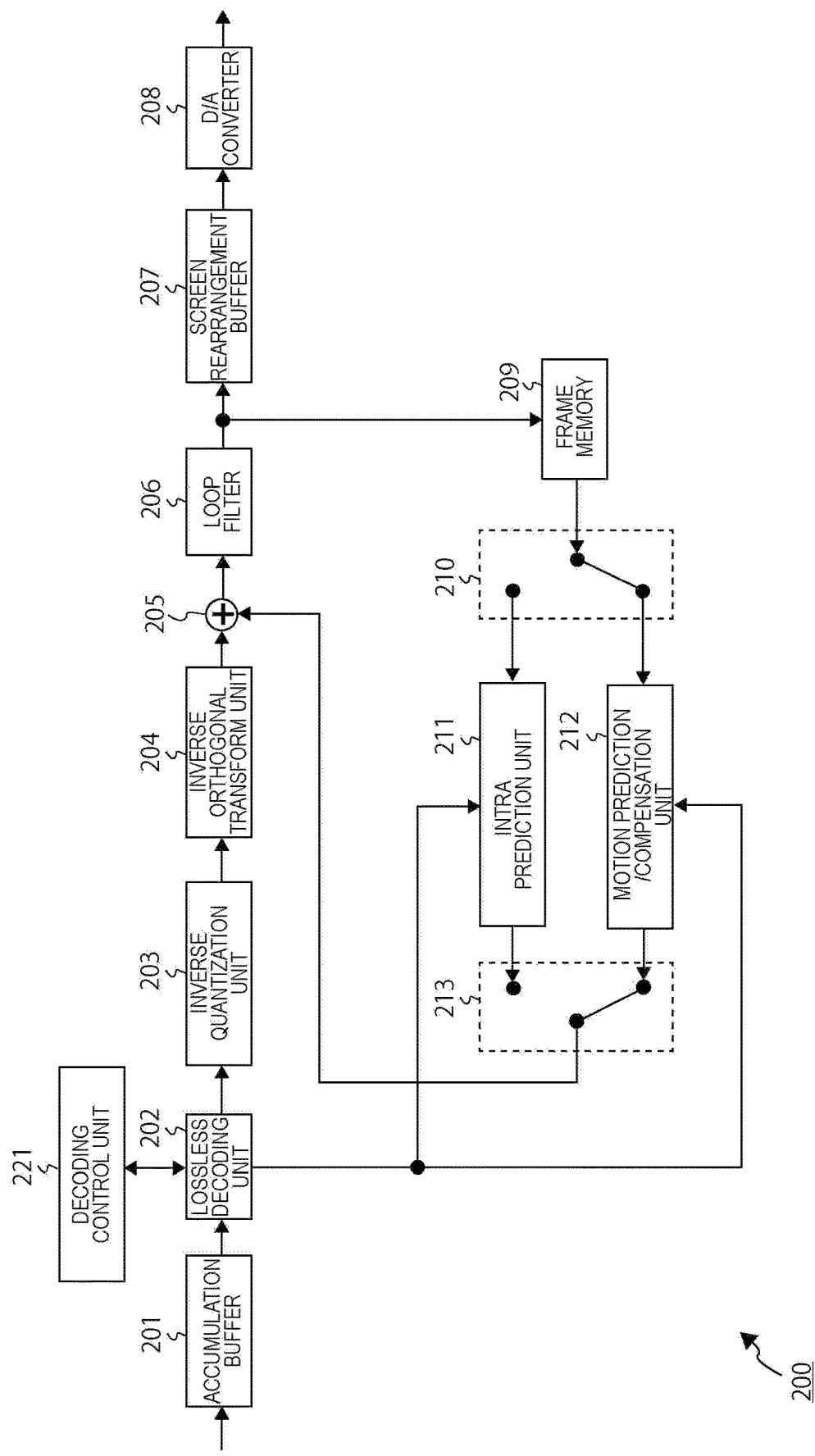
FIG. 20 is a block diagram illustrating a typical example structure of an image decoding device.

FIG. 20 is a block diagram illustrating a typical example structure of an image decoding device. An image decoding device 200 illustrated in FIG. 20 decodes encoded data generated by the image encoding device 100 according to a decoding method which supports an encoding method of the image encoding device. In addition, similar to the image encoding device 100, the image decoding device 200 performs (for example, prediction unit (PU)) a prediction operation per arbitrary region.

As illustrated in FIG. 20, the image decoding device 200 includes an accumulation buffer 201, a lossless decoding unit 202, an inverse quantization unit 203, an inverse orthogonal transform unit 204, an arithmetic operation unit 205, a loop filter 206, a screen rearrangement buffer 207 and a D/A converter 208. Further, the image decoding device 200 has a frame memory 209, a selection unit 210, an intra prediction unit 211, a motion prediction/compensation unit 212 and a selection unit 213.

Furthermore, the image decoding device 200 has a decoding control unit 221.

The accumulation buffer 201 stores the transmitted encoded data, and supplies this encoded data to the lossless decoding unit 202 at a predetermined timing. The lossless decoding unit 202 decodes information supplied from the accumulation buffer 201 and encoded by the lossless encoding unit 106 in FIG. 1 according to a standard which supports the encoding standard of the lossless encoding unit 106. The lossless decoding unit 202 supplies coefficient data obtained by quantizing a difference image resulting from decoding, to the inverse quantization unit 203.

Further, the lossless decoding unit 202 determines whether an intra prediction mode or an inter prediction mode is selected as an optimal prediction mode, and supplies information related to this optimal prediction mode to a mode of the intra prediction unit 211 or the motion prediction/compensation unit 212 which is determined to be selected. That is, when, for example, the inter prediction mode is selected as the optimal prediction mode in the image encoding device 100, information related to this optimal prediction is supplied to the motion prediction/compensation unit 212.

The inverse quantization unit 203 inversely quantizes coefficient data quantized obtained by decoding by the lossless decoding unit 202 according to the standard which supports a quantization standard of a quantization unit 105 in FIG. 1 and supplies the obtained coefficient data to the inverse orthogonal transform unit 204.

The inverse orthogonal transform unit 204 performs an inverse orthogonal transform on the coefficient data supplied from the inverse quantization unit 203 according to the standard which supports an orthogonal transform standard of an orthogonal transform unit 104 in FIG. 1. According to this inverse orthogonal transform operation, the inverse orthogonal transform unit 204 obtains decoded residual data corresponding to residual data which is not yet subjected to an orthogonal transform in the image encoding device 100.

The decoded residual data resulting from an inverse orthogonal transform is supplied to the arithmetic operation unit 205. Further, the arithmetic operation unit 205 receives a supply of a predicted image from the intra prediction unit 211 or the motion prediction/compensation unit 212 through the selection unit 213.

The arithmetic operation unit 205 adds this decoded residual data and the predicted image, and obtains decoded image data corresponding to image data from which the predicted image is not yet subtracted by an arithmetic operation unit 103 of the image encoding device 100. The arithmetic operation unit 205 supplies this decoded image data to the loop filter 206.

The loop filter 206 adequately performs a loop filtering operation including a deblocking filtering operation or an adaptive loop filtering operation on the supplied decoded image, and supplies this decoded image to the screen rearrangement buffer 207.

The loop filter 206 includes, for example, a deblocking filter or an adaptive filter, and adequately performs a filtering operation on the decoded image supplied from the arithmetic operation unit 205. For example, the loop filter 206 performs a deblocking filtering operation on the decoded image to remove block distortions. Further, for example, the loop filter 206 performs a loop filtering operation on this deblocking filtering operation result (a decoded image from which block distortions are removed) using a wiener filter to improve image quality.

In addition, the loop filter 206 may perform an arbitrary filtering operation on a decoded image. Further, the loop filter 206 may perform a filtering operation using a filtering coefficient supplied from the image encoding device 100 in FIG. 1.

The loop filter 206 supplies the filtering operation result (the decoded image subjected to a filtering operation) to the screen rearrangement buffer 207 and the frame memory 209. In addition, the decoded image output from the arithmetic operation unit 205 can be supplied to the screen rearrangement buffer 207 and the frame memory 209 without the loop filter 206. That is, the filtering operation of the loop filter 206 can be skipped.

The screen rearrangement buffer 207 performs image rearrangement. Specifically, the frame order rearranged in the order of encoding performed by a screen rearrangement buffer 102 of FIG. 1 is rearranged in the original display order. The D/A converter 208 performs a D/A conversion on the image supplied from the screen rearrangement buffer 207, and outputs the image to a display which is not illustrated to display the images.

The frame memory 209 stores the supplied decoded image, and supplies the stored decoded image to the selection unit 210 as a reference image at a predetermined timing or in response to a response from an outside such as the intra prediction unit 211 or the motion prediction/compensation unit 212.

The selection unit 210 selects a supply destination of the reference image supplied from the frame memory 209. When decoding the image subjected to intra encoding, the selection unit 210 supplies the reference image supplied from the frame memory 209 to the intra prediction unit 211. Further, when decoding the image subjected to inter encoding, the selection unit 210 supplies the reference image supplied from the frame memory 209 to the motion prediction/compensation unit 212.

The intra prediction unit 211 adequately receives a supply of, for example, information which is obtained by decoding header information and which indicates an intra prediction mode, from the lossless decoding unit 202. The intra prediction unit 211 performs intra prediction using the reference image obtained from the frame memory 209 in the intra prediction mode used in the intra prediction unit 114 in FIG. 1, and generates a predicted image. The intra prediction unit 211 supplies the generated predicted image to the selection unit 213.

The motion prediction/compensation unit 212 obtains information obtained by decoding the header information (code numbers of optimal prediction mode information, difference information and prediction motion vector information) from the lossless decoding unit 202.

The motion prediction/compensation unit 212 performs inter prediction using a reference image obtained from the frame memory 209 in the inter prediction mode used in a motion prediction/compensation unit 115 in FIG. 1, and generates a predicted image.

The decoding control unit 221 controls a decoding operation of the lossless decoding unit 202. The lossless decoding unit 202 basically performs the decoding operation according to a method which supports the lossless encoding unit 106 in FIG. 1, and therefore a control method of the decoding control unit 221 is basically the same as a control method of an encoding control unit 121 in FIG. 1. By coordinating the control method on the encoding side and the decoding side, the decoding control unit 221 can select a decoding method which supports the encoding method selected by the encoding control unit 121, and perform control such that decoding operation is accurately performed.

That is, the decoding control unit 221 determines whether or not to perform decoding in a merge mode. Upon this determination, the decoding control unit 221 sets a parameter of NumMergeCandidates. Upon setting of this parameter, the decoding control unit 221 checks whether or not the surrounding regions are included in a relevant slice as the relevant region in a relevant picture of multiple slices.

That is, the decoding control unit 221 determines whether or not to enter the merge mode by taking into account whether or not the surrounding regions which are likely to be referred to in the merge mode are available or unavailable to control the decoding operation of the lossless decoding unit 202, and controls the merge mode based on this determination result. Further, the decoding control unit 221 controls the decoding operation in modes other than the merge mode such as a skip mode, an intra prediction mode, an inter prediction mode and a direct mode.

The lossless decoding unit 202 performs the lossless decoding operation in a mode selected by the decoding control unit 221.

By so doing, the decoding control unit 221 and the lossless decoding unit 202 need to refer to only motion information in the relevant slice and, consequently, does not need to stand by until operations of other slices are finished. Consequently, the image decoding device 200 can achieve parallelization of operations per slice, and suppress an increase in an operation time caused by occurrence of a delay time which is not necessary for operations related to the merge mode.

[Lossless Decoding Unit and Decoding Control Unit]

Figure 21:
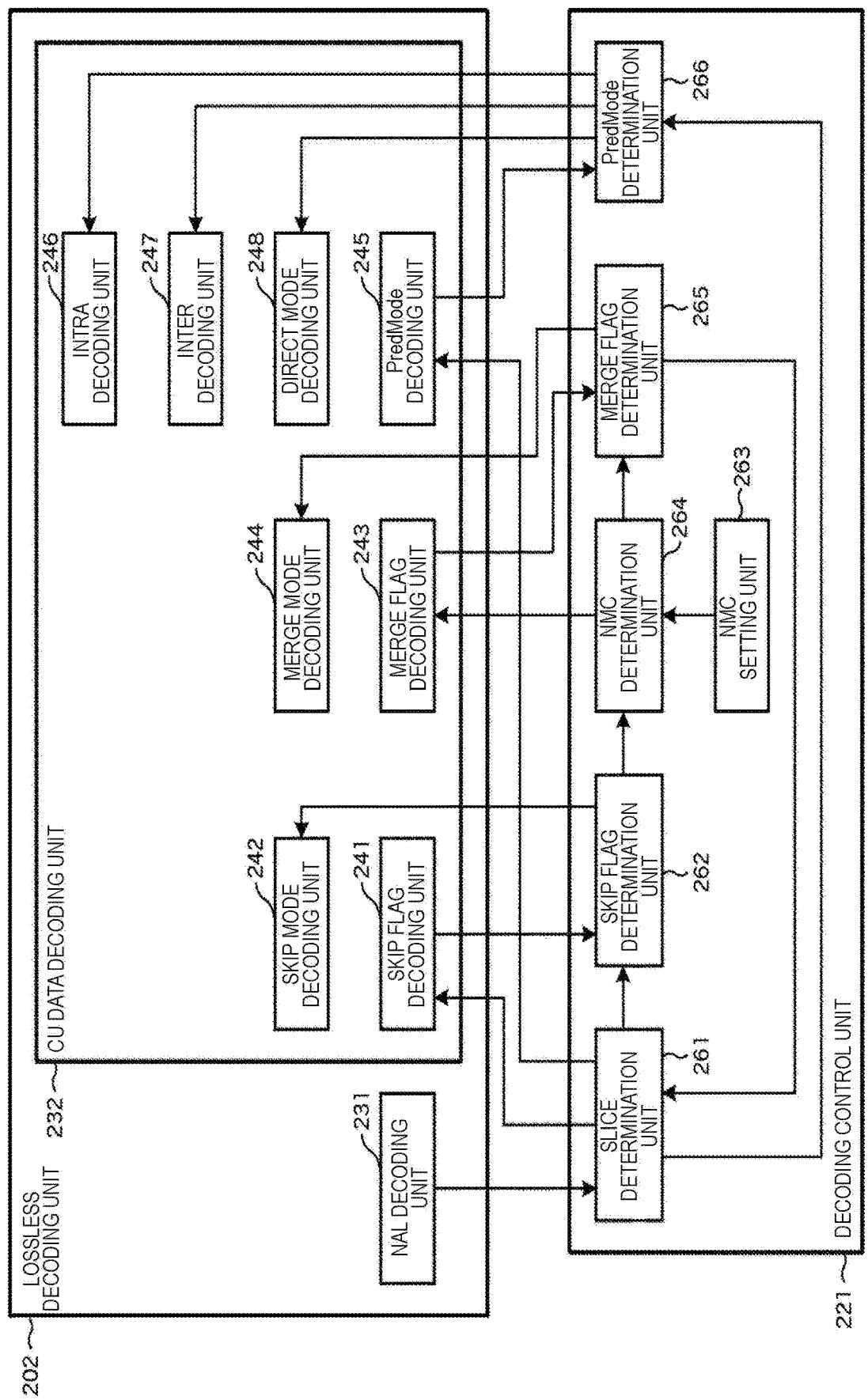
FIG. 21 is a block diagram illustrating a typical example structure of a lossless decoding unit and decoding unit.

FIG. 21 is a block diagram illustrating a typical example structure of the lossless decoding unit 202 and the decoding control unit 221.

As illustrated in FIG. 21, the lossless decoding unit 202 has a NAL decoding unit 231 and a CU data decoding unit 232.

The NAL decoding unit 231 decodes NAL data such as a sequence parameter set, a picture parameter set and a slice header. The CU data decoding unit 232 decodes encoded data in a layer of a CU or less.

The CU data decoding unit 232 has a skip flag decoding unit 241, a skip mode decoding unit 242, a merge flag decoding unit 243 and a merge mode decoding unit 244. Further, the CU data decoding unit 232 has a PredMode decoding unit 245, an intra decoding unit 246, an inter decoding unit 247 and a direct mode decoding unit 248.

The skip flag decoding unit 241 decodes a skip flag under control of the decoding control unit 221. The skip mode decoding unit 242 performs the decoding operation in the skip mode under control of the decoding control unit 221.

The merge flag decoding unit 243 decodes a merge flag (MergeFlag) under control of the decoding control unit 221. The merge mode decoding unit 244 performs the decoding operation in the merge mode under control of the decoding control unit 221.

The PredMode decoding unit 245 decodes PredMode under control of the decoding control unit 221. The intra decoding unit 246 performs an operation related to decoding of encoded data of a difference image generated using intra prediction under control of the decoding control unit 221. The inter decoding unit 247 performs an operation related to decoding of encoded data of a difference image generated using inter prediction under control of the decoding control unit 221. The direct mode decoding unit 248 performs an operation related to decoding of encoded data of a difference image generated using the direct mode under control of the decoding control unit 221.

Further, the decoding control unit 221 performs basically the same control as that of the encoding control unit 121. That is, as illustrated in FIG. 21, the decoding control unit 221 has a slice determination unit 261, a skip flag determination unit 262, an NMC setting unit 263, an NMC determination unit 264, a merge flag determination unit 265 and a PredMode determination unit 266.

The slice determination unit 261 to the PredMode determination unit 266 perform basically the same operation as those of the slice determination unit 261 to the PredMode determination unit 166 of the encoding control unit 121.

[NMC Setting Unit]

Figure 22:
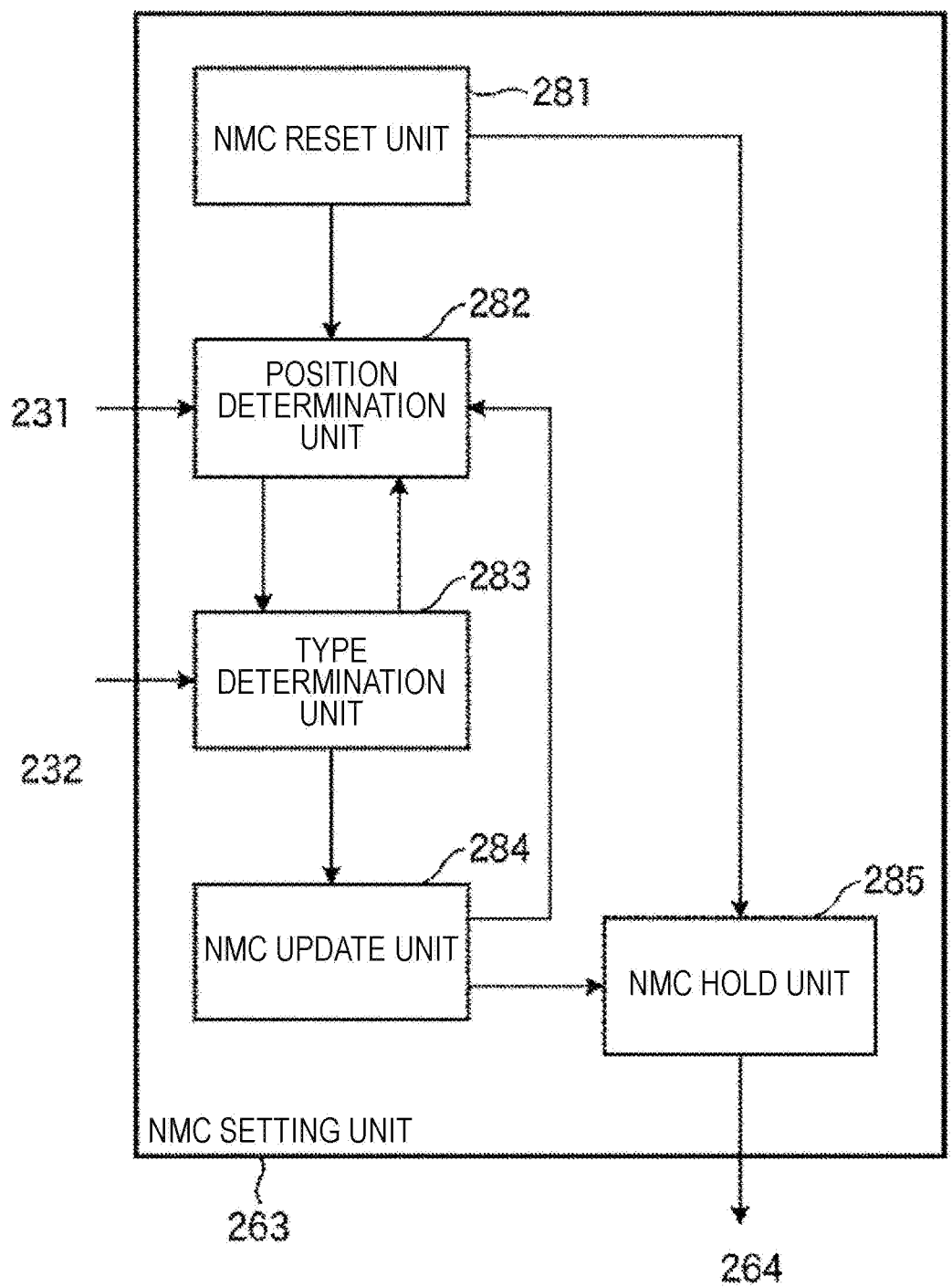
FIG. 22 is a block diagram illustrating a typical example structure of an NMC setting unit.

FIG. 22 is a block diagram illustrating a typical example structure of the NMC setting unit 263.

The NMC setting unit 263 performs basically the same operation as that of the NMC setting unit 163. That is, as illustrated in FIG. 22, the NMC setting unit 263 has an NMC reset unit 281, a position determination unit 282, a type determination unit 283, an NMC update unit 284 and an NMC hold unit 285.

The NMC reset unit 281 to the NMC hold unit 285 perform basically the same operations as those of the NMC reset unit 181 to the NMC 185.

[Decoding Operation Flow]

Next, a flow of each operation executed by the above image decoding device 200 will be described. First, a decoding operation flow will be described with reference to a flowchart in FIG. 23.

When decoding operation is started, the accumulation buffer 201 stores a transmitted code stream in step S201. In step S202, the lossless decoding unit 202 decodes the code stream supplied from the accumulation buffer 201. That is, the lossless encoding unit 106 in FIG. 1 decodes an encoded I picture, P picture and B picture. Further, various pieces of information other than difference image information included in the code streams such as difference motion information, a code number of predicted motion vector and merge information are also decoded.

In step S203, the inverse quantization unit 203 inversely quantizes the quantized orthogonal transform coefficient obtained by the operation in step S202. In step S204, the inverse orthogonal transform unit 204 performs an inverse orthogonal transform on the transform orthogonal coefficient subjected to an inverse quantization in step S203.

In step S205, the intra prediction unit 211 or the motion prediction/compensation unit 212 performs a prediction operation using the supplied information. In step S206, the selection unit 213 selects a predicted image generated in step S205. In step S207, the arithmetic operation unit 205 adds the predicted image selected in step S206 to difference image information obtained by the inverse orthogonal transform in step S204. By this means, a decoded image is obtained.

In step S208, the loop filter 206 adequately performs a loop filtering operation including a deblocking filtering operation and an adaptive loop filtering operation on the decoded image obtained in step S207.

In step S209, the screen rearrangement buffer 207 rearranges the image subjected to a filtering operation in step S208. That is, the order of frames rearranged for encoding by the screen rearrangement buffer 102 of the image encoding device 100 is rearranged in the original display order.

In step S210, the D/A converter 208 performs a D/A conversion on the image obtained by rearranging the order of the frames in step S209. This image is output to the display (not shown), and is displayed.

In step S211, the frame memory 209 stores the image subjected to a filtering operation in step S208. This image is used as a reference image in step S205 to generate a predicted image.

When the operation in step S211 is finished, the decoding operation is finished.

[Lossless Decoding Operation Flow]

Figure 23:
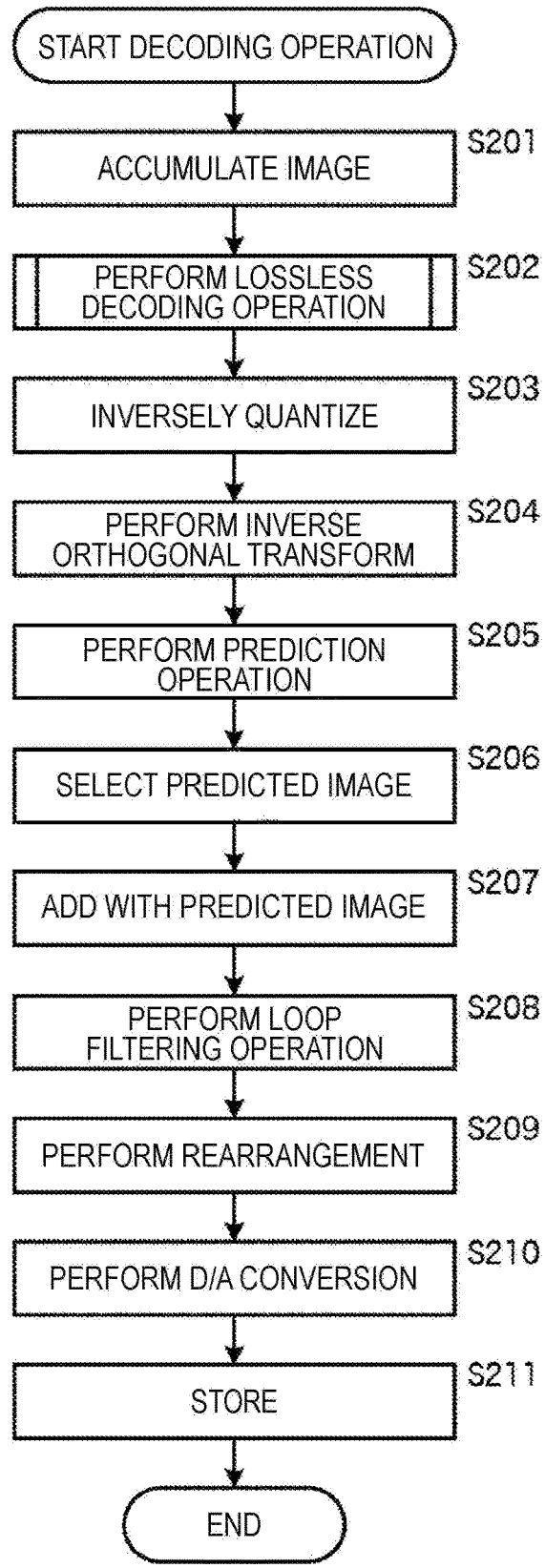
FIG. 23 is a flowchart for explaining a decoding operation flow.
Figure 24:
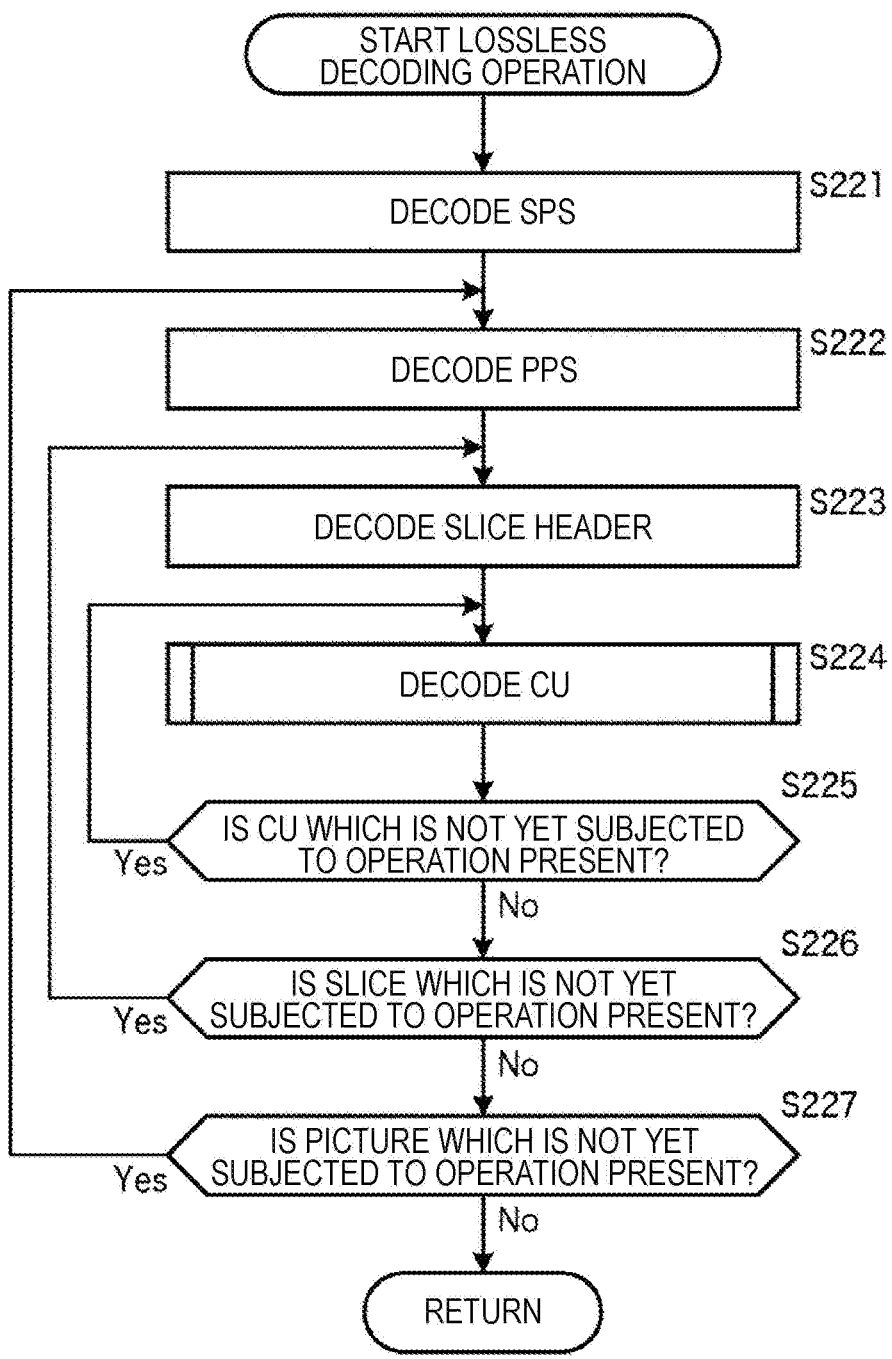
FIG. 24 is a flowchart for explaining a lossless decoding operation flow.

Next, an example of a lossless decoding operation flow executed in step S202 in FIG. 23 will be described with reference to the flowchart in FIG. 24.

This lossless decoding operation is performed per layer of an image similar to lossless encoding operation.

That is, the NAL decoding unit 231 decodes encoded data of a SPS in step S221, decodes encoded data of a PPS in step S222 and decodes encoded data of a slice header in step S223. In step S224, the CU data decoding unit 232 decodes a relevant CU of an operation target.

The CU data decoding unit 232 repeats the operation in step S224 for all CUs in a relevant slice of an operation target. In step S225, when it is determined that there is not a CU which is not yet subjected to an operation in the relevant slice, the CU data decoding unit 232 moves the operation to step S226.

The NAL decoding unit 231 repeats the operations in these steps S223 to S225 for all slices in a relevant picture of an operation target. In step S226, when it is determined that there is not a slice which is not yet subjected to the operation in the relevant picture, the NAL decoding unit 231 moves the operation to step S227.

The NAL decoding unit 231 repeats the operations in step S222 to S226 for all pictures in a relevant sequence of the operation target. In step S227, when it is determined that there is not a picture which is not yet subjected to the operation in the relevant sequence, the NAL decoding unit 231 finishes lossless decoding operation, and returns the operation to FIG. 23.

[CU Decoding Operation]

Figure 25:
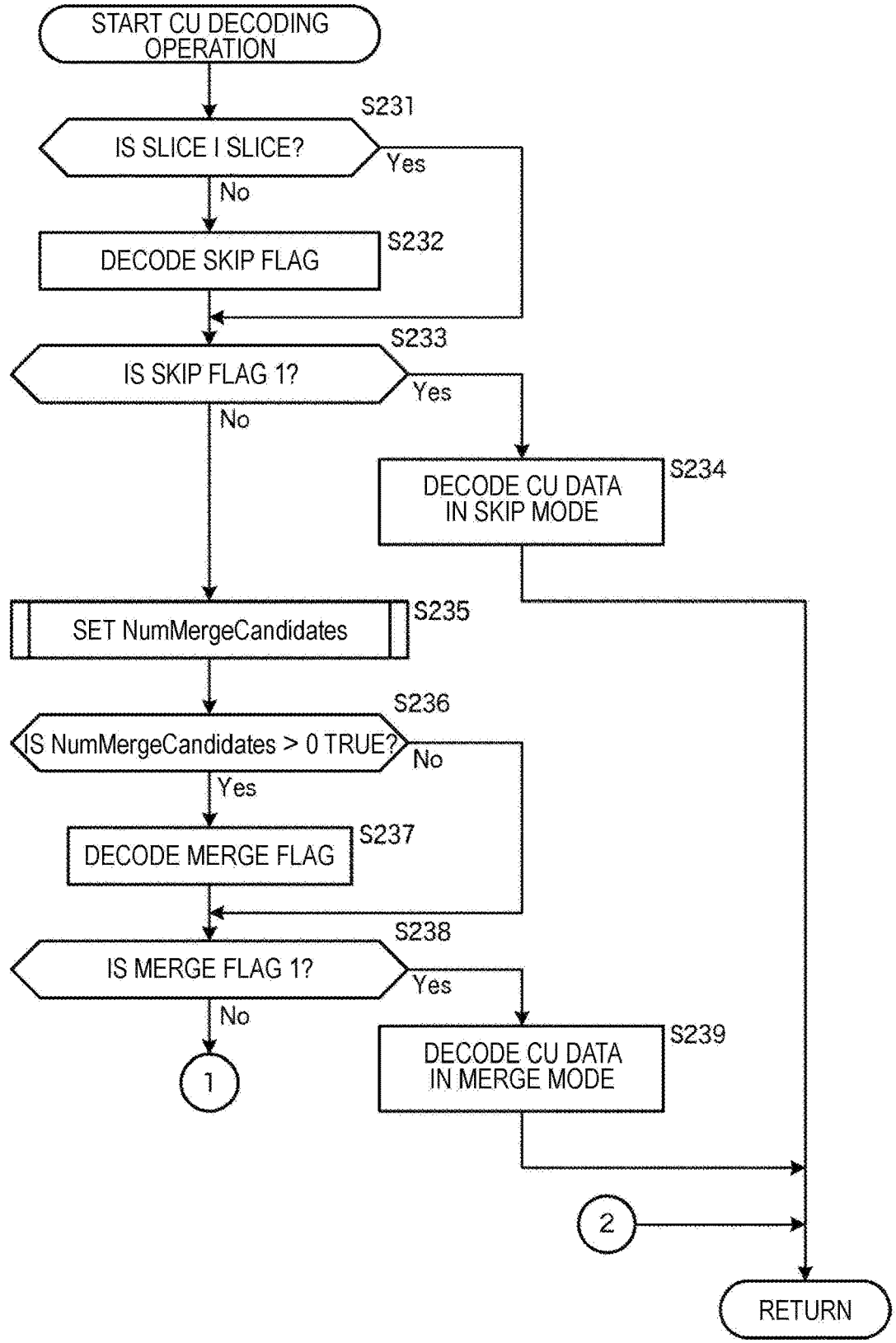
FIG. 25 is a flowchart for explaining a CU decoding operation flow.

Next, an example of a CU decoding operation flow executed in step S224 in FIG. 24 will be described with reference to the flowchart in FIGS. 25 and 26.

When the CU decoding operation is started, in step S231, the slice determination unit 261 determines a type of a relevant slice based on the NAL data decoded by the NAL decoding unit 231, and determines whether or not the relevant slice is an I slice.

When the relevant slice is not the I slice (the relevant is a P slice or a B slice), the skip flag decoding unit 241 decodes a skip flag in step S232. When it is determined that the relevant slice is the I slice, the skip flag is not encoded, and therefore this operation is skipped.

When the skip flag determination unit 262 determines in step S233 that a skip flag is present and a value of the skip flag is 1, the skip mode decoding unit 242 decodes CU data in the skip mode in step S234. When decoding CU data, the skip mode decoding unit 242 finishes the CU decoding operation, and returns the operation to FIG. 24.

When the skip flag determination unit 262 determines in step S233 that the skip flag is not present or the value of the skip flag is 0, the NMC setting unit 263 sets NumMergeCandidates in step S235. This NumMergeCandidates setting operation is performed as described with reference to the flowchart in FIG. 19, and therefore this NumMergeCandidates setting operation will not be described in detail.

When NumMergeCandidates is set and the NMC determination unit 264 determines in step S236 that the value of NumMergeCandidates is greater than 0, the merge flag decoding unit 243 decodes a merge flag in step S237. When it is determined that the value of NumMergeCandidates is 0, the merge flag is not encoded, and therefore this operation is skipped.

In step S238, when the merge flag determination unit 265 determines that the merge flag is present and the value of the merge flag is 1, the merge mode decoding unit 244 decodes CU data in the merge mode in step S239. When decoding CU data, the merge mode decoding unit 244 finishes the CU decoding operation, and returns the operation to FIG. 24.

Figure 26:
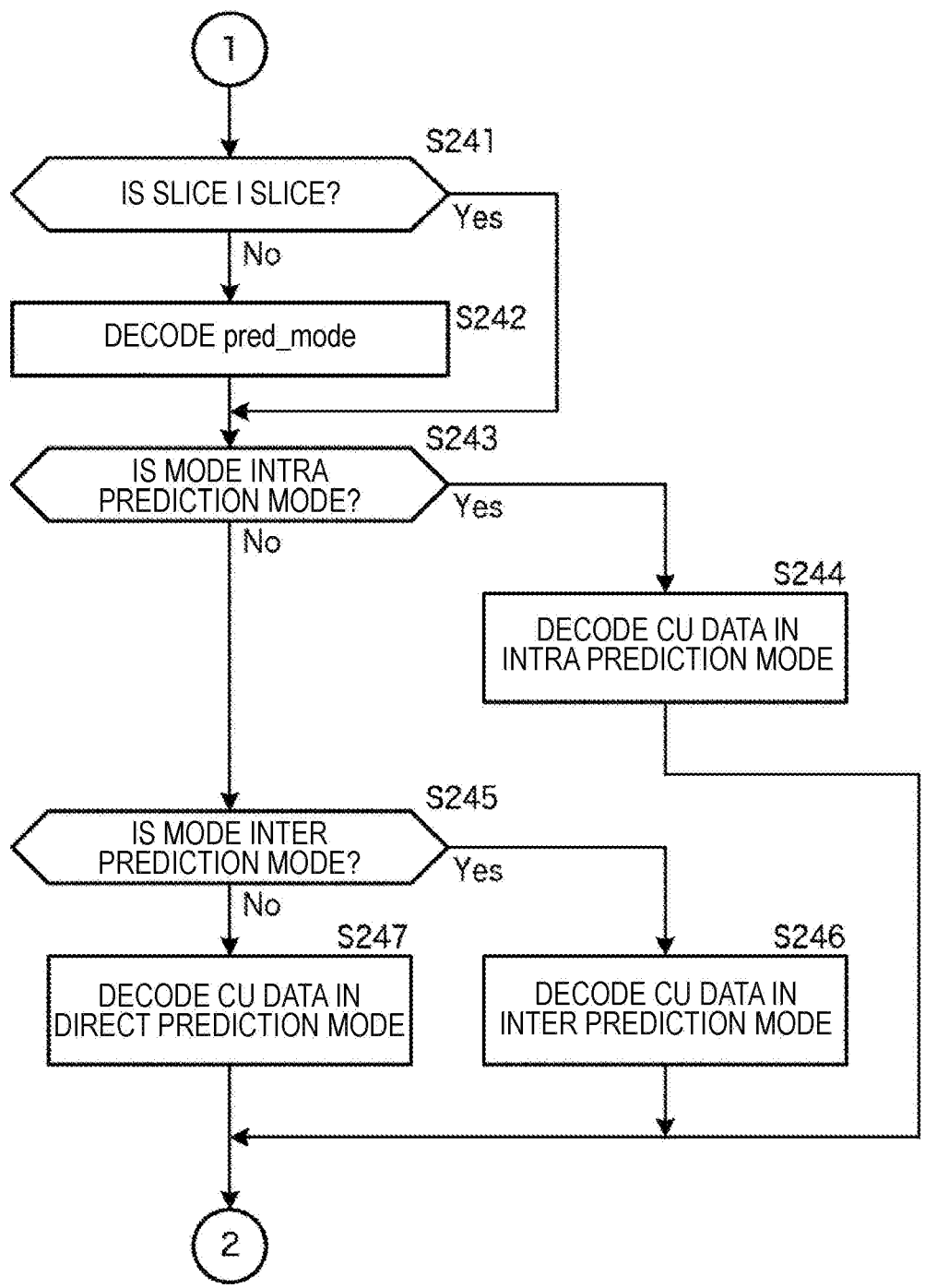
FIG. 26 is a flowchart for explaining the CU decoding operation flow subsequent to FIG. 25.

In step S238, when the merge flag determination unit 265 determines that a merge flag is not present or the value of the merge flag is 0, the operation is moved to FIG. 26.

In this case, CU data is decoded according to a method matching a prediction mode. That is, when the slice determination unit 261 determines in step S241 in FIG. 26 that the relevant slice is not the I slice, the PredMode decoding unit 245 decodes pred_mode in step S242. When it is determined that the relevant slice is the I slice, pred_mode is not encoded, and therefore this operation is skipped.

When the PredMode determination unit 266 determines in step S243 that a prediction mode of the relevant region is the intra prediction mode, the intra decoding unit 246 performs decoding in the intra prediction mode in step S244 (decodes CU data encoded in the intra prediction mode according to an adequate method). When decoding CU data, the intra decoding unit 246 finishes the CU decoding operation and returns the operation to FIG. 24.

Further, when the PredMode determination unit 266 determines in step S243 that the prediction mode of the relevant region is not the intra prediction mode, and determines in step S245 that the prediction mode is the inter prediction mode, the inter decoding unit 247 performs decoding in the inter prediction mode in step S246 (decodes CU data encoded in the inter prediction mode according to an adequate method). When decoding CU data, the inter decoding unit 247 finishes the CU decoding operation and returns the operation to FIG. 24.

Further, when the PredMode determination unit 266 determines in step S243 that the prediction mode of the relevant region is not the intra prediction mode, and determines in step S245 that the prediction mode is not the inter prediction mode, the direct mode decoding unit 248 performs decoding in the direct prediction mode in step S247 (decodes CU data encoded in the direct prediction mode according to an adequate method). When decoding CU data, the direct mode decoding unit 248 finishes CU decoding operation and returns the operation to FIG. 24.

As described above, by performing various operations, the decoding control unit 221 and the lossless decoding unit 202 need to refer to only motion information in the relevant slice and, consequently, does not need to stand by until operations of other slices are finished. Consequently, the image decoding device 200 can achieve parallelization of operations per slice, and suppress an increase in an operation time caused by occurrence of a delay time which is not necessary for operations related to the merge mode.

In addition, the present technique can be applied to image encoding devices and image decoding devices which are used when image information (bit streams) compressed through orthogonal transforms such as discrete cosine transforms and motion compensation as in MPEG or H.26x is received via a network medium such as satellite broadcasting, cable TV (television), the Internet, or a portable telephone device. Further, the present technique can also be applied to image encoding devices and image decoding devices which are used when compressed image information is processed on a storage medium such as an optical or magnetic disk or flash memory. Furthermore, the present technique is also applicable to motion prediction/compensation devices included in these image encoding devices and image decoding devices.

3. Third Embodiment

[Personal Computer]

The above described series of operations can be performed by hardware, and can also be performed by software. When the series of operations are to be performed by software, the programs forming the software are installed in a computer. Here, the computer may be a computer incorporated into special-purpose hardware, or may be a general-purpose personal computer which can execute various kinds of functions as various kinds of programs are installed thereinto.

Figure 27:
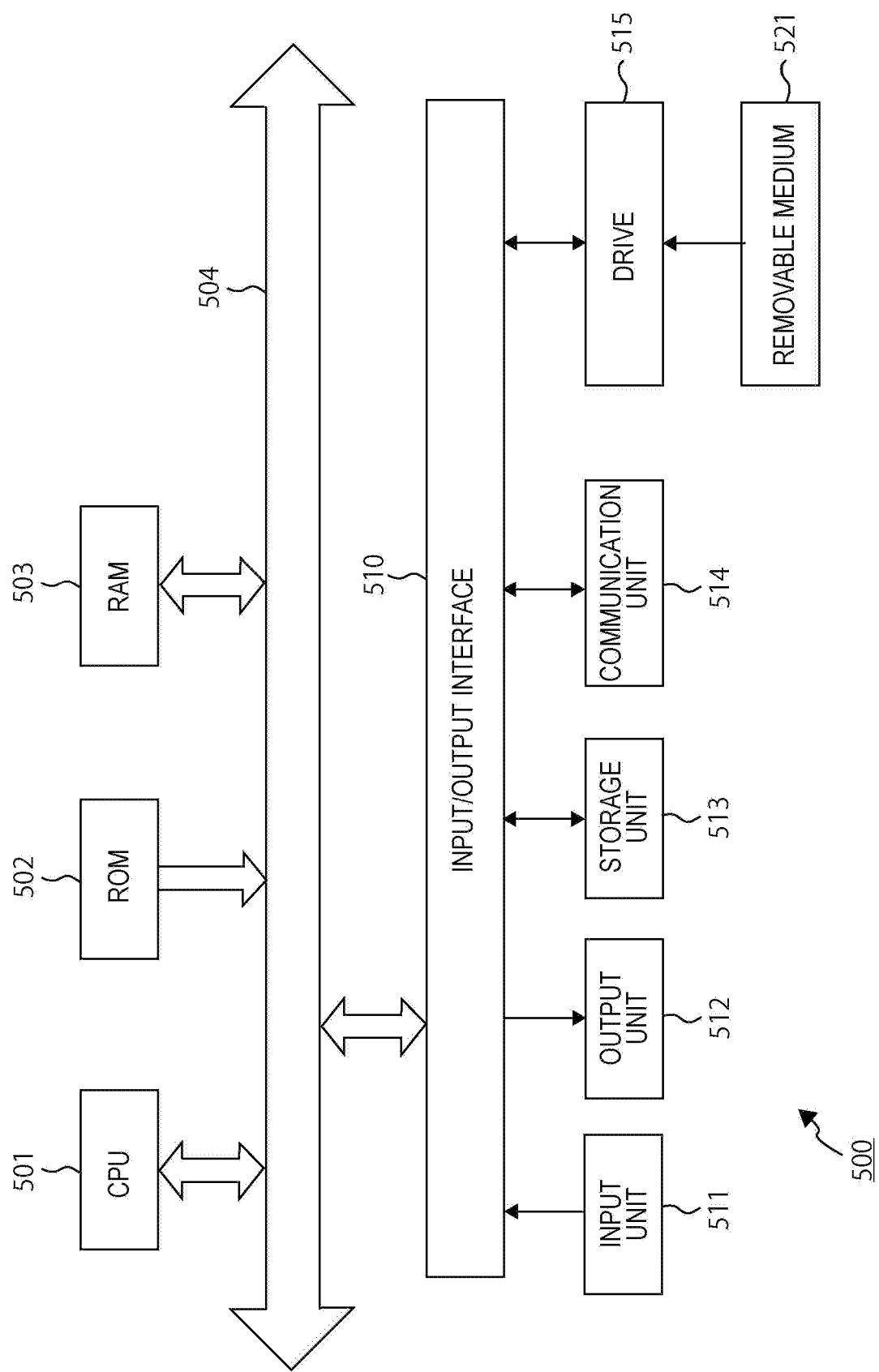
FIG. 27 is a block diagram illustrating a typical example structure of a personal computer.

In FIG. 27, a CPU (Central Processing Unit) 501 of a personal computer 500 executes various processing according to programs stored in a ROM (Read Only Memory) 502 or programs loaded from a storage unit 513 to a RAM (Random Access Memory) 503. Necessary data for the CPU 501 to perform various processing are also stored in the RAM 503, where necessary.

The CPU 501, the ROM 502, and the RAM 503 are connected to one another via a bus 504. An input/output interface 510 is also connected to the bus 504.

The input/output interface 510 is connected with: an input unit 511 formed with a keyboard, a mouse, or the like; an output unit 512 formed with a display such as a CRT (Cathode Ray Tube) or a LCD (Liquid Crystal Display), and a speaker; the storage unit 513 formed with a hard disk or the like; and a communication unit 514 formed with a modem. The communication unit 514 performs communications via networks including the Internet.

A drive 515 is also connected to the input/output interface 510 where necessary, a removable medium 521 such as a magnetic disk, an optical disk, a magnetooptical disk, or a semiconductor memory is mounted on the drive as appropriate, and a computer program read therefrom is installed in the storage unit 513 where necessary.

In a case where the above described series of operations is performed by software, the program forming the software is installed from a network or a recording medium.

As illustrated in, for example, FIG. 27, this recording medium is not only formed with the removable medium 521 which is distributed for delivering the program to users separately from the device, such as a magnetic disk (including a flexible disk), an optical disk (including a CD-ROM (Compact Disc-Read Only Memory) or a DVD (Digital Versatile Disc)), a magnetooptical disk (including an MD (Mini Disc)), or a semiconductor memory, which has the program recorded thereon but also the ROM 502 having the program recorded therein or a hard disk included in the storage unit 513.

The program to be executed by the computer may be a program for carrying out processes in chronological order in accordance with the sequence described in this specification, or a program for carrying out processes in parallel or whenever necessary such as in response to a call.

Further, in this specification, the step written in the program to be recorded in a recording medium includes operations to be performed in parallel or independently of one another if not necessarily in chronological order, as well as operations to be performed in chronological order in accordance with the sequence described herein.

In this specification, a system means an entire device formed with a plurality of devices.

Also, in the above described examples, any structure described as one device (or an operation unit) may be divided into a plurality of devices (or operation units). Conversely, any structure described as a plurality of devices (or operation units) may be combined to form one device (or an operation unit). Also, it is of course possible to add a structure other than the above described ones to the structure of any of the devices (or any of the operation units). Further, as long as the structure and function of the entire system remain the same, part of the structure of a device (or an operation unit) may be incorporated into another device (or another operation unit). That is, embodiments of the present technique are not limited to the above described embodiments, and various modifications may be made to them without departing from the scope of the technique.

The image encoding device and the image decoding device according to the above embodiment can be applied to various electronic devices such as a transmitter or a receiver for satellite broadcasting, wired broadcasting such as a cable TV, distribution through the Internet and distribution to a terminal by way of cellular communication, a recording device which records images in media such as an optical disk, a magnetic disk and flash memory, and a reproducing device which reproduces images from these storage media. Four application examples will be described.

4. Fourth Embodiment

First Application Example: Television Receiver

Figure 28:
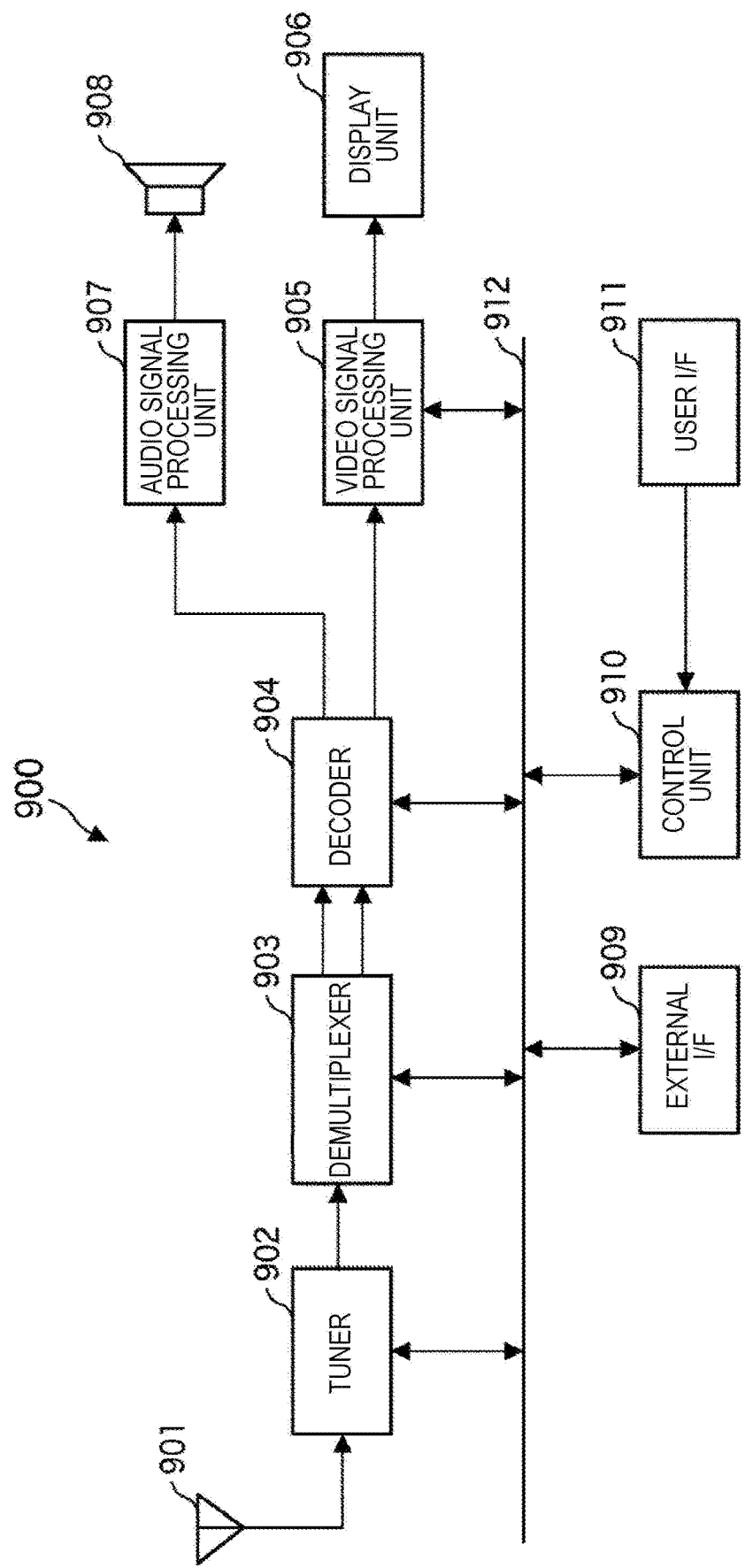
FIG. 28 is a block diagram illustrating an example of a schematic configuration of a television device.

FIG. 28 illustrates an example of a schematic configuration of a television device to which the above embodiment is applied. The television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911 and a bus 912.

The tuner 902 extracts a desired channel signal from a broadcast signal received through the antenna 901, and demodulates the extracted signal. Further, the tuner 902 outputs an encoded bit stream obtained by demodulation to the demultiplexer 903. That is, the tuner 902 plays a role of a transmitter of the television device 900 which receives an encoded stream obtained by encoding an image.

The demultiplexer 903 separates a video stream and an audio stream of the show to be viewed from the encoded bit stream, and outputs each separated stream to the decoder 904. Further, the demultiplexer 903 extracts auxiliary data such as EPG (Electronic Program Guide) from the encoded bit stream, and supplies the extracted data to the control unit 910. In addition, the demultiplexer 903 may perform descrambling when the encoded bit stream is scrambled.

The decoder 904 decodes the video stream and the audio stream input from the demultiplexer 903. Further, the decoder 904 outputs video data generated by a decoding operation, to the video signal processing unit 905. Furthermore, the decoder 904 outputs audio data generated by a decoding operation, to the audio signal processing unit 907.

The video signal processing unit 905 reproduces the video data input from the decoder 904, and displays a video image on the display unit 906. Further, the video signal processing unit 905 may display on the display unit 906 an application screen supplied through a network. Furthermore, the video signal processing unit 905 may perform an additional operation such as noise removal on the video data according to a setting. Still further, the video signal processing unit 905 may generate a GUI (Graphical User Interface) image such as a menu, buttons, a cursor, and superimpose the generated image on an output image.

The display unit 906 is driven by a drive signal supplied from the video signal processing unit 905, and displays a video image or an image on a display screen of a display device (such as a liquid crystal display, a plasma display or an OLED (Organic Electroluminescence Display) (organic EL display)).

The audio signal processing unit 907 performs a reproducing operation such as a D/A conversion and amplification on the audio data input from the decoder 904, and outputs an audio from the speaker 908. Further, the audio signal processing unit 907 may perform an additional operation such as noise removal on the audio data.

The external interface 909 is an interface which connects the television device 900 and an external device or the network. For example, a video stream or an audio stream received through the external interface 909 may be decoded by the decoder 904. That is, the external interface 909 also plays a role of a transmitter in the television device 900 which receives encoded streams of encoded images.

The control unit 910 has a processor such as a CPU, and memories such as RAM and ROM. The memory stores programs to be executed by the CPU, program data, EPG data, and data acquired through the network. The program stored in the memory is read and executed by the CPU at the time of activation of the television device 900. By executing the program, the CPU controls the operation of the television device 900 according to, for example, an operation signal input from the user interface 911.

The user interface 911 is connected to the control unit 910. The user interface 911 has, for example, buttons and switches which a user uses to operate the television device 900, and a reception unit which receives a remote control signal. The user interface 911 detects a user's operation through these components, generates an operation signal and outputs the generated operation signal to the control unit 910.

The bus 912 mutually connects the tuner 902, the demultiplexer 903, the decoder 904, the video signal processing unit 905, the audio signal processing unit 907, the external interface 909 and the control unit 910.

In the television device 900 having this structure, the decoder 904 has a function of the image decoding device according to the above embodiments. Consequently, upon decoding of an image in the television device 900, it is possible to achieve parallelization of operations per slice, and suppress an increase in an operation time caused by occurrence of a delay time which is not necessary for operations related to the merge mode.

5. Fifth Embodiment

Second Application Example: Mobile Telephone Device

Figure 29:
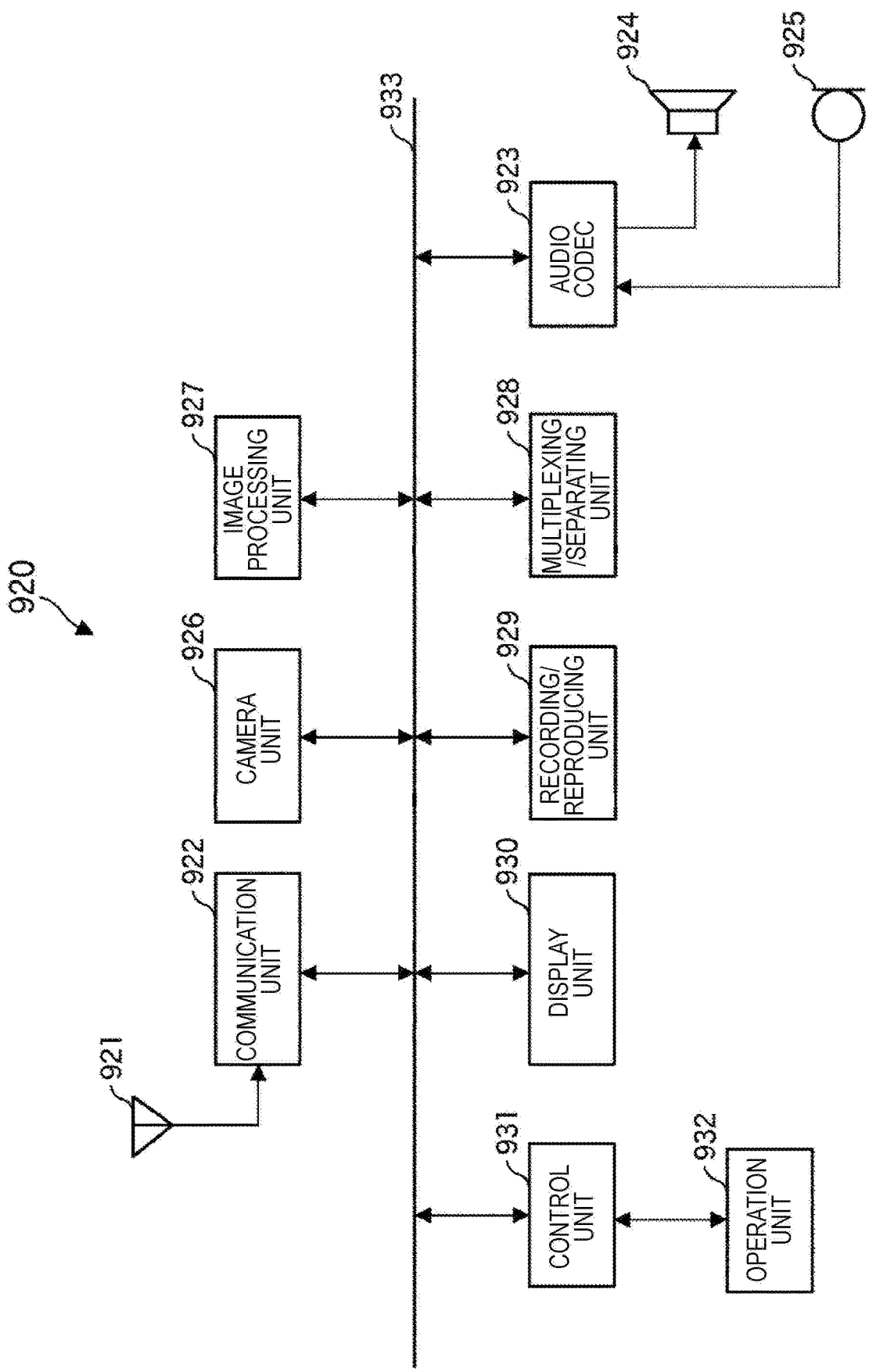
FIG. 29 is a block diagram illustrating an example of a schematic configuration of a mobile telephone device.

FIG. 29 illustrates an example of a schematic structure of a mobile telephone device to which above embodiments are applied. The mobile telephone device 920 includes an antenna 921, a communication unit 922, an audio codec 923, a speaker 924, a microphone 925, a camera unit 926, an image processing unit 927, a multiplexing/separating unit 928, a recording/reproducing unit 929, a display unit 930, a control unit 931, an operation unit 932 and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/separating unit 928, the recording/reproducing unit 929, the display unit 930, and the control unit 931.

The mobile telephone device 920 performs operations such as transmission and reception of audio signals, transmission and reception of electronic mail and image data, image capturing, and data recording, in various kinds of modes such as a voice communication mode, a data communication mode, an image capturing mode and a video telephone mode.

In the audio communication mode, an analog audio signal generated at the microphone 925 is supplied to the audio codec 923. The audio codec 923 converts the analog audio signal into audio data, and performs an A/D conversion on and compresses the converted audio data. Further, the audio codec 923 outputs the compressed audio data to the communication unit 922. The communication unit 922 encodes and modulates audio data, and generates a transmission signal. Further, the communication unit 922 transmits the generated transmission signal to a base station (not illustrated) through the antenna 921. Furthermore, the communication unit 922 amplifies and performs a frequency conversion on a radio signal received through the antenna 921, and obtains the received signal. Still further, the communication unit 922 demodulates and decodes the received signal, generates audio data and outputs the generated audio data to the audio codec 923. The audio codec 923 decompresses and performs a D/A conversion on audio data, and generates an analog audio signal. Further, the audio codec 923 supplies the generated audio signal to the speaker 924, and outputs the audio.

Furthermore, in the data communication mode, for example, the control unit 931 generates text data which configures an electronic mail according to a user's operation through the operation unit 932. Still further, the control unit 931 displays a text on the display unit 930. Moreover, the control unit 931 generates electronic mail data according to a transmission instruction from the user through the operation unit 932, and outputs the generated electronic mail data to the communication unit 922. The communication unit 922 encodes and modulates electronic mail data, and generates a transmission signal. Further, the communication unit 922 transmits the generated transmission signal to abase station (not illustrated) through the antenna 921. Furthermore, the communication unit 922 amplifies and performs a frequency conversion on a radio signal received through the antenna 921, and obtains the received signal. Still further, the communication unit 922 demodulates and decodes the received signal, restores electronic mail data and outputs the restored electronic mail data to the control unit 931. The control unit 931 displays content of the electronic mail on the display unit 930, and stores the electronic mail data in a storage medium of the recording/reproducing unit 929.

The recording/reproducing unit 929 has an arbitrary readable/writable storage medium. For example, the storage medium may be a built-in storage medium such as RAM or flash memory, and may be a storage medium which is externally attached such as a hard disk, a magnetic disk, a magnetooptical disk, an optical disk, a USB (Unallocated Space Bitmap) memory, or a memory card.

Further, in the image capturing mode, for example, the camera unit 926 captures an image of an object, generates image data and outputs the generated image data to the image processing unit 927. The image processing unit 927 encodes image data input from the camera unit 926, and stores the encoded stream in the storage medium of the recording/reproducing unit 929.

Further, in the video telephone mode, for example, the multiplexing/separating unit 928 multiplexes the video stream encoded by the image processing unit 927 and the audio stream input from the audio codec 923, and outputs the multiplexed stream to the communication unit 922. The communication unit 922 encodes and modulates the stream, and generates a transmission signal. Further, the communication unit 922 transmits the generated transmission signal to a base station (not illustrated) through the antenna 921. Furthermore, the communication unit 922 amplifies and performs a frequency conversion on a radio signal received through the antenna 921, and obtains the received signal. These transmission signal and received signal may include encoded bit streams. Further, the communication unit 922 demodulates and decodes the received signal, restores the stream and outputs the restored stream to the multiplexing/separating unit 928. The multiplexing/separating unit 928 separates the video stream and the audio stream from the input stream, and outputs the video stream to the image processing unit 927 and the audio stream to the audio codec 923. The image processing unit 927 decodes the video stream, and generates the video data. The video data is supplied to the display unit 930, and the display unit 930 displays a series of images. The audio codec 923 decompresses and performs a D/A conversion on the audio stream, and generates an analog audio signal. Further, the audio codec 923 supplies the generated audio signal to the speaker 924, and outputs the audio.

In the mobile telephone device 920 having the structure, the image processing unit 927 has functions of the image encoding device and the image decoding device according to the above embodiments. Consequently, upon encoding and decoding of an image in the mobile telephone device 920, it is possible to achieve parallelization of operations per slice, and suppress an increase in an operation time caused by occurrence of a delay time which is not necessary for operations related to the merge mode.

6. Sixth Embodiment

Third Application Example: Recording/Reproducing Device

Figure 30:
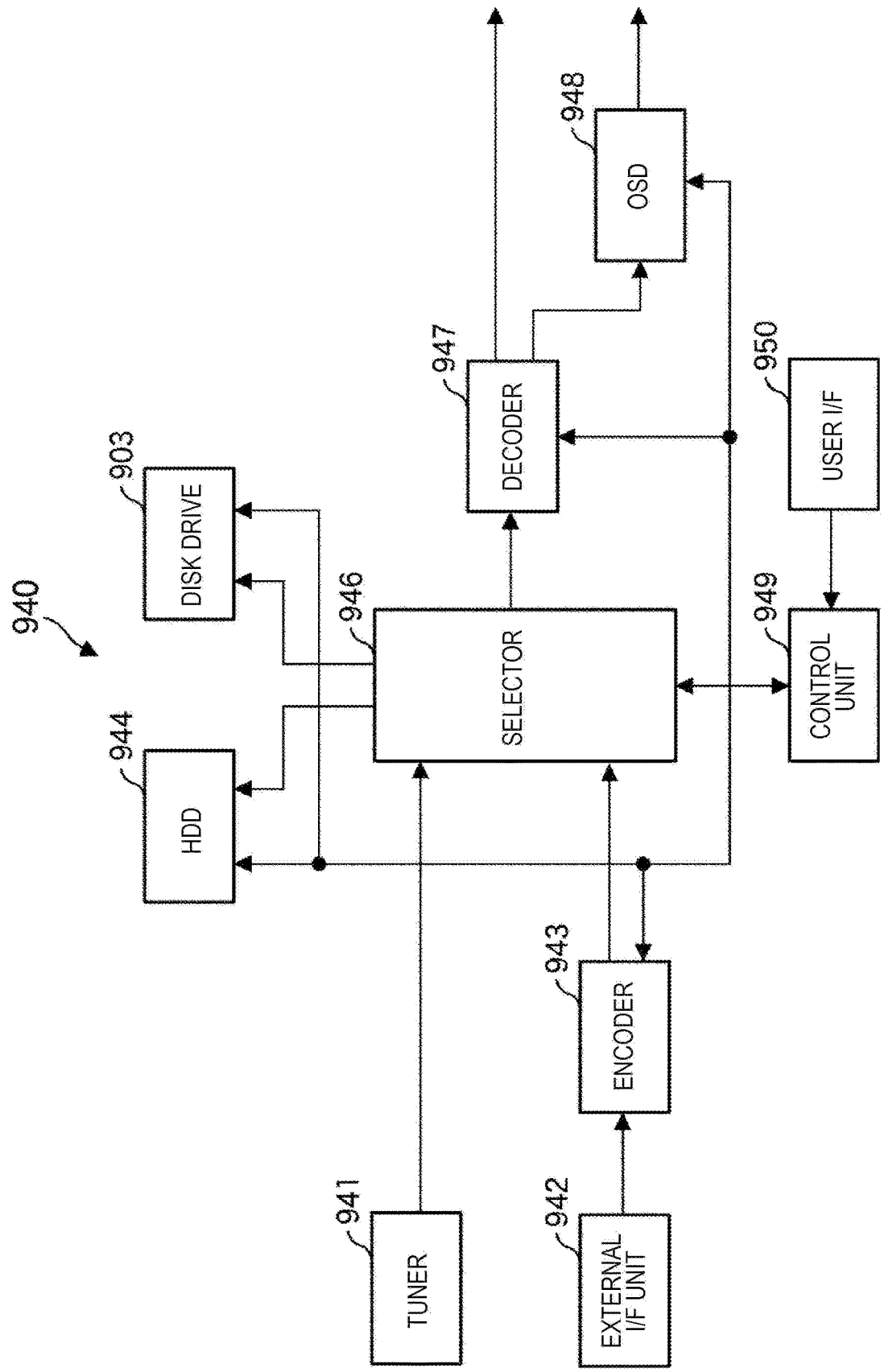
FIG. 30 is a block diagram illustrating an example of a schematic configuration of a recording/reproducing device.

FIG. 30 illustrates an example of a schematic structure of a recording/reproducing device to which above embodiments are applied. The recording/reproducing device 940 encodes, for example, audio data and video data of the received broadcast show, and records the data in the recording medium. Further, the recording/reproducing device 940 encodes, for example, the audio data and the video data obtained from another device, and records the data in the recording medium. Furthermore, the recording/reproducing device 940 reproduces data recorded in the recording medium on a monitor and a speaker according to, for example, a user's instruction. In this case, the recording/reproducing device 940 decodes the audio data and the video data.

The recording/reproducing device 940 includes a tuner 941, an external interface 942, an encoder 943, an HDD (Hard Disk Drive) unit 944, a disk drive 945, a selector 946, a decoder 947, an OSD (On-Screen Display) unit 948, a control unit 949, and a user interface 950.

The tuner 941 extracts a desired channel signal from a broadcast signals received at an antenna (not illustrated), and demodulates the extracted signal. Further, the tuner 941 outputs an encoded bit stream obtained by demodulation, to the selector 946. That is, the tuner 941 plays a role of a transmitter in the recording/reproducing device 940.

The external interface 942 is an interface which connects the recording/reproducing device 940 and an external device or the network. The external interface 942 is formed with an IEEE1394 interface, a network interface unit, a USB interface, flash memory interface, and the like. For example, the video data and the audio data received through the external interface 942 are inputted to the encoder 943. That is, the external interface 942 plays a role of the transmitter in the recording/reproducing device 940.

When the video data and the audio data input from the external interface 942 are encoded, the encoder 943 encodes the video data and the audio data. Further, the encoder 943 outputs an encoded bit stream to the selector 946.

The HDD 944 records encoded bit streams obtained by compressing content data such as video images and audio, various programs and other data in the hard disk inside. Further, the HDD 944 reads these items of data from the hard disk at the time of reproduction of a video image and an audio.

The disk drive 945 records and reads data to and from an attached recording medium. A recording medium attached to the disk drive 945 is, for example, a DVD disk (such as DVD-Video, DVD-RAM, DVD-R, DVD-RW, DVD+R and DVD+RW) or a Blu-ray (registered trademark) disk.

At the time of video and audio recording, the selector 946 selects an encoded bit stream input from the tuner 941 or the encoder 943, and outputs the selected encoded bit stream to the HDD 944 or the disk drive 945. Further, the selector 946 outputs an encoded bit stream input from the HDD 944 or the disk drive 945 to the decoder 947 at the time of video and audio reproduction.

The decoder 947 decodes the encoded bit stream, and generates video data and audio data. Further, the decoder 947 outputs the generated video data to the OSD 948. Furthermore, the decoder 904 outputs the generated audio data to an external speaker.

The OSD 948 reproduces video data input from the decoder 947, and displays a video image. Further, the OSD 948 may superimpose a GUI image such as a menu, buttons or a cursor on a video image to be displayed.

The control unit 949 has a processor such as a CPU, and memories such as RAM and ROM. The memory stores programs to be executed by the CPU, and program data. The program stored in the memory is read and executed by the CPU at, for example, the time of activation of the recording/reproducing device 940. By executing the program, the CPU controls the operation of the recording/reproducing device 940 according to, for example, an operation signal input from the user interface 950.

The user interface 950 is connected to the control unit 949. The user interface 950 has, for example, buttons and switches which a user uses to operate the recording/reproducing device 940, and a reception unit which receives a remote control signal. The user interface 950 detects a user's operation through these components, generates an operation signal and outputs the generated operation signal to the control unit 949.

In the recording/reproducing device 940 having this structure, the encoder 943 has a function of the image encoding device according to the above embodiments. Further, the decoder 947 has a function of the image decoding device according to the above embodiments. Consequently, upon encoding and decoding of an image in the recording/reproducing device 940, it is possible to achieve parallelization of operations per slice, and suppress an increase in an operation time caused by occurrence of a delay time which is not necessary for operations related to the merge mode.

7. Seventh Embodiment

Fourth Application Example: Imaging Device

FIG. 31 illustrates an example of a schematic structure of an imaging device to which above embodiments are applied. An imaging device 960 captures an image of an object, generates an image, encodes image data and records the image data in a recording medium.

The imaging device 960 includes an optical block 961, an imaging unit 962, a signal processing unit 963, an image processing unit 964, a display unit 965, an external interface 966, a memory 967, a media drive 968, an OSD 969, a control unit 970, a user interface 971 and a bus 972.

The optical block 961 is connected to an imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969 and the control unit 970.

The optical block 961 has a focus lens, a diaphragm, and the like. The optical block 961 forms an optical image of an object on the imaging surface of the imaging unit 962. The imaging unit 962 has an image sensor such as a CCD (Charge Coupled Device) or a CMOS (Complementary Metal Oxide Semiconductor), and converts an optical image formed on the imaging surface into an image signal as an electric signal by photoelectric conversion. Further, the imaging unit 962 outputs the image signal to the signal processing unit 963.

The signal processing unit 963 performs various kinds of camera signal operations such as a knee correction, a gamma correction, and a color correction on the image signal input from the imaging unit 962. The signal processing unit 963 outputs image data subjected to the camera signal operation, to the image processing unit 964.

The image processing unit 964 encodes the image data input from the signal processing unit 963, and generates encoded data. Further, the image processing unit 964 outputs the generated encoded data to the external interface 966 or the media drive 968. Furthermore, the image processing unit 964 decodes the encoded data input from the external interface 966 or the media drive 968, and generates image data. Still further, the image processing unit 964 outputs the generated image data to the display unit 965. Moreover, the image processing unit 964 may output the image data input from the signal processing unit 963 to the display unit 965, and display an image. Further, the image processing unit 964 may superimpose display data obtained from the OSD 969, on the image to be output to the display unit 965.

The OSD 969 generates a GUI image such as a menu, buttons or a cursor, and outputs the generated image to the image processing unit 964.

The external interface 966 is formed as, for example, a USB input/output terminal. The external interface 966 connects the imaging device 960 and a printer at, for example, the time of printing of an image. Further, the external interface 966 is connected with a drive if necessary. The drive is attached with a removable medium such as a magnetic disk or an optical disk, and the program read from the removable medium can be installed in the imaging device 960. Further, the external interface 966 includes a network interface connected to a network such as a LAN or the Internet. That is, the external interface 966 plays a role of the transmitter in the imaging device 960.

A recording medium attached to the media drive 968 may be a readable/rewritable removable medium such as a magnetic disk, a magnetooptical disk, an optical disk, or a semiconductor memory. Further, a recording medium is attached to the media drive 968 and fixed, and a non-portable storage unit maybe such as a built-in hard disk drive or an SSD (Solid State Drive) may be formed.

The control unit 970 has a processor such as a CPU, and memories such as RAM and ROM. The memory stores programs to be executed by the CPU, and program data. The program stored in the memory is read and executed by the CPU at, for example, the time of activation of the imaging device 960. By executing the program, the CPU controls the operation of the imaging device 960 according to, for example, an operation signal input from the user interface 971.

The user interface 971 is connected to the control unit 970. The user interface 971 has, for example, buttons and switches which a user uses to operate the imaging device 960. The user interface 971 detects a user's operation through these components, generates an operation signal and outputs the generated operation signal to the control unit 970.

In the imaging device 960 having the structure, the image processing unit 964 has functions of the image encoding device and the image decoding device according to the above embodiments. Consequently, upon encoding and decoding of an image in the imaging device 960, it is possible to achieve parallelization of operations per slice, and suppress an increase in an operation time caused by occurrence of a delay time which is not necessary for operations related to the merge mode.

In addition, an example has been described in this description where various pieces of prediction mode information and merge information are multiplexed on with a header of an encoded stream, and are transmitted from an encoding side to a decoding side. However, a method of transmitting these pieces of information is not limited to this example. For example, these pieces of information may be transmitted or recorded as different data associated with an encoded bit stream without being multiplexed with the encoded bit stream. Meanwhile, the term "associate" means linking an image (or part of an image such as a slice or a block) included in a bit stream or information associated with this image at the time of decoding. That is, the information may be transmitted on a channel different from that of an image (or a bit stream). Further, information may be recorded in a recording medium (or another recording area of a single recording medium) different from that of an image (or a bit stream). Furthermore, information and an image (or a bit stream) may be associated with each other in arbitrary units such as a plurality of frames, one frame or a portion in a frame.

Although suitable embodiments of the present disclosure have been described in detail with reference to the accompanying drawings, the present disclosure is not limited to these examples. Obviously, one who has common knowledge in a field of a technique to which the present disclosure belongs can arrive at various modification examples and correction examples within a scope of a technical idea described in the claims, and these examples naturally belong to the technical scope of the present disclosure.

In addition, the present technique can also employ the following structure.

(1) An image processing device has: an encoding control unit which, upon encoding independently performed per slice for dividing a picture into a plurality of pictures, controls whether or not to adopt for motion information a merge mode of merging a relevant region of an operation target with a surrounding region positioned in a surrounding of the relevant region, based on information of surrounding regions which belong to a relevant slice to which the relevant region belongs; and an encoding unit which encodes the relevant region in the merge mode or a mode other than the merge mode under control of the encoding control unit.

(2) In the image processing device described in (1), the encoding control unit performs control such that the merge mode is adopted when at least one of the surrounding regions which belong to the relevant slice includes motion information.

(3) In the image processing device described in (1) or (2), the encoding control unit has:

a calculation unit which calculates a number of pieces of motion information of the surrounding regions which belong to the relevant slice;

a determination unit which determines whether or not the number of pieces of motion information of the surrounding regions calculated by the calculation unit is greater than 0; and a control unit which, when the determination unit determines that the number of pieces of motion information of the surrounding regions is greater than 0, performs control such that the merge mode is adopted.

(4) In the image processing device described in (3), the calculation unit has:

a position determination unit which determines whether or not each surrounding region belongs to the relevant slice;

a type determination unit which determines a prediction type of a surrounding region which is determined to belong to the relevant slice by the position determination unit; and an update unit which, when the type determination unit determines the prediction type of the surrounding region and determines that the surrounding region includes the motion information, updates a value of a parameter for counting the number of pieces of motion information of the surrounding regions.

(5) The image processing device described in any one of (1) to (4) further has a prediction operation unit which performs a prediction operation of generating a predicted image independently per slice.

(6) In the image processing device described in anyone of (1) to (4), the slice is an entropy slice which divides only the encoding operation performed with respect to the picture by the encoding unit into a plurality of processing.

(7) An image processing method of an image processing device includes:

at an encoding control unit, upon encoding independently performed per slice for dividing a picture into a plurality of pictures, controlling whether or not to adopt for motion information a merge mode of merging a relevant region of an operation target with a surrounding region positioned in a surrounding of the relevant region, based on information of surrounding regions which belong to a relevant slice to which the relevant region belongs; and at an encoding unit, encoding the relevant region in the merge mode or a mode other than the merge mode under the control.

(8) An image processing device has: a decoding control unit which, upon decoding independently performed per slice for dividing a picture into a plurality of pictures, controls whether or not to adopt for motion information a merge mode of merging a relevant region of an operation target with a surrounding region positioned in a surrounding of the relevant region, based on information of surrounding regions which belong to a relevant slice to which the relevant region belongs; and a decoding unit which encodes the relevant region in the merge mode or a mode other than the merge mode under control of the decoding control unit.

(9) In the image processing device described in (8), the decoding control unit performs control such that the merge mode is adopted when at least one of the surrounding regions which belong to the relevant slice includes motion information.

(10) In the image processing device described in (8) or (9), the decoding control unit has:

a calculation unit which calculates a number of pieces of motion information of the surrounding regions which belong to the relevant slice;

a determination unit which determines whether or not the number of pieces of motion information of the surrounding regions calculated by the calculation unit is greater than 0; and a control unit which, when the determination unit determines that the number of pieces of motion information of the surrounding regions is greater than 0, performs control such that the merge mode is adopted.

(11) In the image processing device described in (10), the calculation unit has:

a position determination unit which determines whether or not each surrounding region belongs to the relevant slice;

a type determination unit which determines a prediction type of a surrounding region which is determined to belong to the relevant slice by the position determination unit; and an update unit which, when the type determination unit determines the prediction type of the surrounding region and determines that the surrounding region includes the motion information, updates a value of a parameter for counting the number of pieces of motion information of the surrounding regions.

(12) The image processing device described in any one of (8) to (11) further has a prediction operation unit which performs a prediction operation of generating a predicted image independently per slice.

(13) In the image processing device described in any one of (8) to (11), the slice is an entropy slice which divides only the encoding operation performed with respect to the picture by the encoding unit into a plurality of processing.

(14) An image processing method of an image processing device includes:

at a decoding control unit, upon decoding independently performed per slice for dividing a picture into a plurality of pictures, controlling whether or not to adopt for motion information a merge mode of merging a relevant region of an operation target with a surrounding region positioned in a surrounding of the relevant region, based on information of surrounding regions which belong to a relevant slice to which the relevant region belongs; and at a decoding unit, decoding the relevant region in the merge mode or a mode other than the merge mode under the control.

REFERENCE SIGNS LIST

100 Image encoding device, 106 Lossless encoding unit, 121 Encoding control unit, 143 Merge flag encoding unit, 144 Merge mode encoding unit, 163 NMC setting unit, 164 NMC determination unit, 165 Merge flag determination unit, 181 NMC reset unit, 182 Position determination unit, 183 Type determination unit, 184 NMC update unit, 185 NMC hold unit, 200 Image decoding device, 202 Lossless decoding unit, 221 Decoding control unit, 243 Merge flag decoding unit, 244 Merge mode decoding unit, 263 NMC setting unit, 264 NMC determination unit, 265 Merge flag determination unit, 281 NMC reset unit, 282 Position determination unit, 283 Type determination unit, 284 NMC update unit, 285 NMC hold unit.

The invention claimed is:

1. A decoding device, comprising:

circuitry configured to:

control whether or not to decode with a merge mode based on information indicating a count of a motion vector of a prediction unit of a merge candidate, the merge candidate including the prediction unit that belongs to a target slice which belongs to a target prediction unit;

decode the target prediction unit in accordance with the control of decoding;

determine whether or not the prediction unit belongs to the target slice; and control to include the prediction unit, which is determined to belong to the target slice, in the merge candidate, wherein the control of decoding includes decoding with the merge mode based on the count of the motion vector being larger than zero, and not decoding with the merge mode based on the count of the motion vector being equal to zero, and wherein, in the merge mode, when motion information of the target prediction unit is the same as information of the merge candidate, only flag information is received, from an encoding device, as information of the target prediction unit related to the merge mode.

2. The decoding device according to claim 1, wherein the information is used in a syntax of the prediction unit.

3. The decoding device according to claim 1, wherein the circuitry is further configured to:

control to decode with the merge mode or a mode other than merge mode.

4. The decoding device according to claim 1, wherein the circuitry is further configured to:

perform prediction processing per slice for generating a prediction image.

5. A decoding method of a decoding device, comprising:

controlling whether or not to decode with a merge mode based on information indicating a count of a motion vector of a prediction unit of a merge candidate, the merge candidate including the prediction unit that belongs to a target slice which belongs to a target prediction unit;

decoding the target prediction unit in accordance with the controlling of decoding;

determining whether or not the prediction unit belongs to the target slice; and controlling to include the prediction unit, which is determined to belong to the target slice, in the merge candidate, wherein the controlling of decoding includes decoding with the merge mode based on the count of the motion vector being larger than zero, and not decoding with the merge mode based on the count of the motion vector being equal to zero, and wherein, in the merge mode, when motion information of the target prediction unit is the same as information of the merge candidate, only flag information is received, from an encoding device, as information of the target prediction unit related to the merge mode.

6. The decoding method according to claim 5, wherein the information is used in a syntax of the prediction unit.

7. The decoding method according to claim 5, further comprising:

controlling to decode with the merge mode or a mode other than merge mode.

8. The decoding method according to claim 5, further comprising:

performing prediction processing per slice for generating a prediction image.

9. A non-transitory computer-readable medium having embodied thereon a program, which when executed by a computer causes the computer to execute a decoding method of a decoding device, the method comprising:

controlling whether or not to decode with a merge mode based on information indicating a count of a motion vector of a prediction unit of a merge candidate, the merge candidate including the prediction unit that belongs to a target slice which belongs to a target prediction unit;

decoding the target prediction unit in accordance with the controlling of decoding;

determining whether or not the prediction unit belongs to the target slice; and controlling to include the prediction unit, which is determined to belong to the target slice, in the merge candidate, wherein the controlling of decoding includes decoding with the merge mode based on the count of the motion vector being larger than zero, and not decoding with the merge mode based on the count of the motion vector being equal to zero, and wherein, in the merge mode, when motion information of the target prediction unit is the same as information of the merge candidate, only flag information is received, from an encoding device, as information of the target prediction unit related to the merge mode.

* * * * *